United States Patent
Fukunaga et al.

(10) Patent No.: US 6,717,694 B1
(45) Date of Patent: Apr. 6, 2004

(54) DATA TRANSMISSION APPARATUS, SYSTEM AND METHOD, AND RECORDING MEDIUM

(75) Inventors: Koji Fukunaga, Tokyo (JP); Makoto Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/362,892

(22) Filed: Jul. 29, 1999

(30) Foreign Application Priority Data

Jul. 31, 1998 (JP) .......................... 10-218175
Aug. 4, 1998 (JP) .......................... 10-220689

(51) Int. Cl.[7] .......................... G06F 15/00; G06F 3/00; G06F 11/30; H04B 1/60
(52) U.S. Cl. .................. 358/1.16; 358/1.15; 358/444; 710/53; 710/100; 713/200; 715/514; 455/10
(58) Field of Search .................. 358/1.16, 1.15, 358/442, 404, 444; 710/53, 100; 455/1, 10; 715/514; 713/200

(56) References Cited

U.S. PATENT DOCUMENTS

| | | | | | |
|---|---|---|---|---|---|
| 5,666,558 A | * | 9/1997 | Pipkins | ....................... | 395/851 |
| 5,671,445 A | * | 9/1997 | Gluyas et al. | ................ | 710/53 |
| 5,764,869 A | * | 6/1998 | Bagley et al. | ............. | 358/1.16 |
| 5,887,989 A | * | 3/1999 | Hannah | ....................... | 400/61 |
| 5,970,221 A | * | 10/1999 | Bolash et al. | ................ | 395/115 |
| 5,970,228 A | * | 10/1999 | Nezu | ........................... | 713/200 |
| 6,046,817 A | * | 4/2000 | Brown et al. | .............. | 358/1.16 |
| 6,094,530 A | * | 7/2000 | Bandewie | ................... | 395/704 |

* cited by examiner

Primary Examiner—Kimberly Williams
Assistant Examiner—Saeid Ebrahimi
(74) Attorney, Agent, or Firm—Fitzpatrick, Cella, Harper & Scinto

(57) ABSTRACT

In data transmission between a host device and a target device connected by a serial bus, when commands and data use the same register area, and only the transmission result of the data is to be returned, any command other than a data transmission command cannot be transmitted for a certain period because the receiving-side register becomes full. In this invention, when a response to a data transmission command from the host device is to be returned from the target device, the host device is notified of the situation of the data receiving buffer. The host device transmits a DUMMY command to the target device in accordance with the free buffer situation and transmits another command to the target device in accordance with the response from the target device. The target device sends a data retransmission request to the host device in accordance with the free buffer situation. The host device retransmits a data transmission command in accordance with the retransmission request and transmits another command to the target device in accordance with the response from the target device.

21 Claims, 67 Drawing Sheets

CROSS SECTION OF CABLE

EXCLUSIVE-OR SIGNAL BETWEEN Data AND Strobe

BRANCH : NODE WITH TWO OR MORE NODE CONNECTIONS

LEAF : NODE WITH SINGLE PORT CONNECTION

□ : PORT
c : PORT CORRESPONDING TO CHILD NODE
p : PORT CORRESPONDING TO PARENT NODE

FIG. 11
CSR CORE REGISTER

| OFFSET (hexadecimal) | REGISTER NAME | FUNCTION |
|---|---|---|
| 000 | STATE_CLEAR | INFORMATION ON STATUS AND CONTROL |
| 004 | STATE_SET | INFORMATION ON WRITE ENABLE/DISABLE STATUS OF STATE_CLEAR |
| 008 | NODE_IDS | BUS ID + NODE ID |
| 00C | RESET_START | TO RESET BUS BY WRITING INTO THIS AREA |
| 010~014 | INDIRECT_ADDRESS, INDIRECT_DATA | REGISTER TO ACCESS ROM AREA GREATER THAN 1KB |
| 018~01C | SPLIT_TIMEOUT | TIMER VALUE TO DETECT TIME-OUT OF SPLIT TRANSACTION |
| 020~02C | ARGUMENT, TEST_START, TEST_STATUS | REGISTER FOR DIAGNOSIS |
| 030~04C | UNITS_BASE, UNITS_BOUND, MEMORY_BASE, MEMORY_BOUND | NOT INSTALLED IN IEEE1394 |
| 050~054 | INTERRUPT_TARGET, INTERRUPT_MASK | REGISTER OF INTERRUPTION NOTIFICATION |
| 058~07C | CLOCK_VALUE, CLOCK_TICK_PERIOD, CLOCK_STOROBE_ARRIVED, CLOCK_INFO | NOT INSTALLED IN IEEE1394 |
| 080~0FC | MESSAGE_REQUEST, MESSAGE_RESPONSE | REGISTER FOR MESSAGE NOTIFICATION |
| 100~17C | | RESERVATION |
| 180~1FC | ERROR_LOG_BUFFER | TO RESERVE FOR IEEE1394 |

FIG. 12

SERIAL BUS REGISTER

| OFFSET (hexadecimal) | REGISTER NAME | FUNCTION |
|---|---|---|
| 200 | CYCLE_TIME | COUNTER FOR ISOCHRONOUS TRANSFER |
| 204 | BUS_TIME | REGISTER FOR TIME SYNCHRONIZATION |
| 208 | POWER_FAIL_IMMINENT | REGISTER RELATING TO POWER SUPPLY |
| 20C | POWER_SOURCE | |
| 210 | BUSY_TIMEOUT | TO CONTROL RETRY IN TRANSACTION LAYER |
| 214~218 | | RESERVATION |
| 21C | BUS_MANAGER_ID | NODE ID OF BUS MANAGER |
| 220 | BANDWIDTH_AVAILABLE | TO MANAGE ISOCHRONOUS TRANSFER BAND |
| 224~228 | CHANNELS_AVAILABLE | TO MANAGE CHANNEL NUMBER FOR ISOCHRONOUS TRANSFER |
| 22C | MAINT_CONTROL | REGISTER FOR DIAGNOSIS |
| 230 | MAINT_UTILITY | |
| 234~3FC | | RESERVATION |

FIG. 13

SERIAL-BUS NODE RESOURCE REGISTER

| OFFSET (hexadecimal) | REGISTER NAME | FUNCTION |
|---|---|---|
| 800~FFC | | RESERVATION |
| 1000~13FC | TOPOLOGY-MAP | INFORMATION ON SERIAL BUS STRUCTURE |
| 1400~1FFC | | RESERVATION |
| 2000~2FFC | SPEED-MAP | INFORMATION ON TRANSFER SPEED OF SERIAL BUS |
| 3000~FFFC | | RESERVATION |

FIG. 15

GENERAL FORMAT CONFIGURATION ROM

| LENGTH OF bus_info_block | LENGTH OF ROM | CRC |
|---|---|---|
| bus_info_block (ASCII CODE OF 1394 BUS AND INFORMATION ON WHETHER OR NOT NODE HAS CAPABILITIES OF ISOCHRONOUS RESOURCE MANAGEMENT, CYCLE MASTER, AND BUS MANAGEMENT) | | |
| root_directory (INDICATE VENDOR ID AND NODE FUNCTION) | | |
| unit_directories (INDICATE UNIT TYPE AND DRIVER SOFT VERSION) | | |
| root & unit_leaves | | |
| vendor_dependent_information | | |

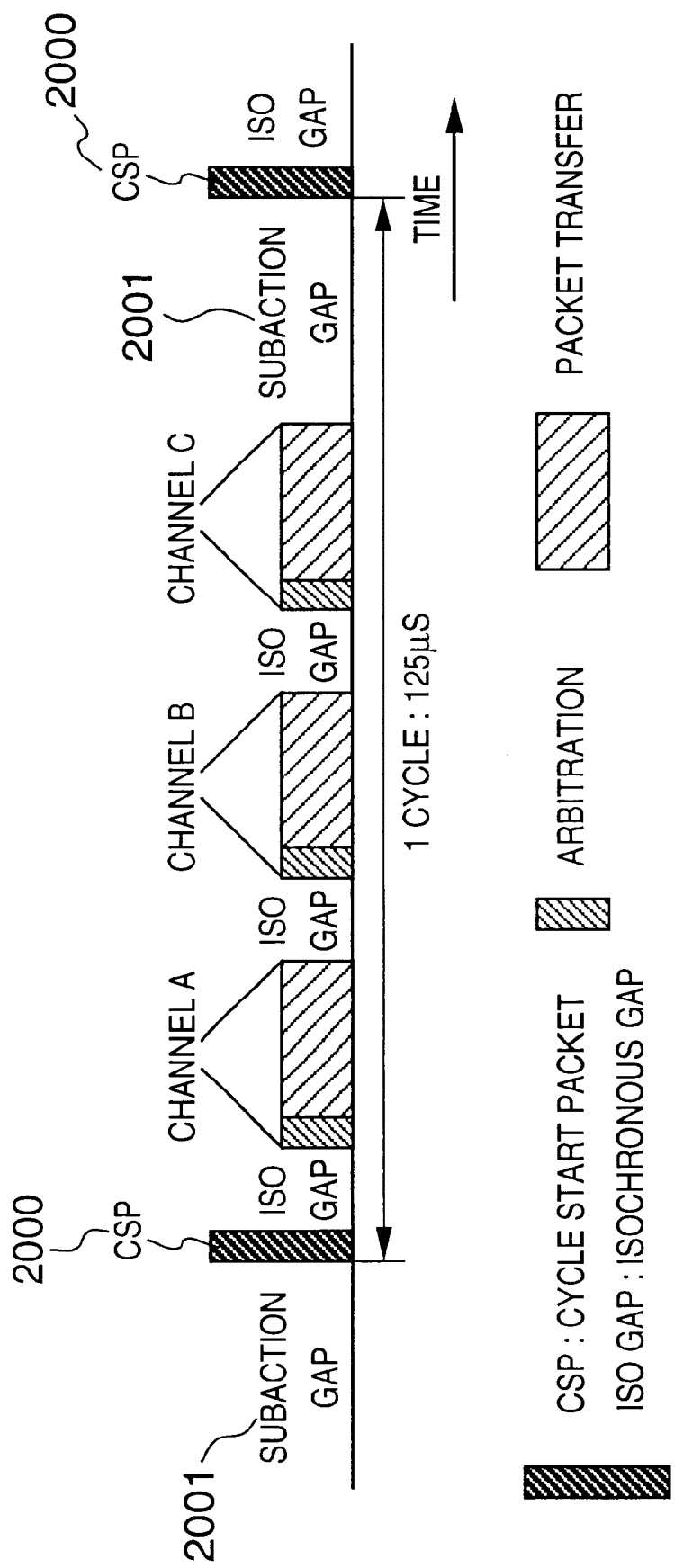

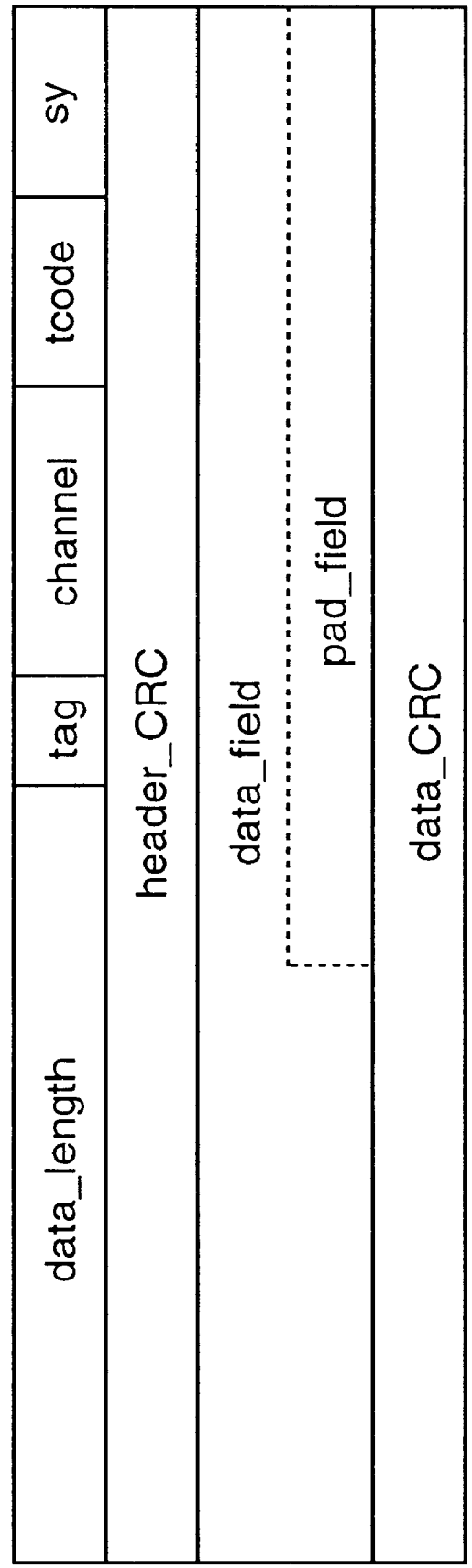
F I G. 26   ISOCHRONOUS DATA PACKET

FIG. 27

| ABBREVIATION | NAME | CONTENT |
|---|---|---|
| destination_ID | destination identifier | ID OF DESTINATION NODE (ASYNCHRONOUS ONLY) |
| tℓ | transaction label | LABEL INDICATING A SERIES OF TRANSACTIONS (ASYNCHRONOUS ONLY) |
| rt | retry code | CODE INDICATING RETRANSMISSION STATUS (ASYNCHRONOUS ONLY) |
| tcode | transaction code | CODE INDICATING PACKET TYPE (ASYNCHRONOUS ONLY) |
| pri | priority | PRIORITY ORDER (ASYNCHRONOUS ONLY) |
| source_ID | source identifier | SOURCE NODE (ASYNCHRONOUS ONLY) |
| destination_offset | destination memory address | MEMORY ADDRESS OF DESTINATION NODE (ASYNCHRONOUS ONLY) |
| rcode | response code | RESPONSE STATUS (ASYNCHRONOUS ONLY) |
| quadiet_data | quadiet(4bytes) data | 4-BYTE LENGTH DATA (ASYNCHRONOUS ONLY) |
| data_length | length of data | LENGTH OF data_field (EXCEPT pad bytes) |
| extended_tcode | extended transaction code | EXTENDED TRANSACTION CODE (ASYNCHRONOUS ONLY) |
| chanel | isochronous identifier | IDENTIFICATION OF ISOCHRONOUS PACKET |
| sy | synchronization code | SYNCHRONIZATION OF VIDEO IMAGE AND AUDIO INFORMATION |
| cycle_time_data | contents of the CYCLE_TIME register | CYCLE TIMER REGISTER VALUE OF CYCLE MASTER NODE (CYCLE PACKET ONLY) |
| data_field | data + pad bytes | DATA STORAGE (ISOCHRONOUS AND ASYNCHRONOUS) |
| header_CRC | CRC for header field | CRC FOR HEADER |
| data_CRC | CRC for data field | CRC FOR DATA |
| tag | tag label | ISOCHRONOUS PACKET FORMAT |

DUMMY command

CONTROL COMMAND
01h : BLOCK COMPLETE
02h : BLOCK DUMMY COMPLETE

DATA TRANSMISSION APPARATUS, SYSTEM AND METHOD, AND RECORDING MEDIUM

BACKGROUND OF THE INVENTION

This invention relates to a data transmission apparatus, system and method, and a recording medium, and more particularly, to a data transmission apparatus, system and method for directly connecting an image source device and image processing device by a serial interface defined by, e.g., the IEEE 1394 standards, and a recording medium.

Generally, a printer is connected to a personal computer (PC) as a host device by a parallel interface such as a Centronics interface or a serial interface such as RS232C interface.

A digital device as an image source device such as a scanner, digital still camera, or digital video camera is also connected to a PC. Image data captured by a digital device is temporarily stored in, e.g., a hard disk on the PC, processed and converted into print data for a printer by application software on the PC, and sent to the printer through the interface.

In such a system, the PC has independent driver software for controlling digital devices and printer. Image data output from a digital device is stored, by driver software, as a data format easy to use and display on the PC. The stored data is converted into print data by an image processing method considering the image characteristics of the input and output devices.

Today, a new interface such as an interface defined by the IEEE 1394 standards (to be referred to as "1394 serial bus" hereinafter) can directly connect an image source device to a printer. When an image source device and printer are directly connected by a 1394 serial bus, the FCP (Function Control Protocol) operand may contain print data. Additionally, data transmission using a 1394 serial bus may be performed by preparing a register area for data transmission and writing data in the register area.

Data transmission may be instructed by using a command for instructing the start of data transmission and a response to the command.

However, the above-described technique has the following problem. As described above, image data output from an image source device is converted into print data by a PC and printed by a printer. Even when an image source device and printer can be directly connected, image data cannot be appropriately printed without a PC. There are printers called video printers for directly printing image data output from digital video cameras. However, connection between only devices of specific types is possible. There is no versatile video printer capable of direct connection to a number of image source devices. That is, image data cannot be directly sent from an image source device to a printer and printed using the characteristic feature of a 1394 serial bus or the function of directly connecting devices.

With the above-described method of directly connecting an image source device to a printer by a 1394 serial bus and containing print data in the FCP operand, a control command and print data cannot be separated, and additionally, a command always requires a response, resulting in a decrease in transmission efficiency. When a register area is prepared for data transmission, processing of determining whether data can be written in the register area must be executed every time data is to be transmitted. This determination processing has a large overhead, resulting in a decrease in transmission efficiency.

To solve this problem, one register area may be used without separating data and commands. In this method, the number of register areas to be used can be decreased, and a simpler data transmission scheme can be provided. Alternatively, instead of determining whether data can be written in the register area, only a response of acknowledgement for the write may be returned, and when a response of acknowledgement is received, the next data may be transmitted.

These methods are advantageous in simplifying the data transmission procedure, although a buffer on the data receiving side, which has areas where data have been written, becomes full. When data is written in a register and stored in the buffer, the data receiving side immediately returns a response of data "reception enable". Upon receiving the response to "reception enable", the data transmitting side immediately starts transmitting the next data. If the processing speed on the data receiving side is lower than that on the data transmitting side, the buffer on the data receiving side is always full.

In this case, the data receiving side cannot return the response of "reception enable" to the data transmitting side after data is stored in the final free buffer area until processing progresses to assure a free buffer area. Since commands and data use the same register area, commands other than a data transmission command cannot be executed during execution of the data transmission command unless the data receiving side has no free buffer.

For, e.g., a printer as a data receiving side, a command for obtaining a printer status (paperout or printer error) can be or cannot be executed during data transmission depending on the situation. More specifically, when the printer has a free buffer and can receive a command for obtaining a status, the command can be executed. However, when no free buffer is present, the command cannot be executed or must wait until the buffer becomes free. This poses a problem when a status requiring real time processing is to be acquired. This makes it difficult to determine whether the acquired status is necessary at that time point.

In addition, after data transmission, responses to the transmission are returned at an almost constant short time interval. This increases the amount of data on the data bus, and the bus cannot be effectively used.

When data transmission is instructed using a command for instructing the start of data transmission and a response to the command, commands and responses are transmitted every time data in a certain unit is transmitted. This also decreases the transmission efficiency.

SUMMARY OF THE INVENTION

Accordingly, it is an object of the present invention to provide a data transmission apparatus, system, and method capable of arbitrarily executing a command other than data transmission when a host device and target device are connected by, e.g., a 1394 serial bus, the same register area is used for commands and data to be transmitted from the host device to the target device, and only a response for a data write in the register is returned, and a recording medium.

According to the present invention, the foregoing object is attained by providing a data transmission method comprising the steps of:

continuously transmitting first data from the host device to the target device in units of predetermined sizes;

returning a one-cycle transmission result of first data and buffer information associated with a data receiving buffer from the target device to the host device;

continuously transmitting second data from the host device to the target device on the basis of the buffer information while continuously transmitting the first data; and transmitting third data from the host device to the target device while continuously transmitting the second data.

The host device can obtain the data receiving buffer information in accordance with the response of first data transmission to the target device. When the second data is transmitted on the basis of the buffer information, the third data can be transmitted at an arbitrary timing while continuously transmitting the first data.

Further, the foregoing object is attained by providing a data transmission method comprising the steps of:

continuously transmitting first data from the host device to the target device in units of predetermined sizes;

returning a predetermined-number-of-cycle transmission result of first data and, as needed, a retransmission request for the first data from the target device to the host device;

retransmitting the first data from the host device to the target device on the basis of the retransmission request; and transmitting second data from the host device to the target device while retransmitting the first data.

The target device sends the retransmission request to the host device as needed. The host device retransmits the first data in accordance with the retransmission request, so the third data can be transmitted at an arbitrary timing while continuously retransmitting the first data.

And it is another object of the present invention to provide a data transmission apparatus, system, and method which increase the traffic efficiency on a data bus by adjusting the response time to data transmission, and a recording medium.

According to the present invention, the foregoing object is attained by further providing the steps of:

returning a one-cycle transmission result of the second data from the target device to said host device;

the third data is transmitted at a reception timing of the transmission result of the second data; and a time until the transmission result of the second data is returned in response to one-cycle transmission of the second data is longer than that in returning the transmission results of the first and third data.

With this arrangement, the frequency of second data transmission and reply can be suppressed, and the response time to the data write in the register can be adjusted.

The invention is particularly advantageous since, in data transmission from a host device to a target device which are connected by a 1394 serial bus or the like, when the same register area is used by commands and data, and only a response to the data write in the register is to be returned, a command other than data transmission can be arbitrarily executed.

At this time, the traffic efficiency on the data bus can be increased by adjusting the response time to data transmission.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 is a table showing functions of a CSR architecture of the 1394 serial bus;

FIG. 12 is a table showing registers for the 1394 serial bus;

FIG. 13 is a table showing registers for node resources of the 1394 serial bus;

FIG. 15 is an example of a general format of the configuration ROM of the 1394 serial bus;

FIG. 25 is a timing chart showing transitional statuses in isochronous data transfer;

FIG. 26 is an example of a packet format for the isochronous transfer;

FIG. 27 is a table showing the details of packet format fields for the isochronous transfer in a 1394 serial bus;

DETAILED DESCRIPTION OF THE PREFERRED EMBODIMENTS

Preferred embodiments of the present invention will now be described in detail in accordance with the accompanying drawings.

First Embodiment

Figure 1:
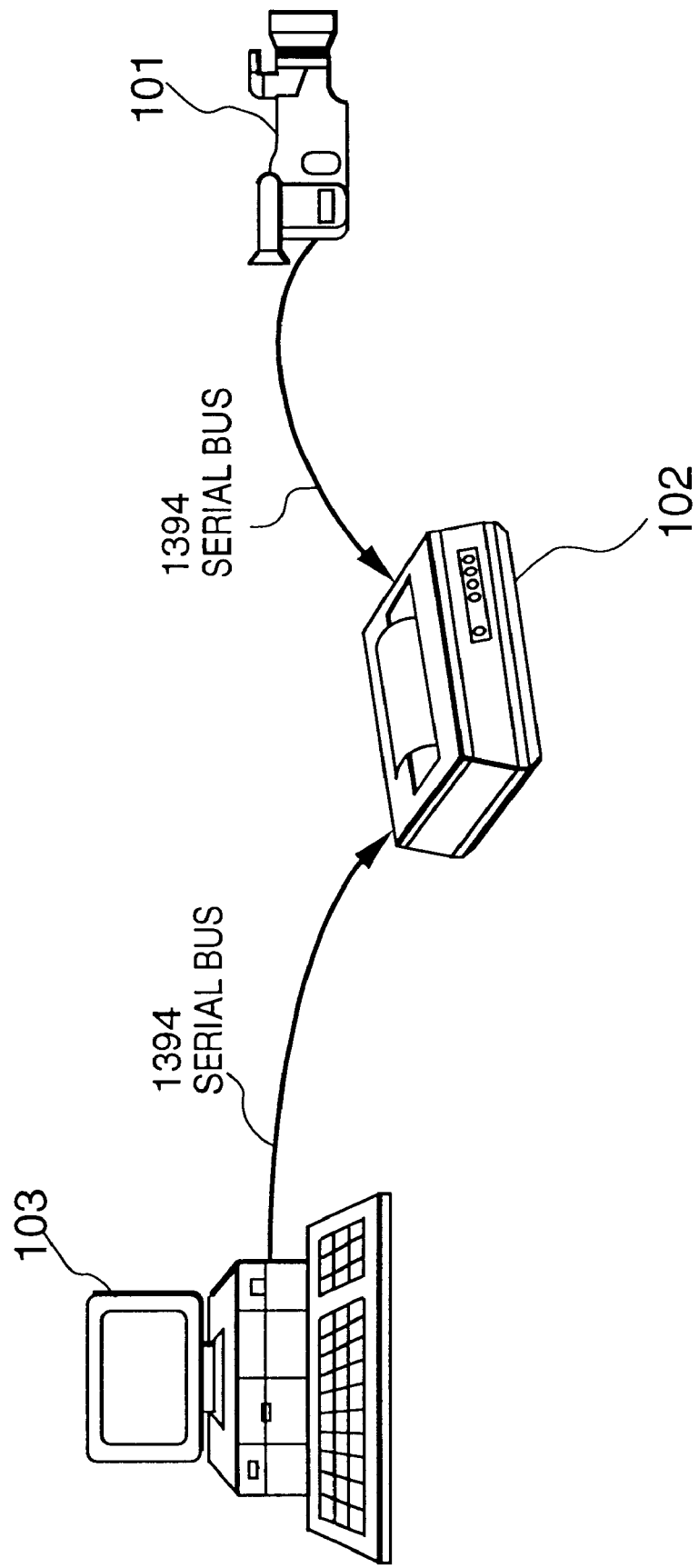
FIG. 1 is an explanatory view showing a general construction of a system to which the present invention is applied.

FIG. 1 shows an example of general construction of a system to which the present invention is applied, where a PC 103, a printer 102 and a digital video camera (DVC) 101 are connected via a 1394 serial bus. Then the outline of the 1394 serial bus will be described below.

Outline of 1394 Serial Bus

With the appearance of general digital video cam recorder (VCR) and digital video disk (DVD) player, there is a need for transferring realtime and large amount data such as video data and audio data (hereinafter referred to as "AV data"). To transfer AV data in realtime to a personal computer (PC) or other digital devices, an interface capable of high-speed data transfer is required. The 1394 serial bus has been developed from the above point.

Figure 2:
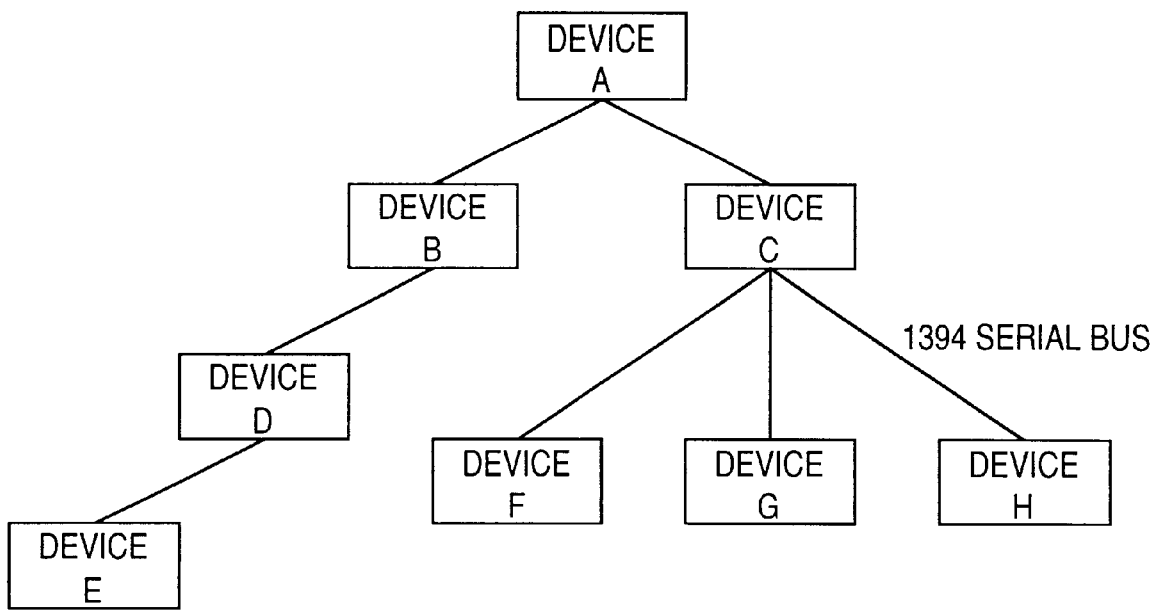
FIG. 2 is a block diagram showing an example of a network system constructed with an IEEE 1394 serial interface.

FIG. 2 shows an example of a network system constructed with a 1394 serial bus. This system comprises devices A to H, and the devices A and B, the devices A and C, the devices B and D, the devices D and E, the devices C and F, the devices C and G, and the device C and H are respectively connected by a twisted pair cable for the 1394 serial bus. These devices A to H may be computers such as a personal computer, or most computer-peripheral devices such as a digital VCR, a DVD player, a digital still camera, a storage device using a storage medium such as a hard disk or an optical disk, a monitor such as a CRT or an LDC, a tuner, an image scanner, a film scanner, a printer, a MODEM, and a terminal adapter (TA).

Note that the printing method of the printer may be any method, e.g., a laser-beam printing, an electrophotographic method using an LED, an ink-jet method, a thermal-transfer method of ink melting or ink sublimation type and a thermo-sensitive printing method.

The connection between the devices may be made by mixedly using a daisy chain method and a node branching method, thus realizing high-freedom of connecting.

The respective devices have an ID, and they construct a network by identifying each ID within a range connected by the 1394 serial bus. For example, the devices respectively take a relaying role only by daisy-chain connecting the devices with cables for the 1394 serial bus, thus constructing a network.

As the 1394 serial bus corresponds to Plug and Play function, it automatically recognizes a device connected to the cable, thus recognizes connection status. In the system as shown in FIG. 2, when a device is removed from the network, or a new device is added to the network, the bus is automatically reset (i.e., the current network constructing information is reset), and a new network is constructed. This function enables realtime setting and recognition of network construction.

The 1394 serial bus has a data transfer speed defined as 100/200/400 Mbps. A device having a high transfer speed supports a lower transfer speed, thus maintaining compatibility. As data transfer modes, an asynchronous transfer mode (ATM) for transferring asynchronous data such as a control signal, an isochronous transfer mode for transferring isochronous data such as realtime AV data are available. In data transfer, within each cycle (generally 125 μs/cycle), a cycle start packet (CSP) indicating the start of cycle is transferred, and then asynchronous and isochronous data are mixedly transferred such that the isochronous data transfer is transferred prior to the asynchronous data.

Figure 3:
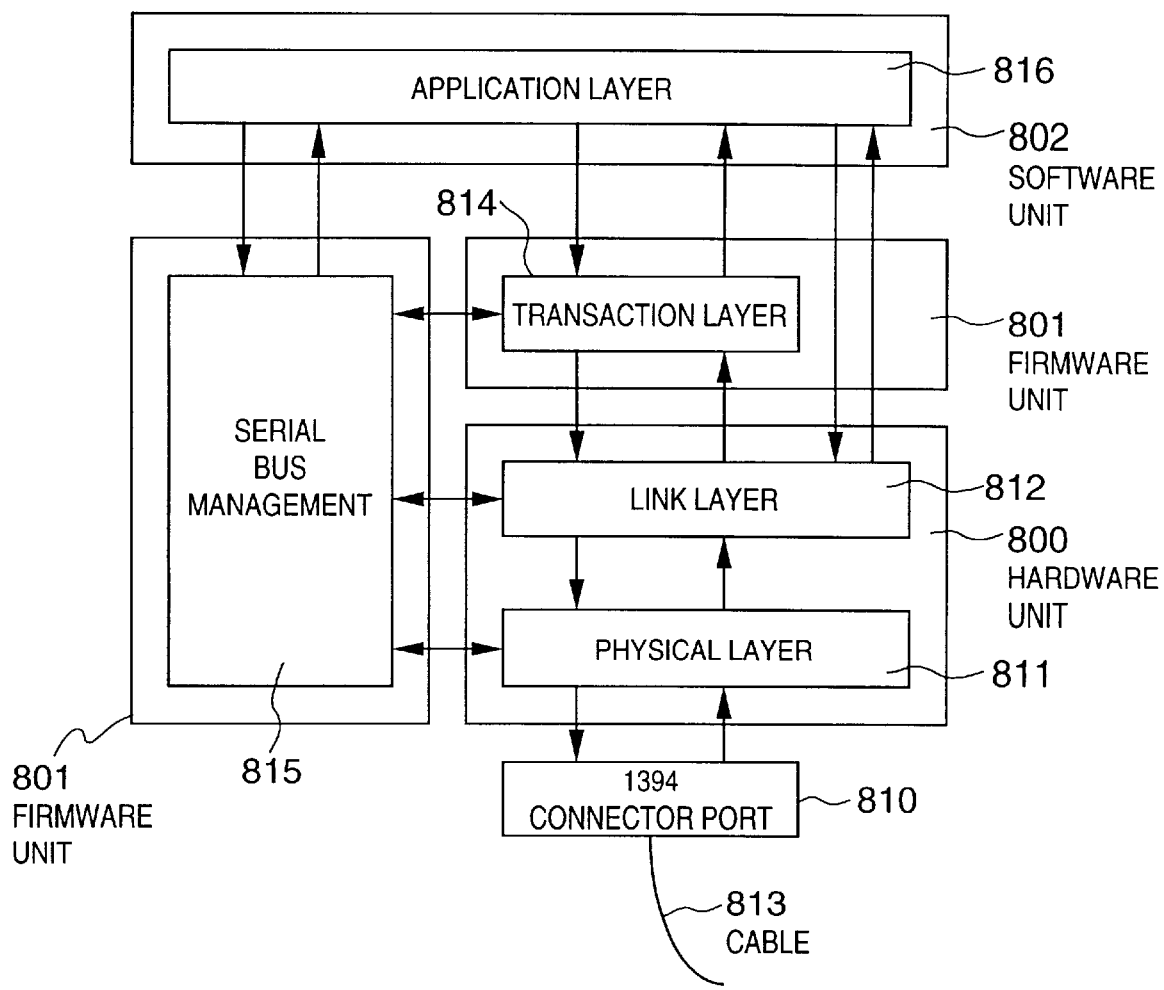
FIG. 3 is a block diagram showing the construction of the IEEE 1394 serial interface.

FIG. 3 shows the construction of the 1394 serial bus, as a layer structure. As shown in FIG. 3, a connector port 810 is connected to a connector at the end of a cable 813 for the 1394 serial bus. A physical layer 811 and a link layer 812 in a hardware unit 800 are positioned as upper layers with respect to the connector port 810. The hardware unit 800 comprises interface chips. The physical layer 811 performs coding, connection-related control and the like, and the link layer 812, packet transfer, cycle-time control and the like.

In a firmware unit 801, a transaction layer 814 manages data to be transferred (transaction data), and outputs commands Read, Write and Lock. A management layer 815 in the firmware unit 801 manages connection statuses and ID's of the respective devices connected to the 1394 serial bus, thus manages the network construction. The above hardware and firmware units substantially constructs the 1394 serial bus.

In a software unit 802, an application layer 816 differs in software used by the system, and the data transfer protocol indicating how to transfer data on the interface is defined by a protocol such as a printer protocol or an AVC protocol.

Figure 4:
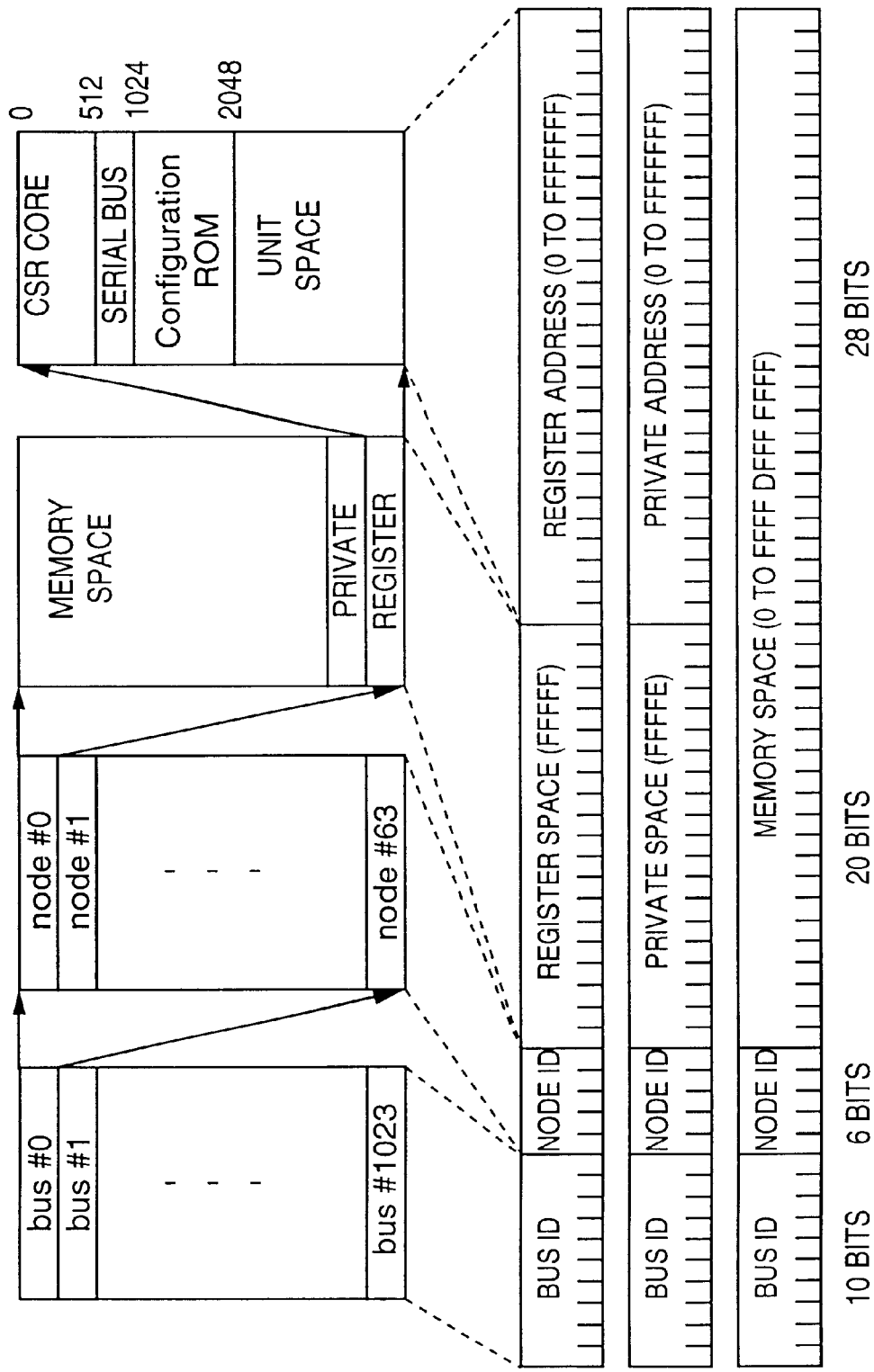
FIG. 4 is an explanatory view showing address space of the IEEE 1394 serial interface.

FIG. 4 shows address space of the 1394 serial bus. All the devices (nodes) connected to the 1394 serial bus have a unique 64 bit address. The 64 bit address is stored in a memory of the devices. Data communication with a designated destination device can be performed by always recognizing the node addresses of the transmitting- and receiving-side nodes.

Addressing of the 1394 serial bus is made based on the IEEE 1212 standards, such that first 10 bits are allocated for designating a bus number, then next 6 bits are allocated for designating an node ID.

48-bit address used in the respective devices are divided into 20 bits and 28 bits, and utilized in the unit of 256 Mbytes. In the initial 20-bit address space, "0" to "0xFFFFD" is called a memory space; "0xFFFFE", a private space; "0xFFFFF", a register space. The private space is an address freely used in the device. The register space, holding information common to the devices connected with the bus, is used for communication among the respective devices.

In the register space, the initial 512 bytes are assigned to a register core (CSR core) as a core of a Command/Status Register (CSR) architecture; the next 512 bytes, to a register of the serial bus; the next 1024 bytes, to a configuration ROM; and the remaining bytes, to a register unique to the device in a unit space.

Generally, for the sake of simplification of bus system design for different node types, it is preferable that only the initial 2048 bytes are used for the nodes, and as a result, total 4086 bytes are used including the initial 2048 bytes for the CSR core, the register of the serial bus, the configuration ROM and the unit space.

The 1394 serial bus has the construction as described above. Next, the features of the 1394 serial bus will be described in more detail.

Detail Description of 1394 Serial Bus

Electrical Specification of 1394 Serial Bus

Figure 5:
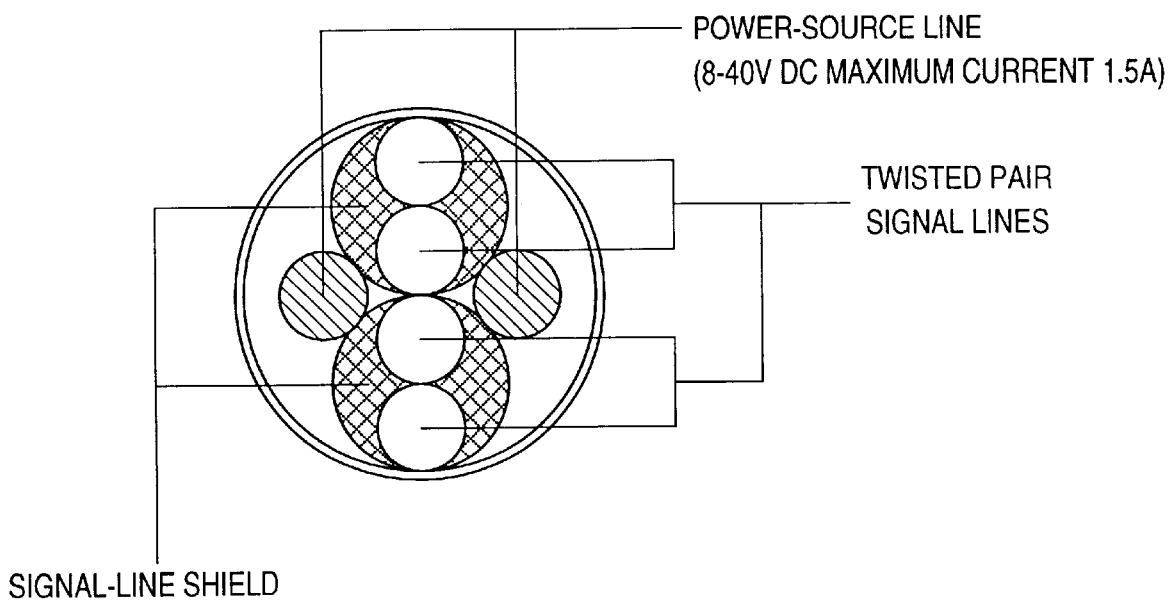
FIG. 5 is a cross-sectional view showing a cable for the IEEE 1394 serial interface.

FIG. 5 shows a cross-section of the cable of the 1394 serial bus. The 1394 serial cable comprises two sets of twisted pair signal lines and two power-source lines. This construction enables power supply to a device which lacks a power source, or a device where a voltage is degraded due to a failure or the like. The direct-current voltage supplied by the power-source lines is 8 to 40V; the current is maximum 1.5 A. Note that in the standards for so-called DV cable, four lines except the power-source line construct the cable.

DS-Link

Figure 6:
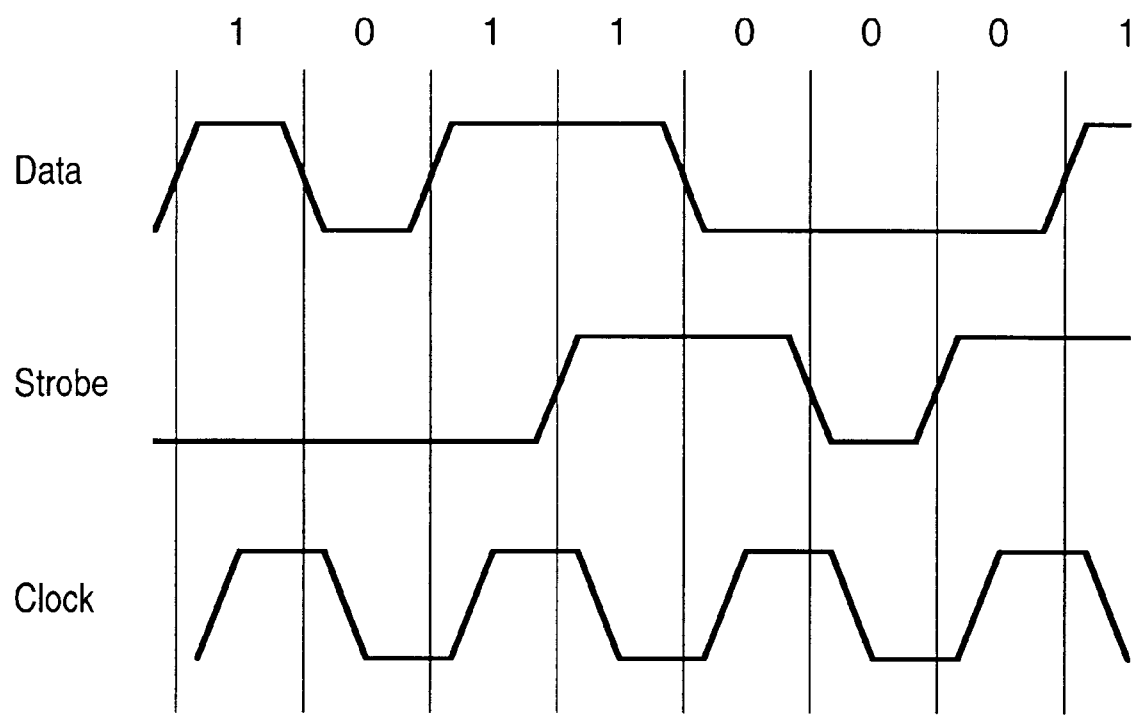
FIG. 6 is a timing chart explaining a Data/Strobe Link method.

FIG. 6 is a timing chart explaining a DS-Link (Data/Strobe-Link) method as a data transfer method.

The DS-Link method, appropriate for high-speed serial data communication, requires two sets of two signal lines. That is, one of the two sets of twisted-pair signal lines is used for sending a data signal, and the other one set of twisted-pair signal lines is used for sending a strobe signal. On the receiving side, an EXCLUSIVE-OR between the data signal and the strobe signal is obtained so as to generate a clock signal. In the DS-Link transfer, it is unnecessary to mix a clock signal into a data signal, therefore, transfer efficiency is higher than that in other serial-data transfer methods. Further, as a clock signal is generated from the data signal and the strobe signal, a phase locked loop (PLL) circuit can be omitted, which attains downsizing of the scale of a controller LSI. Further, in the DS-Link transfer, it is unnecessary to send information indicative of idle status when there is no data to be transferred, therefore, a transceiver of each device can be set in a sleep status, which reduces electric consumption.

Bus-Reset Sequence

The respective devices (nodes) connected to the 1394 serial bus are provided with a node ID, and are recognized as nodes constructing the network. For example, when increase/decrease of the number of nodes due to connection/disconnection or power ON/OFF status of network devices, i.e., network construction changes and it is necessary to recognize a new network construction, the respective nodes detect the change of network construction, send a bus-reset signal onto the bus, and enter a mode for recognizing the new network construction. The detection of change of network construction is made by detecting change of bias voltage at the connector port 810.

When the bus-reset signal is sent from one node, the physical layer 811 of the respective nodes receives the bus-reset signal, and at the same time, notifies the link layer 812 of the occurrence of bus reset, and forwards the bus-reset signal to the other nodes. When all the nodes have received the bus-reset signal, a bus-reset sequence is started. Note that the bus-reset sequence is started when the cable is attached/detached, or the hardware unit 800 has detected network abnormity or the like. Further, the bus-reset sequence is also started by a direct instruction to the physical layer 811 such as host control by a protocol. As the bus-reset sequence is started, data transfer is suspended during the bus reset, and after the bus reset, the data transfer is restarted in the new network construction.

Node-ID Determination Sequence

After the bus reset, the respective nodes start to obtain a node ID so as to construct a new network construction. A general sequence from the bus reset to node-ID determination will be described with reference to the flowcharts of FIGS. 7 to 9.

Figure 7:
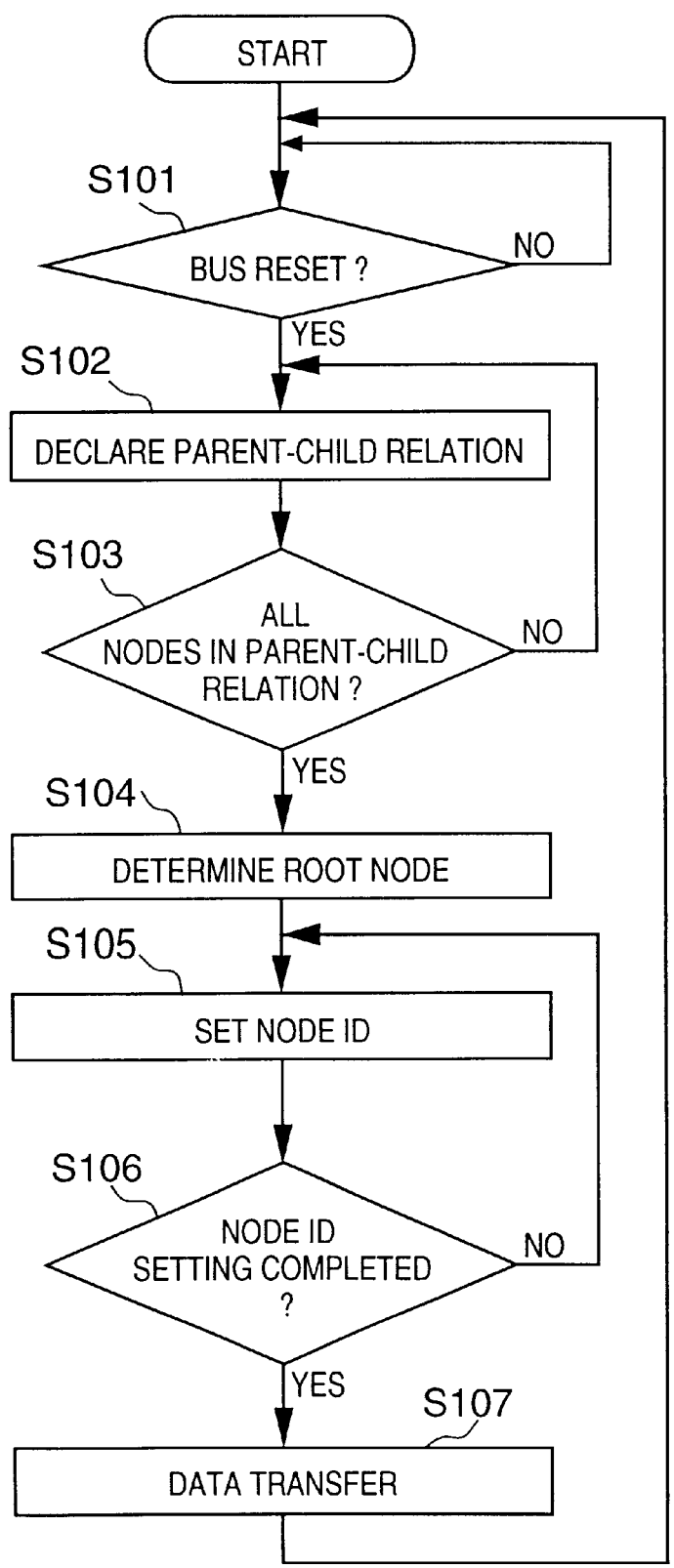
FIGS. 7 to 9 are flowcharts showing a procedure of network construction in the IEEE 1394 serial interface.

FIG. 7 is a flowchart showing a sequence from occurrence of bus-reset signal to node-ID determination and data transfer. At step S101, the respective nodes always monitor occurrence of bus-reset signal. When the bus-reset signal has occurred, the process proceeds to step S102, at which to obtain a new network construction in a state where the network construction has been reset, parent-child relation is declared between nodes connected to each other. Step S102 is repeated until it is determined at step S103 that the parent-child relation has been determined among all the nodes.

As the parent-child relation has been determined, the process proceeds to step S104, at which one "root (node)" is determined. At step S105, node-ID setting is performed so as to provide an ID to the respective nodes. The node-ID setting is made in a predetermined order of the nodes. Step S105 is repeated until it is determined at step S106 that the ID's have been given to all the nodes.

As the node-ID setting has been completed, since the new network construction has been recognized by all the nodes, data transfer among the nodes is possible. At step S107, data transfer is started, and the process returns to step S101, at which occurrence of bus-reset signal is monitored again.

Figure 8:
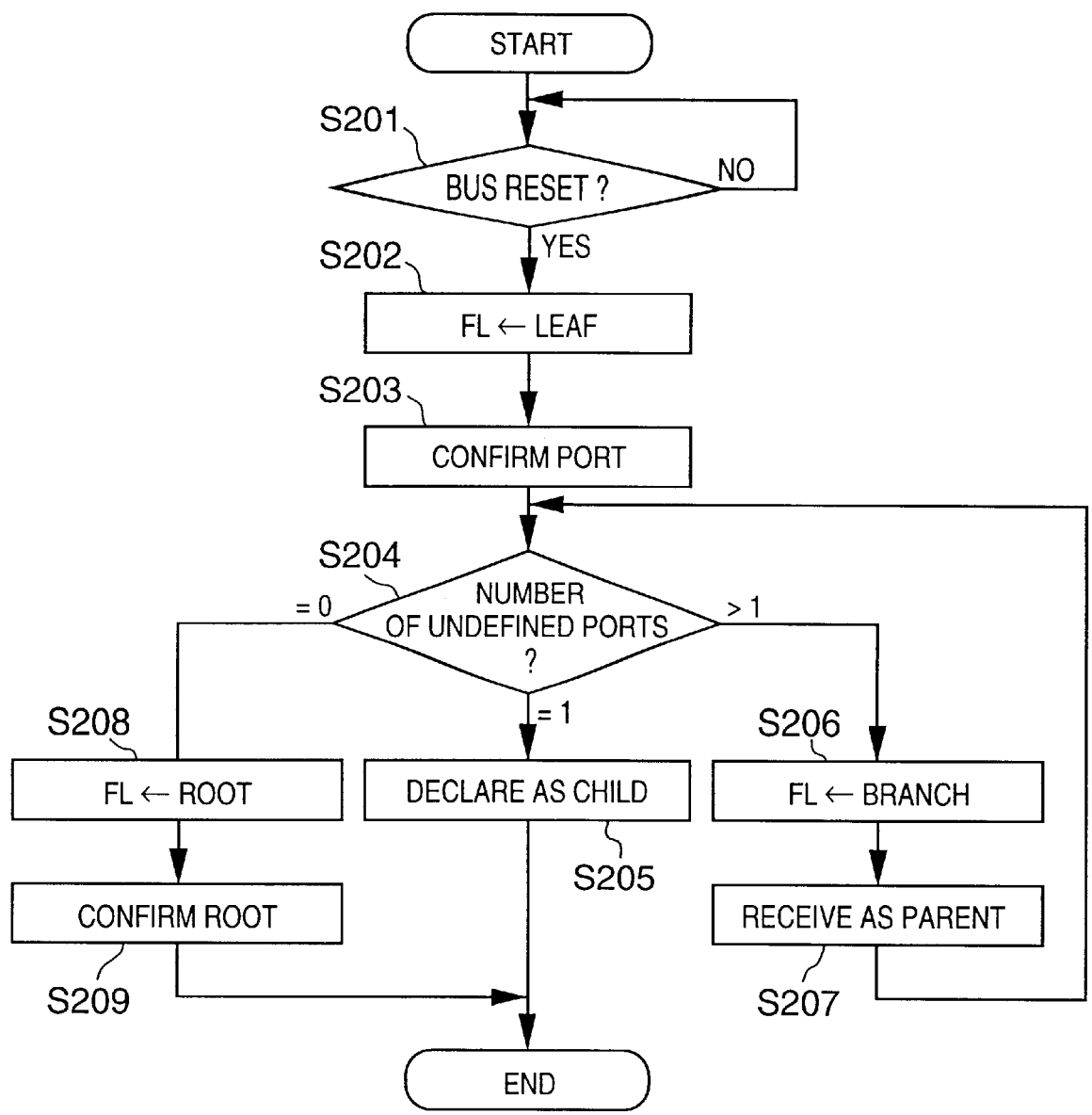
Figure 9:
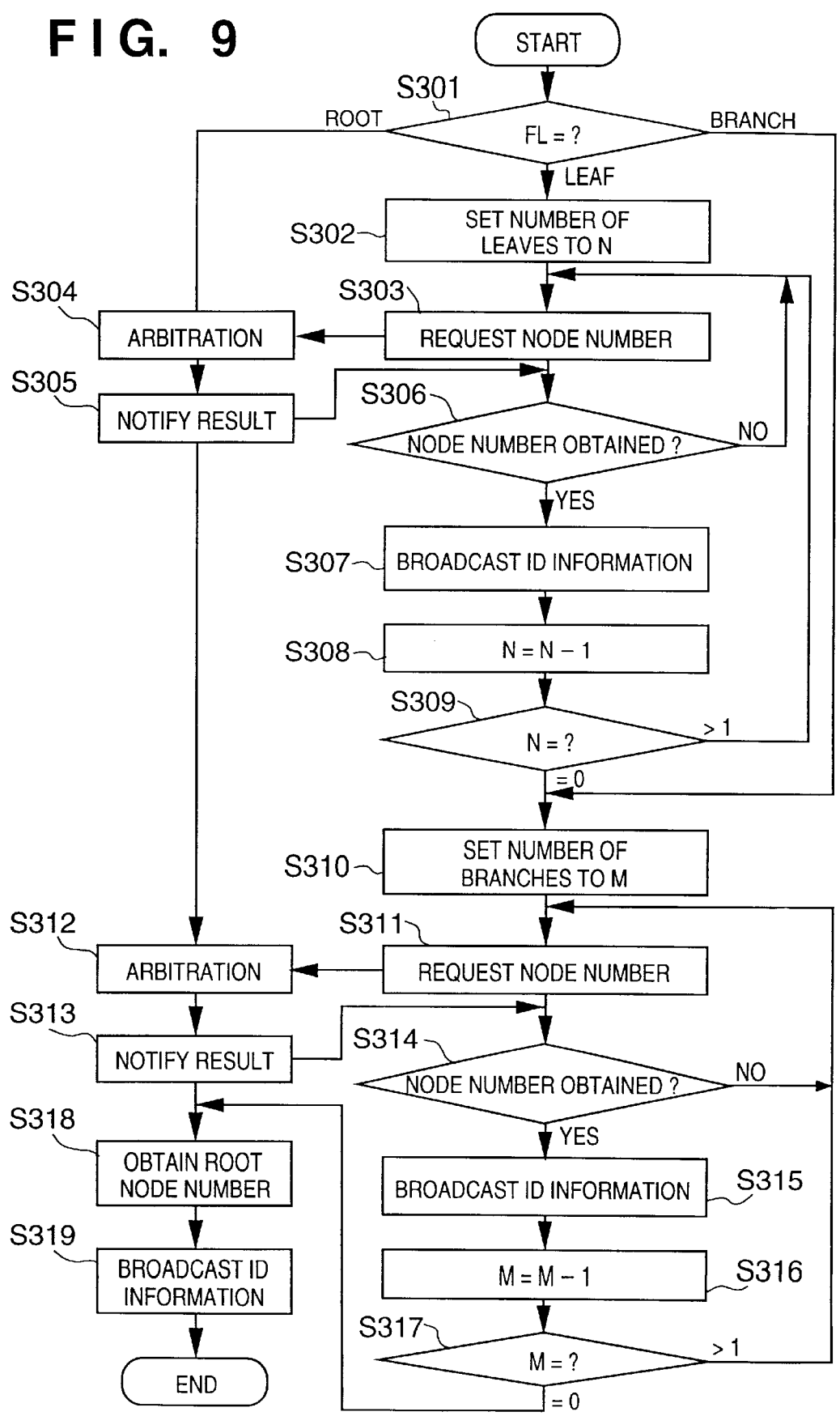

FIG. 8 is a flowchart showing the sequence from the monitoring of bus-reset signal (S101) to the root determination (S104) in detail. FIG. 9 is a flowchart showing the node-ID setting (S105 and S106) in detail.

In FIG. 8, at step S201, the occurrence of bus-reset signal is monitored, and as the bus-reset signal has occurred, the network construction is reset. Next, at step S202, as a first step for re-recognizing the reset network construction, the respective devices reset its flag FL with data indicative of "leaf (node)". At step S203, the respective devices examine the number of ports, i.e., the number of other nodes connected to them. At step S204, based on the result of examination at step S203, the devices examine the number of undefined (i.e., parent-child relation has not been determined) ports. The number of undefined ports is equal to that of the ports immediately after the bus reset, however, with the progress of determination of parent-child relation, the number of undefined ports detected at step S204 decreases.

Only actual leaf(ves) can declare parent-child relation immediately after the bus reset. Whether or not the node is a leaf is detected from the number of ports examined at step S203; i.e., if the number of ports is "1", the node is a leaf. The leaf declares that "this node is a child, and the connected node is a parent" at step S205, then terminates the operation.

On the other hand, a node that detected at step S203 that the number of ports is "two or more" is a "branch". Immediately after the bus reset, as "undefined ports>1" holds, the process proceeds to step S206, at which the flag FL is set with data indicative of "branch", then declaration of parent-child relation from another node is waited at step S207. When the parent-child relation is declared from another node, the process returns to step S204 at which the branch examines the number of undefined ports. If the number of undefined ports is "1", the branch can declare at step S205 that "this node is a child, and the connected node is a parent" to the node connected to the remaining port. If the number of undefined ports is still "two or more", the branch waits for declaration of parent-child relation from another node at step S207.

When any one of the branches (or exceptionally leaf(ves) which delayed declaring a child) detects that the number of undefined ports is "0", the parent-child declaration of the overall network has been completed. The only one node that has "0" undefined port, i.e., the parent of all the nodes, sets the flag FL with data indicative of a "root" at step S208. Then at step S209, the node is recognized as a root.

In this manner, the procedure from the bus reset to the parent-child declaration among all the nodes in the network ends.

Next, a procedure of providing each node with an ID will be described. First, the ID setting is performed at the leaves. Then, ID's are set in numerical order (from node number: 0) from leaves→branches→root.

In FIG. 9, at step S301, the process splits in accordance with node type, i.e., leaf, branch or root, based on the data set at the flags FL.

In case of leaf, at step S302, the number of leaves (natural number) in the network is set to a variable N. At step S303, the respective leaves request a node number to the root. If a plurality of requests have been made, the root performs arbitration at step S304, and provides a node number to one node at step S305, while notifies the other nodes of the result of acquisition of node-number indicating that the node number has been failed.

A leaf that has not obtained a node number (NO at step S306) repeats the request for node number at step S303. On the other hand, a leaf that has obtained a node number notifies all the nodes of the obtained node number by broadcasting ID information including the node number. As the broadcasting of the ID information has been completed, the variable N indicative of the number of leaves is decremented at step S308. Then, from the determination at step S309, the procedure from step S303 to step S308 is repeated until the variable N becomes "0"in the determination at step S309. When ID information on all the leaves have been broadcasted, the process proceeds to step S310, for setting ID's of branches.

The ID setting for branches is performed substantially similar to the ID setting for the leaves. First, at step S310, the number of branches (natural number) is set to a variable M. At step S311, the respective branches request the root for a node number. In response to the requests, the root performs arbitration at step S312, and provides a node number, subsequent to the last leaf node number, to a branch at step S313, while notifies the other branches of the result of acquisition of node-number indicating that the node number has been failed.

A branch that has not obtained a node number (NO at step S314) repeats the request for node number at step S315. On the other hand, a branch that has obtained a node number notifies all the nodes of the obtained node number by broadcasting ID information including the node number. As the broadcasting of the ID information has been completed, the variable M indicative of the number of branches is decremented at step S316. Then, from the determination at step S317, the procedure from step S311 to step S316 is repeated until the variable M becomes "0" in the determination at step S317. When ID information on all the leaves have been broadcasted, the process proceeds to step S318, for setting the ID of the root.

At this time, it is only the root that has not obtained a node ID. At step S318, the root obtains the smallest number that has not been provided to any other node as the node ID of the root, and at step S319, broadcasts ID information on the root.

As described above, the procedure until the node ID's for all the nodes have been set ends. Next, the sequence of node ID determination will be described with reference to the network example shown in FIG. 10.

Figure 10:
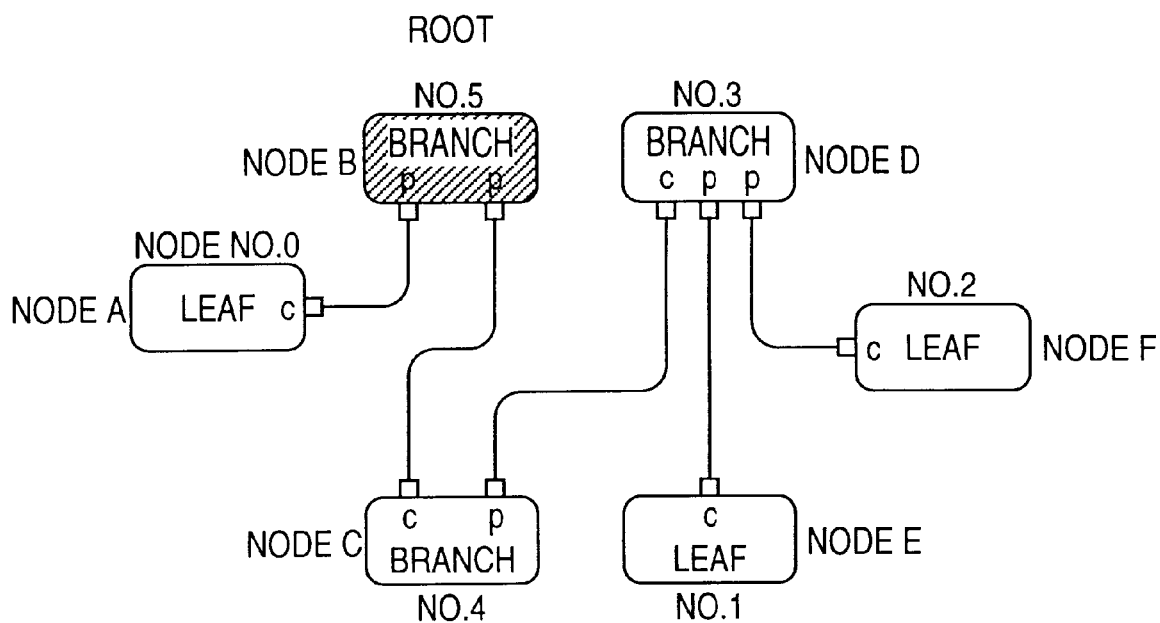
FIG. 10 is a block diagram showing an example of the network.

In the network in FIG. 10, a node B as a root is directly connected to its lower nodes A and C; the node C is directly connected to its lower node D; and the node D is directly connected to its lower nodes E and F. The procedure of determining this hierarchical structure, the root node and the node ID's will be described below.

After the bus reset has occurred, to recognize connection statuses of the respective nodes, parent-child relation is declared between ports of directly connected nodes. "parent" means a node at an upper level and "child" means a node at a lower level in the hierarchical structure. In FIG. 10, the node that first declared parent-child relation after the bus reset is the node A. As described above, nodes (leaves) where only one port is connected can start declaration of parent-child relation. That is, if the number of ports is "1", it is recognized that the node is the end of the network tree, i.e., a leaf. The declaration of parent-child relation is started from the leaf which has first taken action among these leaves. Thus, a port of the leaf node is set as a "child", while the port of another node connected to the leave node is set as a "parent". In this manner, "child-parent" relation is sequentially set between the nodes A and B, between the nodes E and D, and between the nodes F and D.

Further, among upper nodes having a plurality of ports, i.e., branches, parent-child relation is sequentially declared with respect to upper node(s), from the node that first received declaration of parent-child relation from the leaf. In FIG. 10, first parent-child relation is determined between the nodes D and E and between the nodes D and F. Then the node D declares parent-child relation with respect to the node C, and as a result, a relation "child-parent" is set between the nodes D and C. The node C, that has received the declaration of parent-child relation from the node D, declares parent-child relation with respect to the node B connected to the other port, thus "child-parent" relation is set between the nodes C and B.

In this manner, the hierarchical structure as shown in FIG. 10 is constructed. The node B, that has finally become the parent at all the ports, is determined as a root. Note that a network has only one root. In a case where the node B that has received declaration of parent-child relation from the node A immediately declares parent-child relation with respect to another node, the other node, e.g., the node C, may be the root node. That is, any node may be a root depending upon timing of transmitting declaration of parent-child relation, and further, even in a network maintaining the same construction, a particular node is not always become a root.

As the root has been determined, the sequence of determining the respective node ID's is started. Each node has a broadcast function to notify its ID information to all the other nodes. ID information includes a node number, information on a connected position, the number of ports, the number of ports connected to other nodes, information on parent-child relation on the respective ports and the like.

As described above, the assignment of node numbers is started from the leaves. In numerical order, node number=0, 1, 2, . . . is assigned. Then, by the broadcasting of ID information, it is recognized that the node number has been assigned.

As all the leaves have obtained a node number, node numbers are assigned to the branches. Similar to the assignment of node numbers to the leaves, ID information is broadcasted from the branch that received a node number, and finally, the root broadcasts its ID information. Accordingly, the root always has the greatest node number.

Thus, as the ID setting of the overall hierarchical structure has been completed and the network has been constructed, then the bus initialization is completed.

Control Information for Node Management

The CSR core as shown in FIG. 4 exists on the register as a basic function of the CSR architecture for node management. FIG. 11 shows the positions and functions of the registers. In FIG. 11, the offset is a relative position from "0xFFFFF0000000".

In the CSR architecture, the register for the serial bus is arranged from "0xFFFFF0000200". FIG. 12 shows the positions and functions of the registers.

Further, information on node resources of the serial bus is arranged from "0xFFFFF0000800". FIG. 13 shows the positions and functions of the registers.

Figure 14:
FIG. 14 is an example of a minimum format of a configuration ROM of the 1394 serial bus.

The CSR architecture has a configuration ROM for representing functions of the respective nodes. The configuration ROM has a minimum format and a general format, arranged from "0xFFFFF0000400". As shown in FIG. 14, the minimum format configuration ROM merely shows a vendor ID which is a unique numerical value represented by 24 bits.

As shown in FIG. 15, the general format configuration ROM has information on a node. In this case, the vendor ID in this format is included in a "root_directory". Further, "bus_info_block" and "root&unit_leaves" include unique device number including the vendor ID, represented by 64 bits. The device number is used after network reconstruction by bus reset operation, to continue recognition of the node.

Serial Bus Management

As shown in FIG. 3, the protocol of the 1394 serial bus comprises a physical layer 811, a link layer 812 and a transaction layer 814. This provides, as the serial bus management, a basic function for node management and bus resource management, based on the CSR architecture.

Only one node which performs bus management (hereinafter referred to as "bus management node") exists on the same bus, and provides the other nodes on the serial bus with management function which includes cycle master control, performance optimization, power source management, transmission speed management, construction management and the like.

The bus management function briefly divides into a bus manager, an isochronous resource manager and a node control function. The node control is a management function which enables communication among the nodes in the physical layer 811, the link layer 812, the link layer 812, the transaction layer 814 and an application program by the CSR. The isochronous resource manager, which is a management function necessary for isochronous-type data transfer on the serial bus, manages assignment of transfer bandwidth and channel number to isochronous data. For this management, after bus initialization, the bus management node is dynamically selected from nodes having the isochronous resource manager function.

Further, in a construction without a bus management node on the bus, a node having the isochronous resource manager function performs a part of the bus management such as the power source management and cycle master control. Further, the bus management is a management function as service to provide a bus control interface to an application program. The control interface uses a serial-bus control request (SB_CONTROL.request), a serial-bus event control confirmation (SB_CONTROL.confirmation) and a serial-bus event indication (SB_EVENT.indication).

The serial-bus control request is used when an application program requires the bus management node to perform bus reset, bus initialization, representation of bus-status information, and the like. The serial-bus event control confirmation is the result of the serial-bus control request, and is notified from the bus management node to the application for confirmation. The serial-bus event control confirmation is made as notification of an synchronously-caused event from the bus management node to the application.

Data Transfer Protocol

The data transfer by using the 1394 serial bus simultaneously sends isochronous data (isochronous packet) which must be periodically transmitted, and asynchronous data (asynchronous packet) which can be transmitted/received at arbitrary timing, further, ensures real-time transmission of isochronous data. In the data transfer, a bus use right is requested prior to transfer, and bus arbitration is performed to obtain bus use permission.

In the asynchronous transfer, a transmitting node ID and a receiving node ID are sent with transfer data as packet data. The receiving node confirms the receiving node ID, i.e., its node ID, receives the packet, and returns an acknowledge signal to the transmitting node. Thus, one transaction is completed.

In the isochronous transfer, a transmitting node requires an isochronous channel with a transmission speed, and a channel ID is sent with transfer data as packet data. A receiving node confirms a desired channel ID and receives the data packet. The necessary channel number and transmission speed are determined by the application layer 816.

These transfer protocols are defined by the physical layer 811, the link layer 812 and the transaction layer 813. The physical layer 811 performs physical and electrical interface with the bus, automatic recognition of node connection, bus arbitration for a bus use right among nodes, and the like. The link layer 812 performs addressing, data checking, packet transmission/reception and cycle control for isochronous transfer. The transaction layer 814 performs processing relating to asynchronous data. Hereinbelow, the processings in the respective layers will be described.

Physical Layer

The bus arbitration in the physical layer 811 will be described.

The 1394 serial bus always performs arbitration of bus use right prior to data transfer. The devices connected to the 1394 serial bus respectively relay a signal transferred on the network, thus constructing a logical bus-type network transmitting the signal to all the devices within the network. This necessitates bus arbitration to avoid packet conflict. As a result of bus arbitration, one node can transfer data during a certain period.

Figure 16:
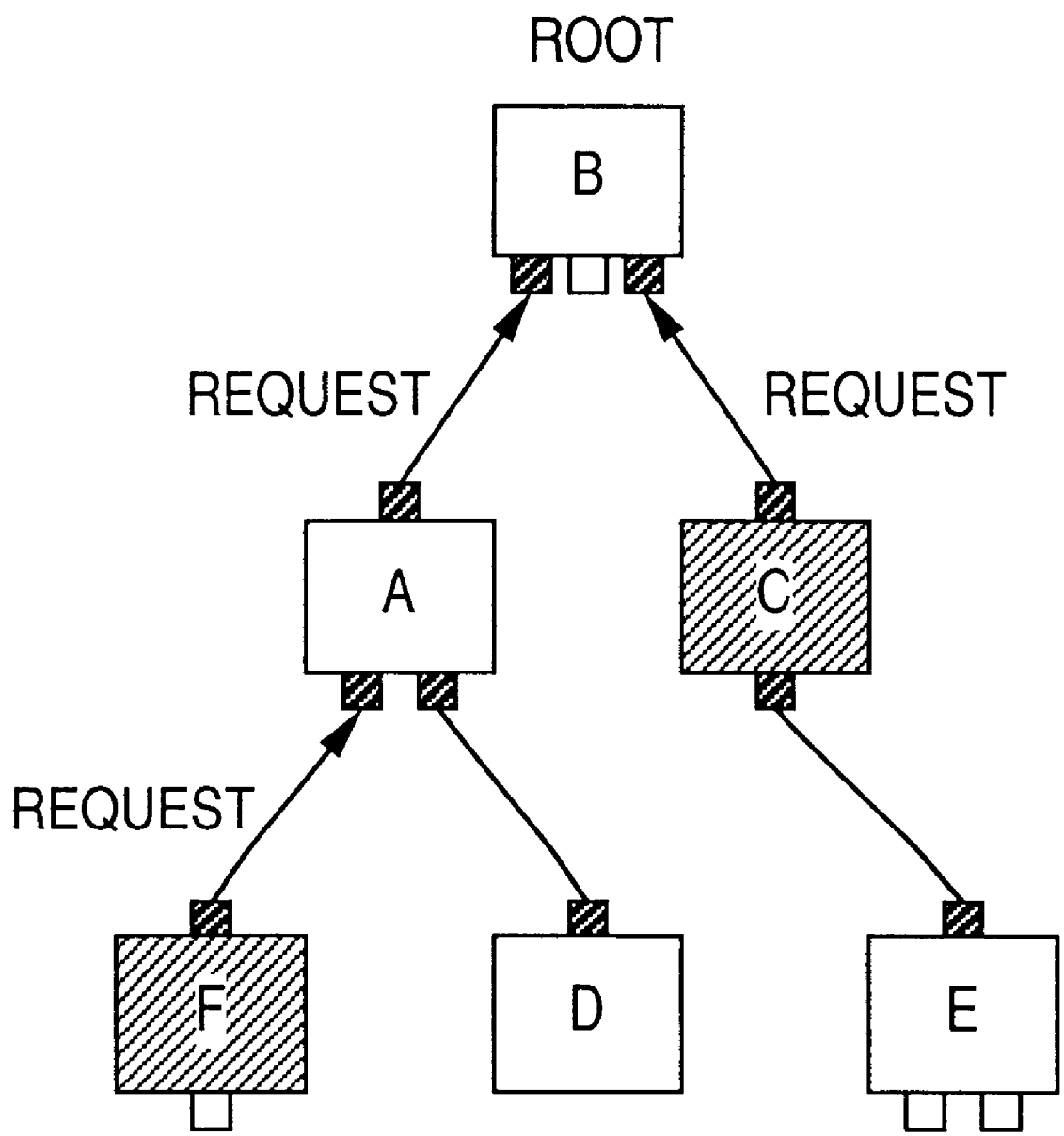
FIG. 16 is a block diagram explaining bus arbitration.
Figure 17:
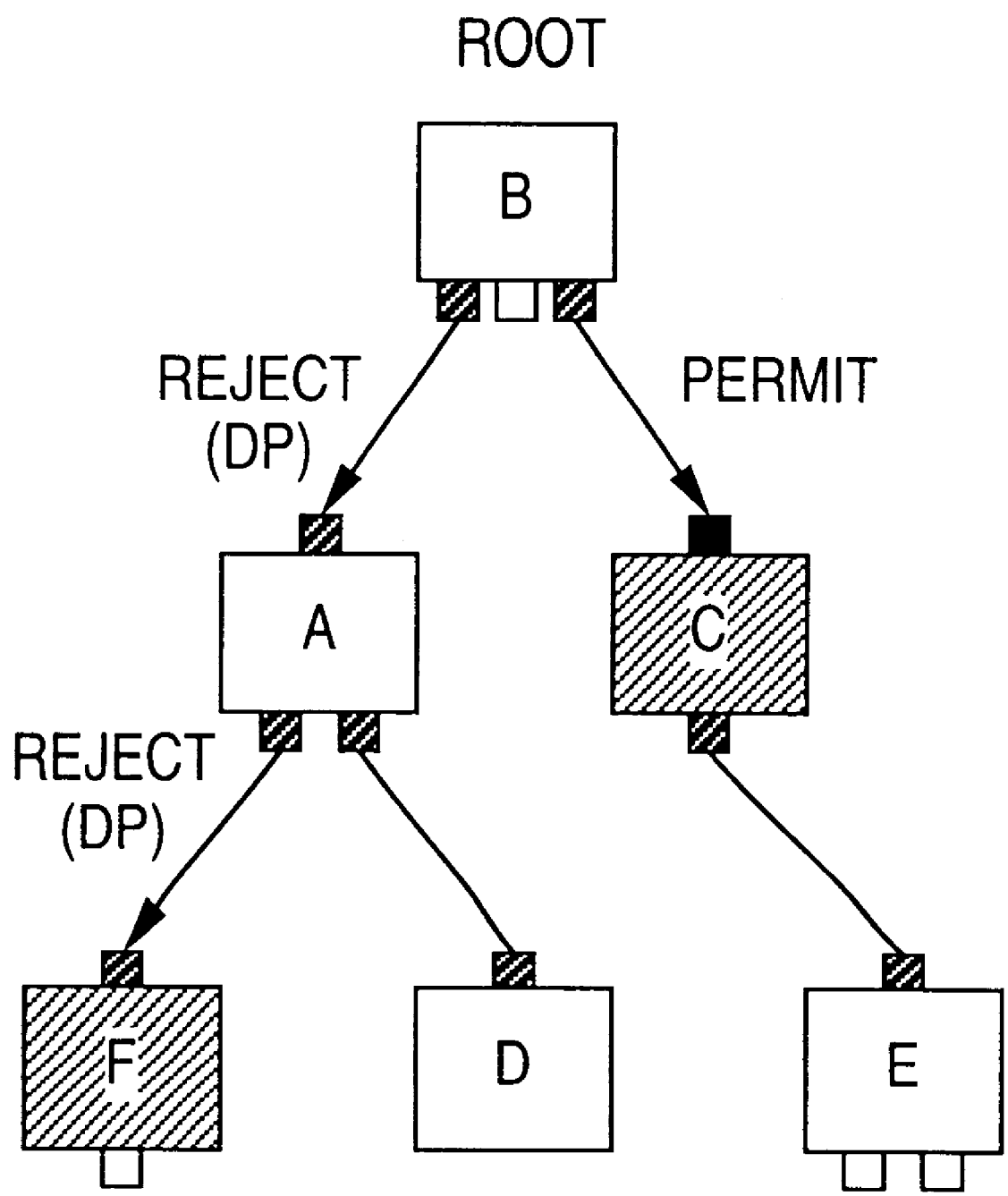
FIG. 17 is a block diagram explaining bus arbitration.

FIGS. 16 and 17 are block diagrams explaining the bus arbitration. FIG. 16 shows operation to request a bus use right; and FIG. 17, operation to allow to use the bus.

When the bus arbitration is started, a single or plurality of nodes respectively request a bus use right to use the bus to its parent node. In FIG. 16, the nodes C and F request a bus use right. The parent node (node A in FIG. 16) that has received the request relays the request by further requesting a bus use right to its parent node. The request is forwarded to a root (node B in FIG. 16) that finally performs arbitration.

The root that has received the request for bus use right determines a node to be provided with the bus use right. This arbitration can be performed only by the root. The node that dominated in the arbitration is provided with the bus use right. FIG. 17 shows that the node C has obtained the bus use right and the request from the node F has been rejected.

The root sends a DP (data prefix) packet to nodes lost in the bus arbitration so as to notify that their requests have been rejected. The requests from those nodes are held by the next bus arbitration.

Thus, the node that obtained the bus use permission starts data transfer.

Figure 18:
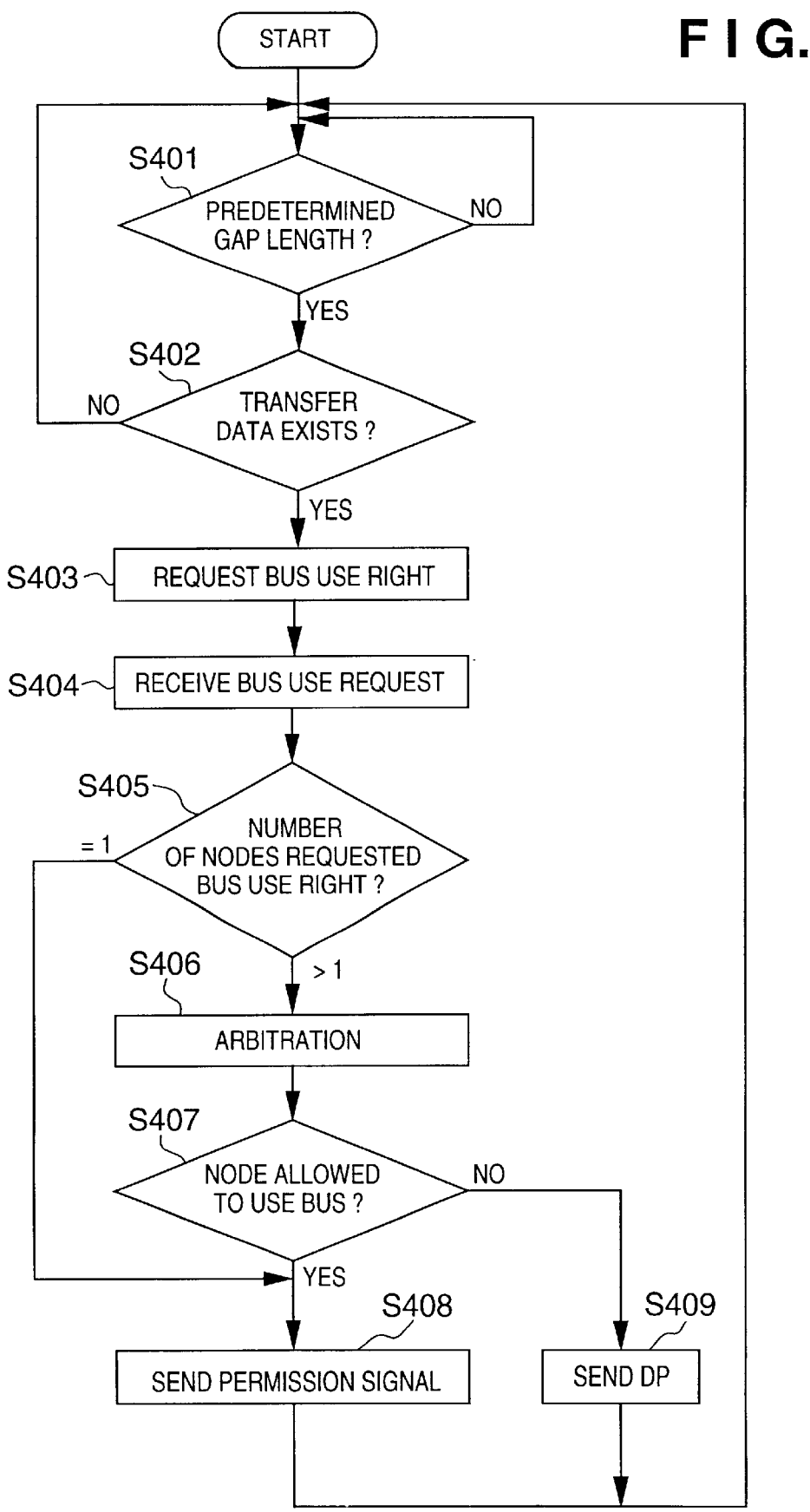
FIG. 18 is a flowchart showing a procedure of the bus arbitration.

The sequence of the bus arbitration will be described with reference to the flowchart of FIG. 18.

To start data transfer by a node, the bus must be in idle status. To confirm that data transfer has been completed and the bus is currently in idle status, each node detects a gap length of a predetermined idle period (e.g., sub-action gap) set in each transfer mode, and it determines whether or not the bus is currently in idle status based on the detection result.

At step S401, the node determines whether or not a predetermined gap length corresponding to asynchronous data or isochronous data to be transferred has been detected. So far as the node has not detected the predetermined gap length, it cannot request a bus use right to start data transfer, accordingly, the node waits until the predetermined gap length has been detected.

When the predetermined gap length has been detected at step S401, the node determines whether or not there is data to be transferred at step S402. If YES, it issues a signal requesting a bus use right to the root at step S403. As shown in FIG. 16, this signal requesting the bus use right is relayed by the respective devices in the network, and forwarded to the root. If it is determined at step S402 that there is no data to be transferred, the process returns to step S401.

At step S404, if the root has received a single or plurality of request signals for the bus use right, it examines the number of nodes requesting the bus use right at step S405. From the determination at step S405, if the number of the nodes requested the bus use right is one, that node is provided with bus use permission immediately after the requirement. On the other hand, if the number of the nodes is more than one, arbitration is performed to determine one node to be provided with the bus use right immediately after the requirement. The arbitration does not always provide a bus use right to the same node, but equally provides a bus use right to the respective nodes (fair arbitration).

The processing at the root branches at step S407 into processing for the node dominated in the arbitration at step S406, and processing for the other nodes lost in the arbitration. In a case where there is one node that requested the bus use right, or one node has dominated in the arbitration, the node is provided with an permission signal indicative of bus use permission at step S408. The node starts data (packet) transfer immediately after it receives the permission signal (step S410). On the other hand, the nodes lost in the arbitration receive a DP (data prefix) packet indicative of rejection of the bus use request at step S409. The processing for the node that received the DP packet returns to step S401 to request a bus use right again. Also, the processing for the node that completed data transfer at step S410 returns to step S401.

Transaction Layer

The transaction layer includes a read transaction, a write transaction and a lock transaction.

In a read transaction, an initiator (requiring node) reads data from a specific address in the memory of a target (response node). In a write transaction, the initiator writes data into a specific address of the memory of the target. In a lock transaction, the initiator transfers reference data and update data to the target. The reference data is combined with data of the address of the target, into a designation address to specify a specific address of the target. Data at the designation address is updated by the update data.

Figure 19:
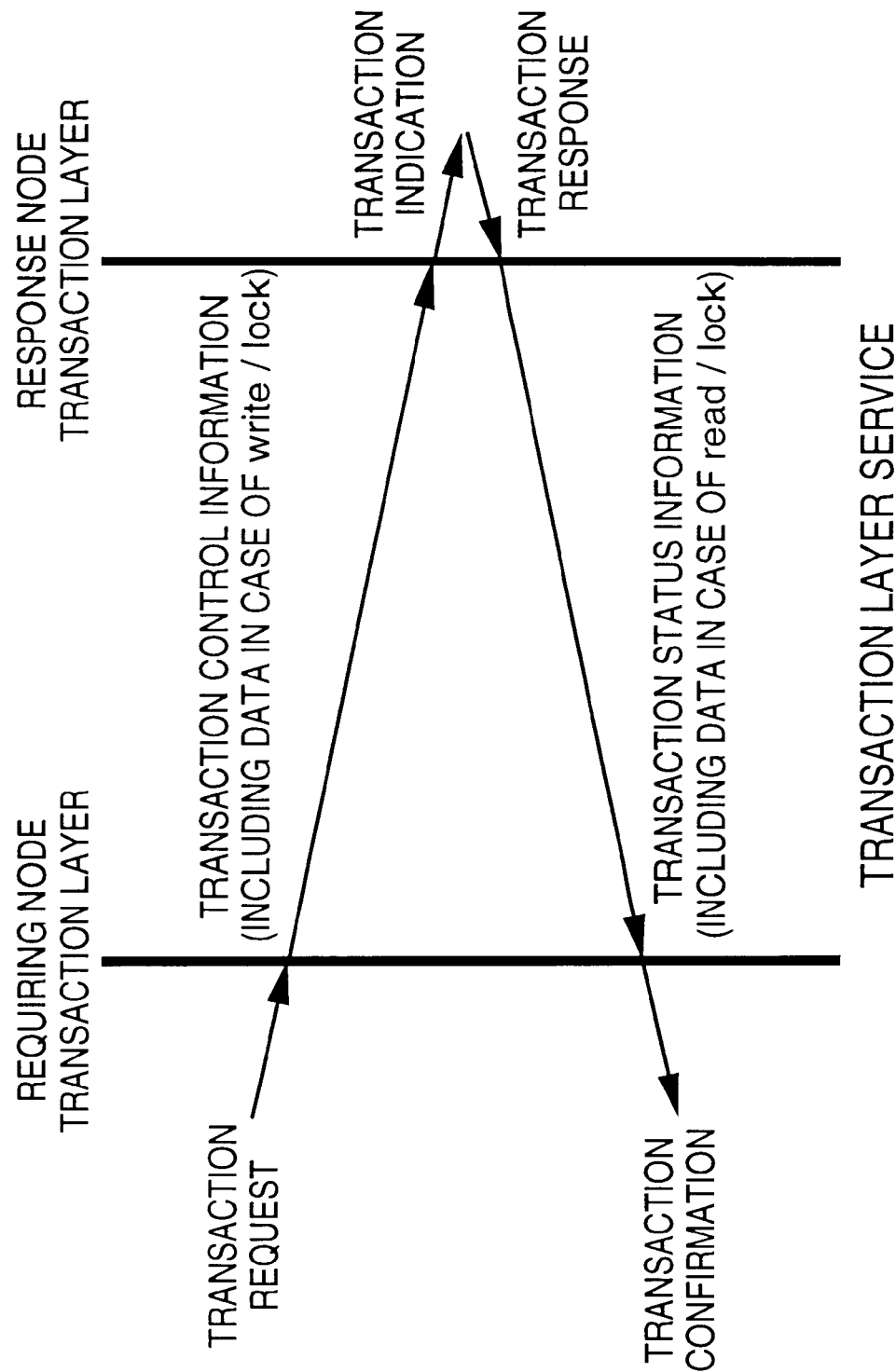
FIG. 19 is a timing chart showing a request-response protocol with read, write and lock commands, based on the CSR architecture in a transaction layer.

FIG. 19 shows a request-response protocol with read, write and lock commands, based on the CSR architecture in the transaction layer. In FIG. 19, the request, notification, response and confirmation are service units in the transaction layer 814.

A transaction request (TR_DATA.request) is packet transfer to a response node; a transaction indication (TR-DATA.indication) is notification of arrival of the request to the response node; a transaction response (TR_DATA.response) is transmission of acknowledgment; and a transaction confirmation (TR_DATA.confirmation) is reception of acknowledgment.

Link Layer

Figure 20:
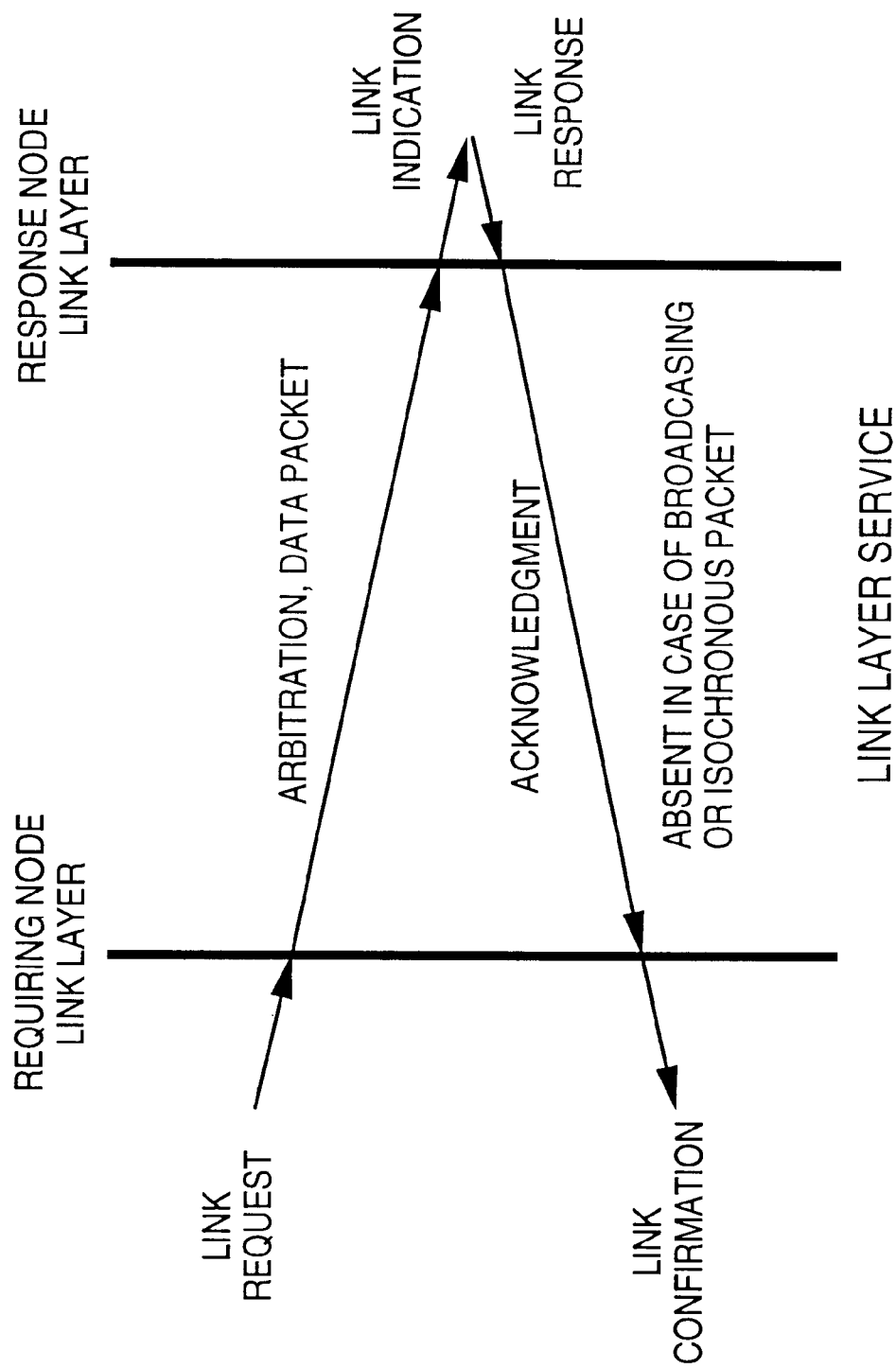
FIG. 20 is a timing chart showing services in a link layer.

FIG. 20 shows services in the link layer 812. The services are service units of a link request (LK_DATA.request) to require packet transfer from the response node, a link indication (LK_DATA.indication) indicating packet reception to the response node, a link response (LK_DATA.response) as acknowledgment transmitted from the response node, a link confirmation (LK_DATA.confirmation) as confirmation of the acknowledgment transmitted from the response node. One packet transfer process is called a sub-action including an asynchronous sub-action and an isochronous sub-action. Hereinbelow, the respective operations of the sub-actions will be described.

Asynchronous Sub-action

The asynchronous sub-action is asynchronous data transfer.

Figure 21:
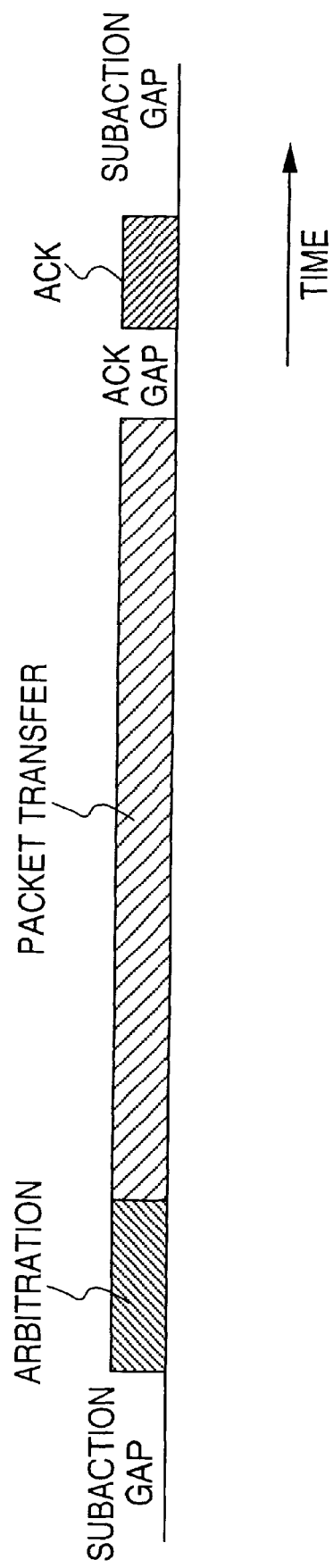
FIG. 21 is a timing chart showing transitional statuses in asynchronous data transfer.

FIG. 21 shows transition in the asynchronous transfer. In FIG. 21, the first sub-action gap represents the idle status of the bus. At a point where the idle time has become a predetermined value, a node which is to perform data transfer requests a bus use right, then bus arbitration is executed.

When the use of bus has been allowed by the arbitration, data in the form of packet is transferred, and a node which receives the data sends a reception acknowledgment code ACK as a response, or sends a response packet after a short gap called ACK gap, thus the data transfer is completed. The code ACK comprises 4-bit information and a 4-bit checksum. The code ACK, including information indicative of success, busy or pending status, is immediately sent to the data-sender node.

Figure 22:
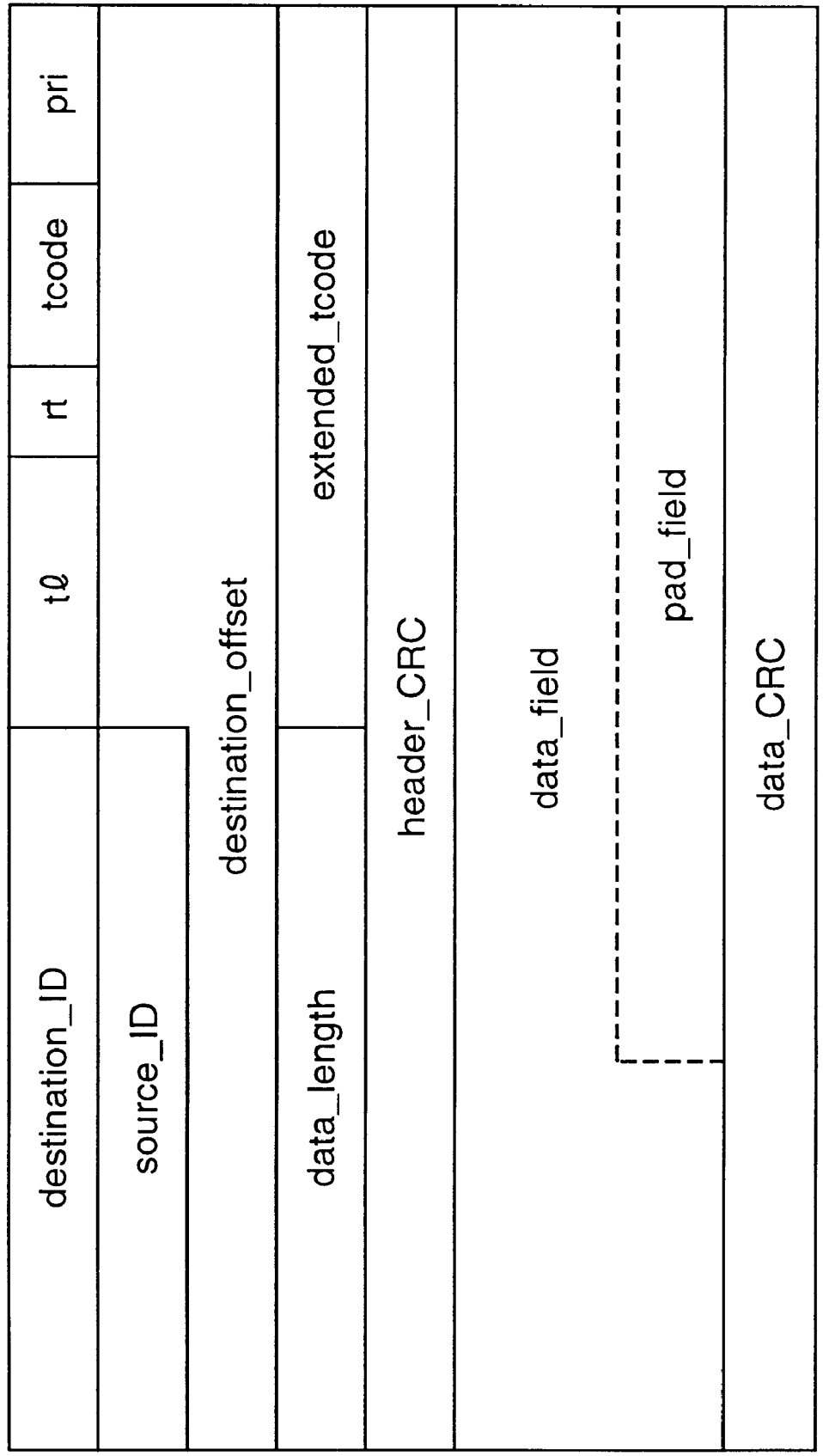
FIG. 22 is a diagram showing a packet format for the asynchronous transfer.

FIG. 22 shows a packet format for asynchronous transfer. The packet has a data area, a data CRC area for error correction, and a header area in which a destination node ID, a source node ID, a transfer data length and various codes are written.

The asynchronous transfer is one-to-one communication from a sender node to a receiver node. A packet sent from the sender node is relayed by the respective nodes in the network, however, as these nodes are not designated as the receiver of the packet, they ignore the packet, then only the receiver node designated by the sender node receives the packet.

Split Transaction

The services in the transaction layer 814 are performed as a set of transaction request and transaction response, as shown in FIG. 19. If the processings in the link layer 812 and the transaction layer 814 of the target (response node) are performed at a sufficiently high speed, the request and the response are not performed as independent sub-actions but as one sub-action in the link layer 812. However, if the processing speed of the target is low, the request and the response must be processed by independent sub-actions. This is called a split transaction.

Figure 23:
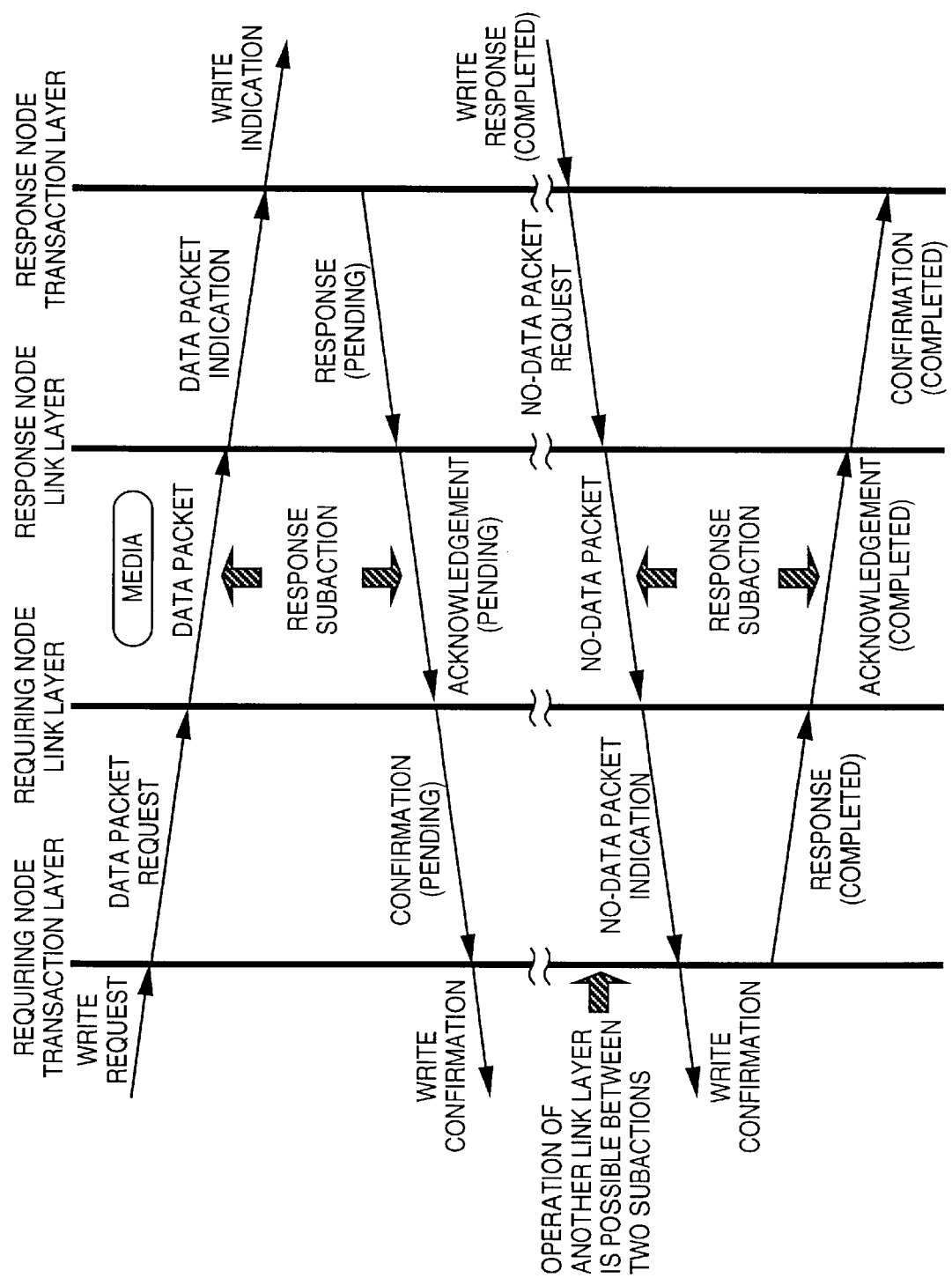
FIG. 23 is a timing chart showing an operation example of a split transaction.

FIG. 23 shows an operation example of the split transaction. In FIG. 23, in response to a write request from a controller as an initiator (requiring node), a target returns a pending. The target returns confirmation information to the write request from the controller, thus gains time for data processing. When a sufficient period for the data processing has elapsed, the target sends a write response to the controller, thus completes the write transaction. Note that another node can perform the operation of the link layer 812 between the request and response sub-actions.

Figure 24:
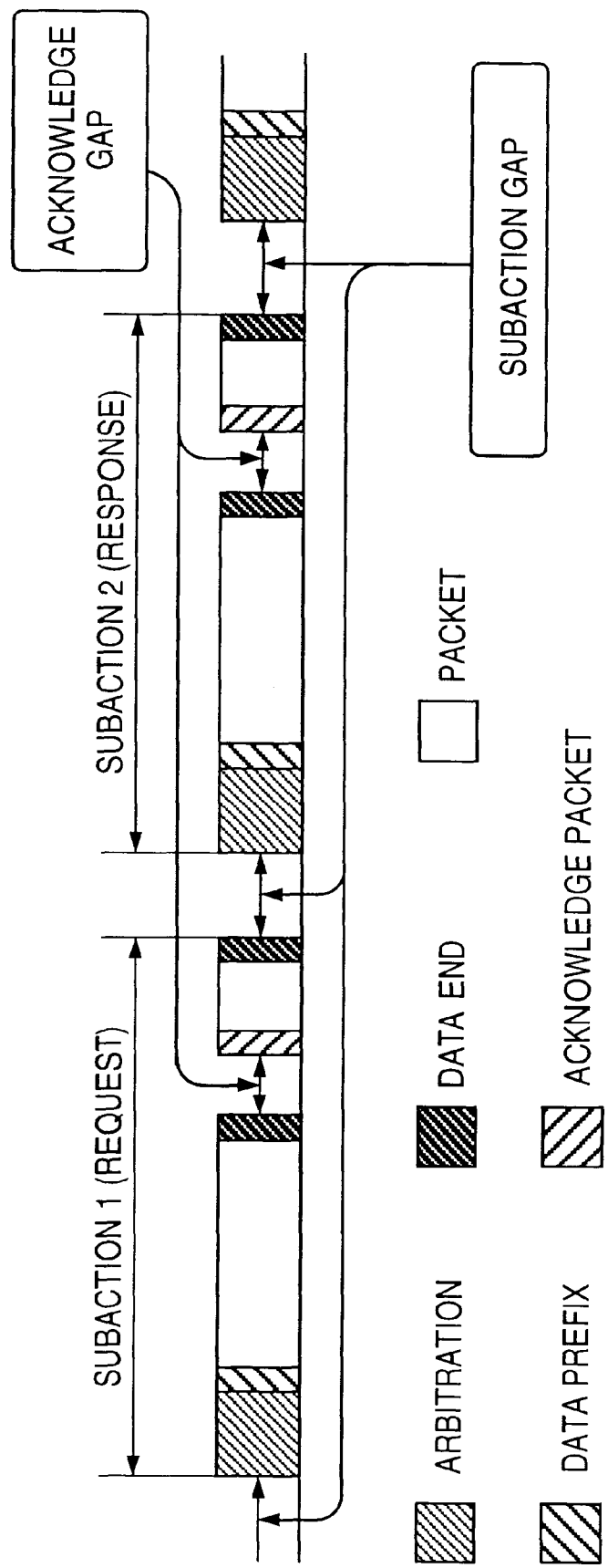
FIG. 24 is an explanatory view showing transitional statuses of transfer by the split transaction.

FIG. 24 shows transitional statuses of transfer in case of the split transaction. In FIG. 24, a sub-action 1 represents the request sub-action; and a sub-action 2, the response sub-action.

In the sub-action 1, the initiator sends a data packet indicative of the write request to the target, and the target receives the data packet, returns "pending" indicative of the confirmation of the above information, as an acknowledge packet. Then, the request sub-action is completed.

Then, when a sub-action gap has been inserted, the target sends a write response as a data packet with no data, in the sub-action 2. The initiator receives the data packet, returns a "complete" response as an acknowledge packet. Then, the response sub-action is completed.

Note that the period from the completion of the sub-action 1 to the beginning of the sub-action 2 can be minimized to a period corresponding to the sub-action gap, while maximized to a period corresponding to a maximum waiting period set in the nodes.

Isochronous Sub-action

Isochronous transfer, which can be regarded as the greatest feature of the 1394 serial bus is appropriate to multimedia data transfer which requires realtime transfer of, especially, AV data.

Further, the asynchronous transfer is one-to-one transfer, whereas the isochronous transfer is broadcasting transfer from one sender node to all the other nodes.

FIG. 25 shows transition in the isochronous transfer. The isochronous transfer is executed on the bus in a predetermined cycle, called "isochronous cycle". The period of the isochronous cycle is 125 µs. A cycle start packet (CSP) 2000 indicates the start of the isochronous cycle for asynchronizing the operations of the respective nodes. When data transfer in a cycle has been completed and a predetermined idle period (sub-action gap 2001) has elapsed, a node which is called "cycle master" sends the CSP 2000 indicative of the start of the next cycle. That is, this interval between the issuance of CSP's is 125 µs.

As channel A, channel B and channel C in FIG. 25, the respective packets are provided with a channel ID, so that plural types of packets can be independently transferred within one isochronous cycle. This enables substantially-realtime transfer among the plural nodes. The receiver node can receive only data with a predetermined channel ID. The channel ID does not indicate an address of the receiving node, but merely indicates a logical number with respect to the data. Accordingly, one packet sent from a sender node is transferred to all the other nodes, i.e., broadcasted.

Similar to the asynchronous transfer, bus arbitration is performed prior to the packet broadcasting in isochronous transfer. However, as the isochronous transfer is not one-to-one communication like the asynchronous transfer, the reception acknowledgment code ACK used as a response in the asynchronous transfer is not used in the isochronous transfer.

Further, an isochronous gap (iso gap) in FIG. 25 represents an idle period necessary for confirming prior to isochronous transfer that the bus is in idle status. If the predetermined idle period has elapsed, bus arbitration is performed with respect to node(s) desiring isochronous transfer.

FIG. 26 shows a packet format for isochronous transfer. Various packets divided into channels respectively have a data field, a data CRC field for error correction and a header field containing information such as a transfer-data length, a channel No., various codes and error-correction header CRC as shown in FIG. 27.

Bus Cycle

Figure 28:
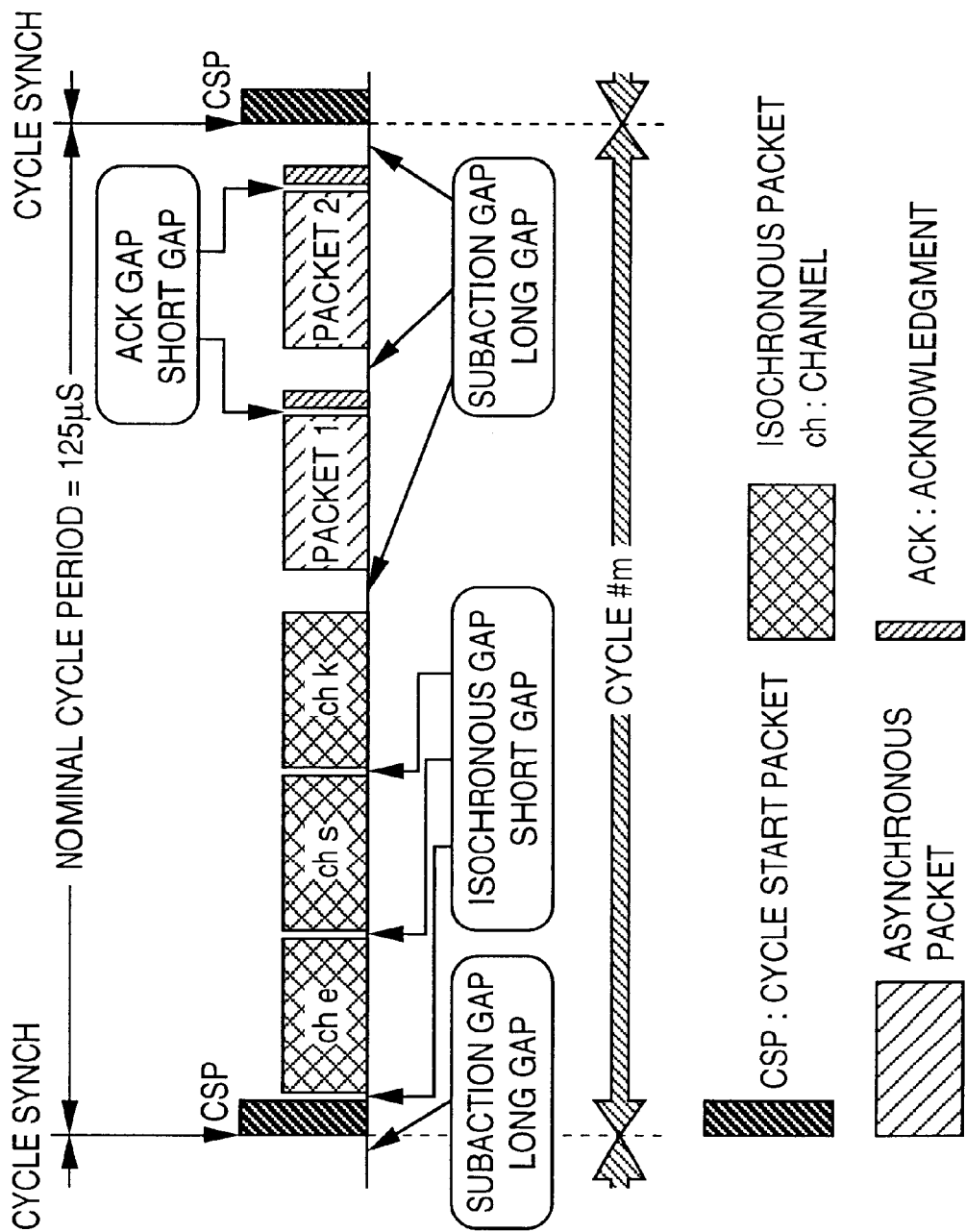
FIG. 28 is a timing chart showing transitional statuses in data transfer on the bus when the isochronous transfer and asynchronous transfer are mixedly performed.

In practice, both isochronous transfer and asynchronous transfer can be mixedly performed on the 1394 serial bus. FIG. 28 shows transition in the isochronous transfer and asynchronous transfer mixedly performed on the 1394 serial bus.

The isochronous transfer is performed prior to the asynchronous transfer because after the CSP, the isochronous transfer can be started with a gap (isochronous gap) shorter than the idle period necessary for starting the asynchronous transfer. Accordingly, the isochronous transfer has priority over the asynchronous transfer.

In the typical bus cycle as shown in FIG. 28, upon starting the cycle #m, a CSP is transferred from the cycle master to the respective nodes. The operations of the respective nodes are asynchronized by this CSP, and node(s) that waits for a predetermined idle period (isochronous gap) to perform isochronous transfer participates in bus arbitration, then starts packet transfer. In FIG. 28, a channel e, a channel s and a channel k are transferred by the isochronous transfer.

The operation from the bus arbitration to the packet transfer is repeated for the given channels, and when the isochronous transfer in the cycle #m has been completed, the asynchronous transfer can be performed. That is, when the idle period has reached the sub-action gap for the asynchronous transfer, node(s) that is to perform the asynchronous transfer participates in bus arbitration. Note that only if the sub-action gap for starting the asynchronous transfer is detected, after the completion of isochronous transfer and before the next timing to transfer the CSP (cycle synch), the asynchronous transfer can be performed.

In the cycle #m in FIG. 28, the isochronous transfer for three channels is performed, and then two packets (packet 1 and packet 2) including ACK are transferred by the asynchronous transfer. When the asynchronous packet 2 has been transferred, as the next cycle synch point to start the subsequent cycle m+1 comes, the transfer in the cycle #m ends. Note that during the asynchronous or isochronous transfer, if the next cycle synch point to transfer the next CSP has come, the transfer is not forcibly stopped but continued. After the transfer has been completed, a CSP for the next cycle is transferred after a predetermined idle period. That is, when one isochronous cycle is continued for more than 125 µs, the next isochronous cycle is shorter than the reference period 125 µs. In this manner, the isochronous cycle can be lengthened or shortened based on the reference period 125 µs.

However, it may be arranged such that the isochronous transfer is performed in every cycle, while the asynchronous transfer is sometimes postponed until the next cycle or the cycle further subsequent to the next cycle, so as to maintain realtime transfer. The cycle master also manages information on such delay.

Data Transmission Processing

Data Transmission Protocol

Figure 29:
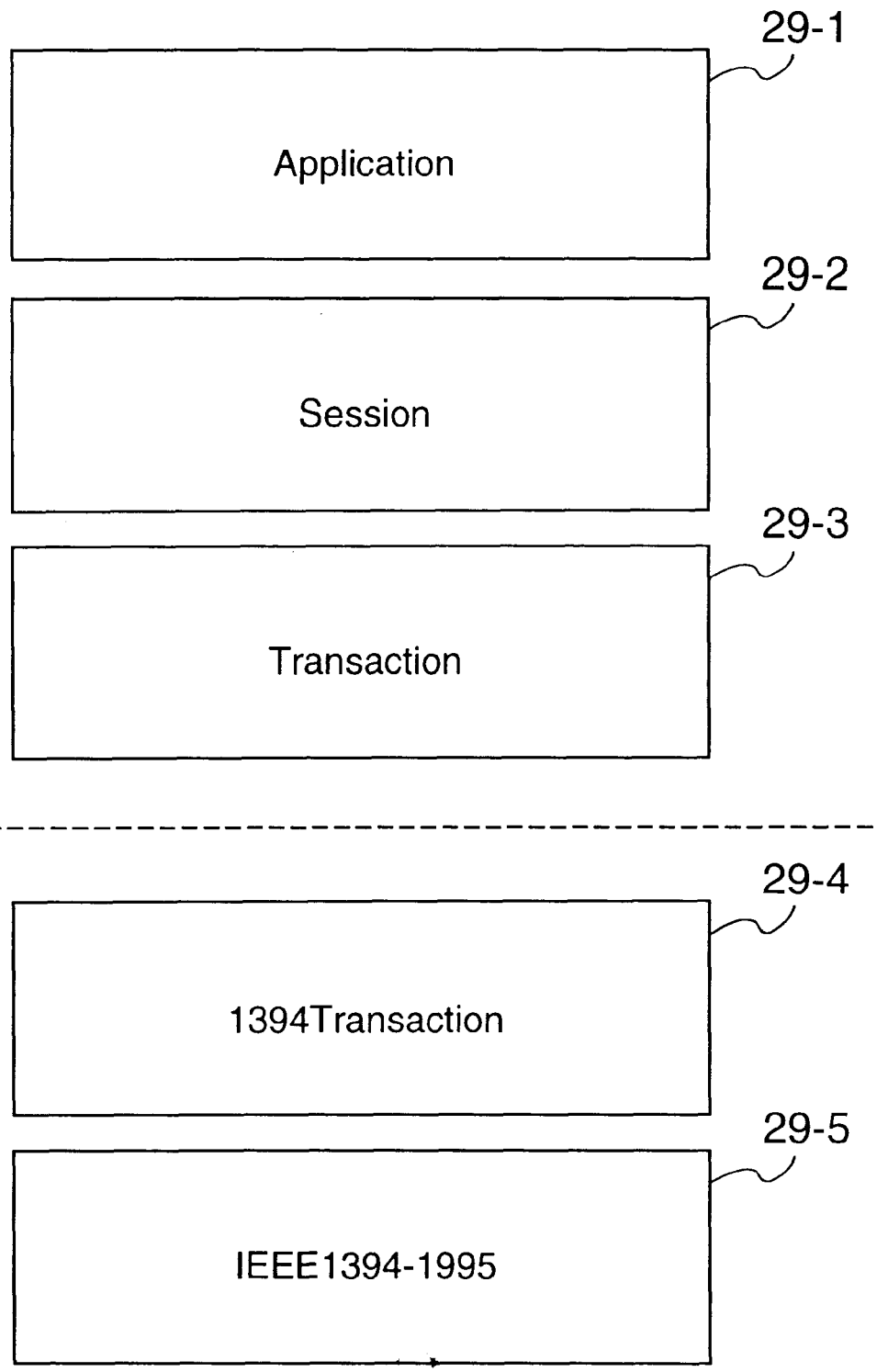
FIG. 29 is a view showing the layer structure of a 1394 serial bus.

FIG. 29 is a view for explaining a protocol stack for data transmission on a 1394 serial bus.

An application often requires transmission of a large quantity of data such as image data between devices. In this case, to separate processing such as detailed hardware control associated with data transmission, restriction matters, and data retransmission due to errors from the application program, a reliable data transmission service must be provided to the application to define a versatile interface.

In this embodiment, to transmit data, an application program uses a protocol system with a hierarchical structure as shown in FIG. 29. FIG. 29 shows an application layer 29-1, session layer 29-2, transaction layer 29-3, and 1394 transaction layer 29-4 and 1394 physical layer 29-5 which are defined by the IEEE 1394 standards, sequentially from the upper side. The 1394 transaction layer 29-4 corresponds to a transaction layer 814 shown in FIG. 3, and the 1394 physical layer 29-5 corresponds to a link layer 812 and physical layer 811.

In this embodiment, a device for transmitting data operates as follows. First, the data transmission application 29-1 transfers a large quantity of data such as image data to the lower session layer 29-2 using an abstract interface such as a data transmission API. The session layer 29-2 segments the application data in units of BLOCK registers 30-3 defined in FIG. 30 and sequentially transfers the data to the lower transaction layer 29-3. The transaction layer 29-3 segments the application data of each unit of BLOCK register 30-3 into units suitable for write transaction of the lower 1394 transaction layer 29-4 and calls the write transaction service interface of the 1394 transaction layer 29-4. The 1394 transaction layer 29-4 and 1394 physical layer 29-5 transmit the segmented application data to another device by a method defined by the IEEE 1394 standards.

A device for receiving data operates as follows. Appropriately segmented data transmitted from the transmitting side are sequentially written in the BLOCK registers 30-3 of the data receiving device, which are defined by the transaction layer 29-3. The transaction layer 29-3 reconstructs the data sequentially written in the BLOCK registers 30-3, assembles the data in one BLOCK register unit, and transfers it to the upper session layer 29-2. The session layer 29-2 sequentially receives the data in one BLOCK register unit, reconstructs a data stream, and transfers it to the application 29-1. The application 29-1 on the data receiving side receives the large quantity of data such as image data from the device on the data transmitting side through the abstract interface.

Register Structure

Figure 30:
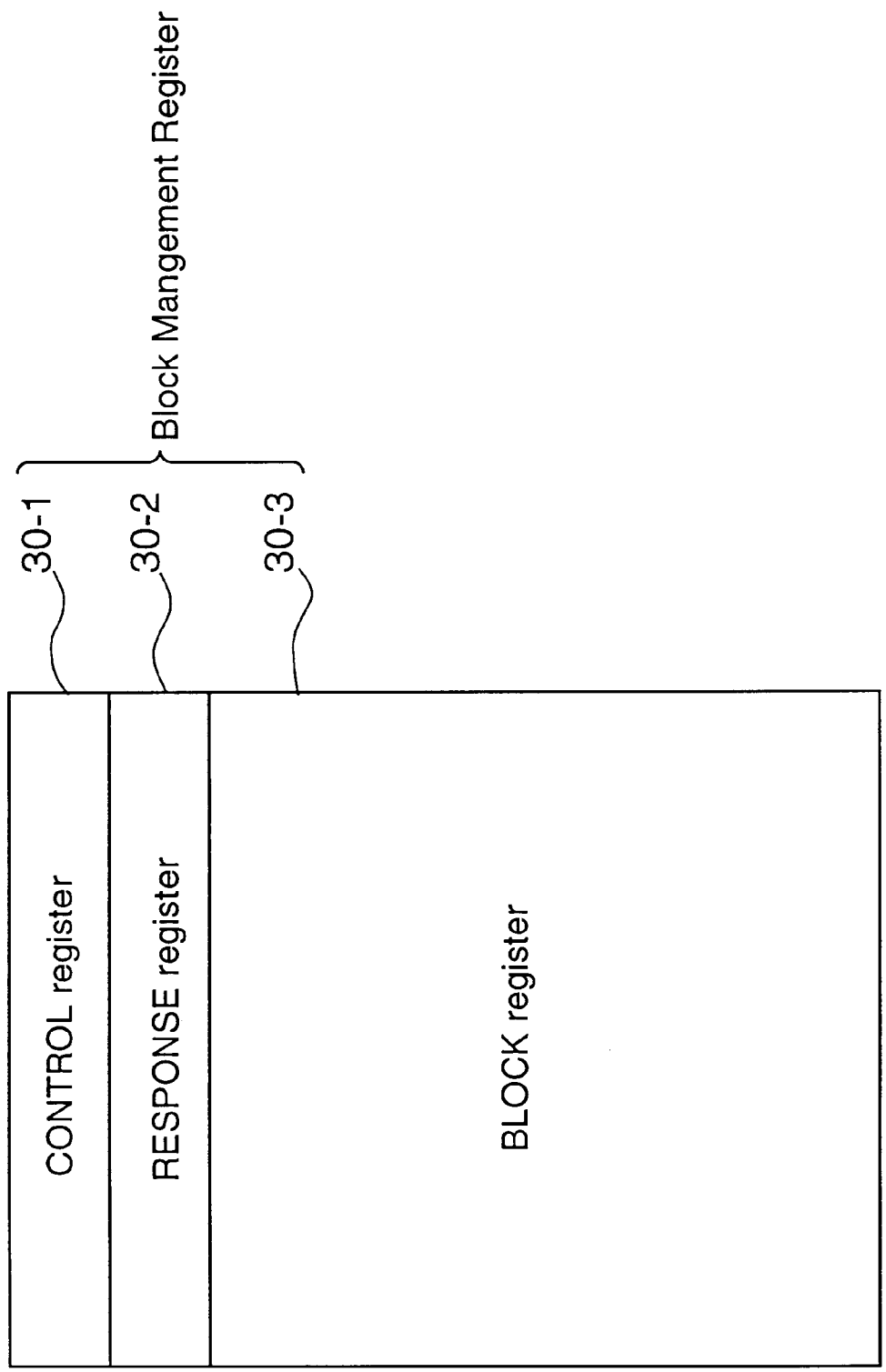
FIG. 30 is a view showing a register structure for data transmission.

FIG. 30 is a view showing the structure of the register for data transmission between devices, which is performed by the transaction layer 29-3 shown in FIG. 29. The register is arranged in the initial unit space (unit space shown in FIG. 4) of the 1394 serial bus. A device acquires the addresses and sizes of registers of the transmission destination in advance before data transmission, and uses these registers for data transmission. A register comprises the BLOCK register 30-3 in which actual data is written, a CONTROL register 30-1 for performing write control in the BLOCK register 30-3 (write completion notification), and a RESPONSE register 30-2 for returning acknowledgement (ACK/NACK) for written data. The CONTROL register 30-1 and RESPONSE register 30-2 are called a block management register altogether. These registers are prepared in both an image source device for transmitting image data and a printer for receiving the image data and printing it, so data can be transferred between the devices.

Figure 31:
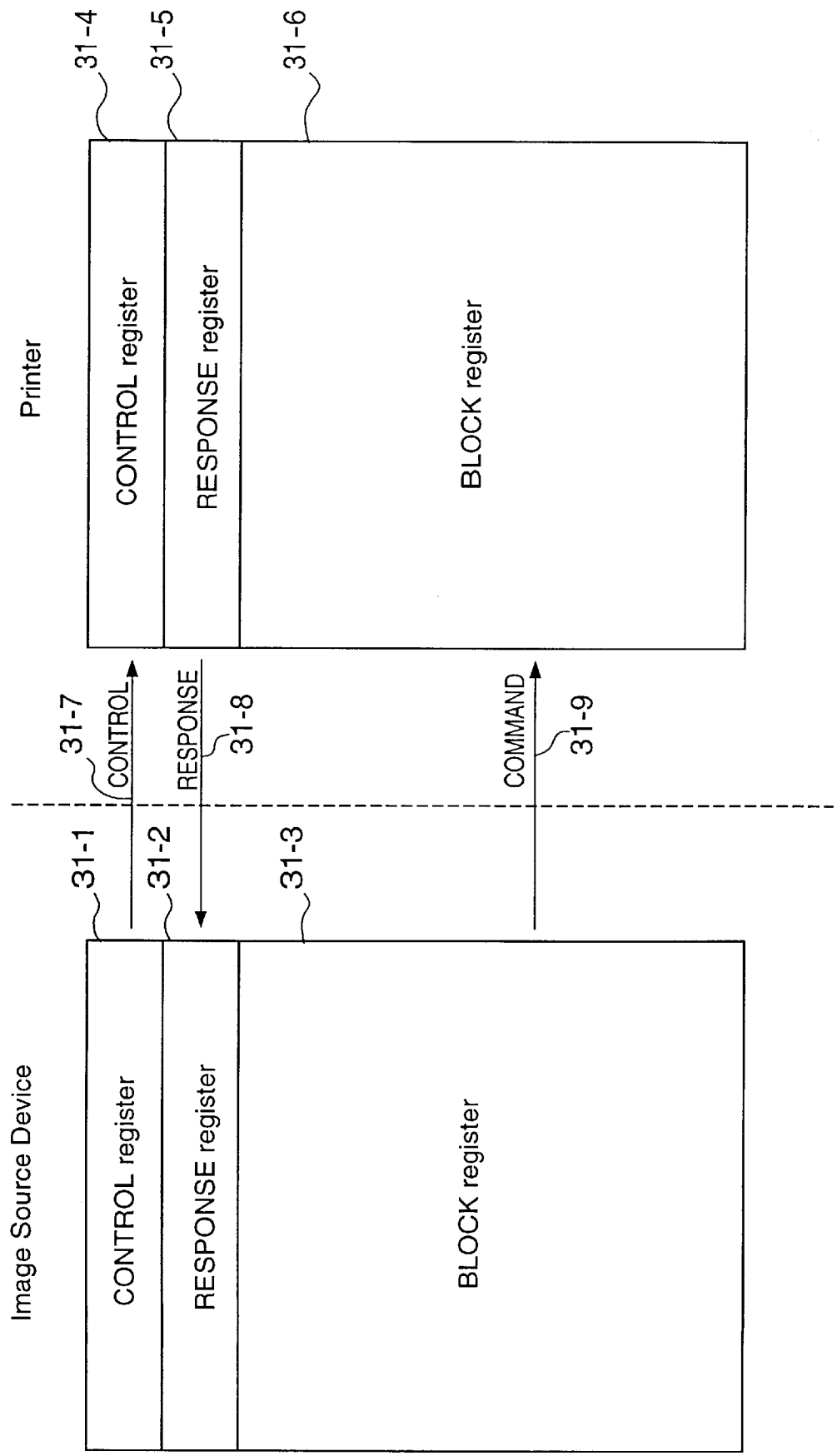
FIG. 31 is a view schematically showing command control from an image source device to a printer.

FIG. 31 schematically shows command transmission using the registers shown in FIG. 30. This is an example of command transmission from the image source device to the printer. The image source device writes command data to be transmitted in a BLOCK register 31-6 on the printer side (command 31-9). Next, the image source device writes data in a CONTROL register 31-4 on the printer side to notify the printer of completion of command data transmission (control 31-7). To notify the image source device whether the data has been normally received, the printer writes contents corresponding to ACK or NACK in the RESPONSE register of the image source device (response 31-8).

With the above procedure, a command write from the image source device to the register of the printer, and a response to the write are performed. When ACK is written in the RESPONSE register of the image source device, the printer has normally received the command. When NACK is returned, the data has not been normally sent to the printer due to some reason. When NACK is returned, the image source device must execute certain error processing such as error end processing or command retransmission processing.

Figure 32:
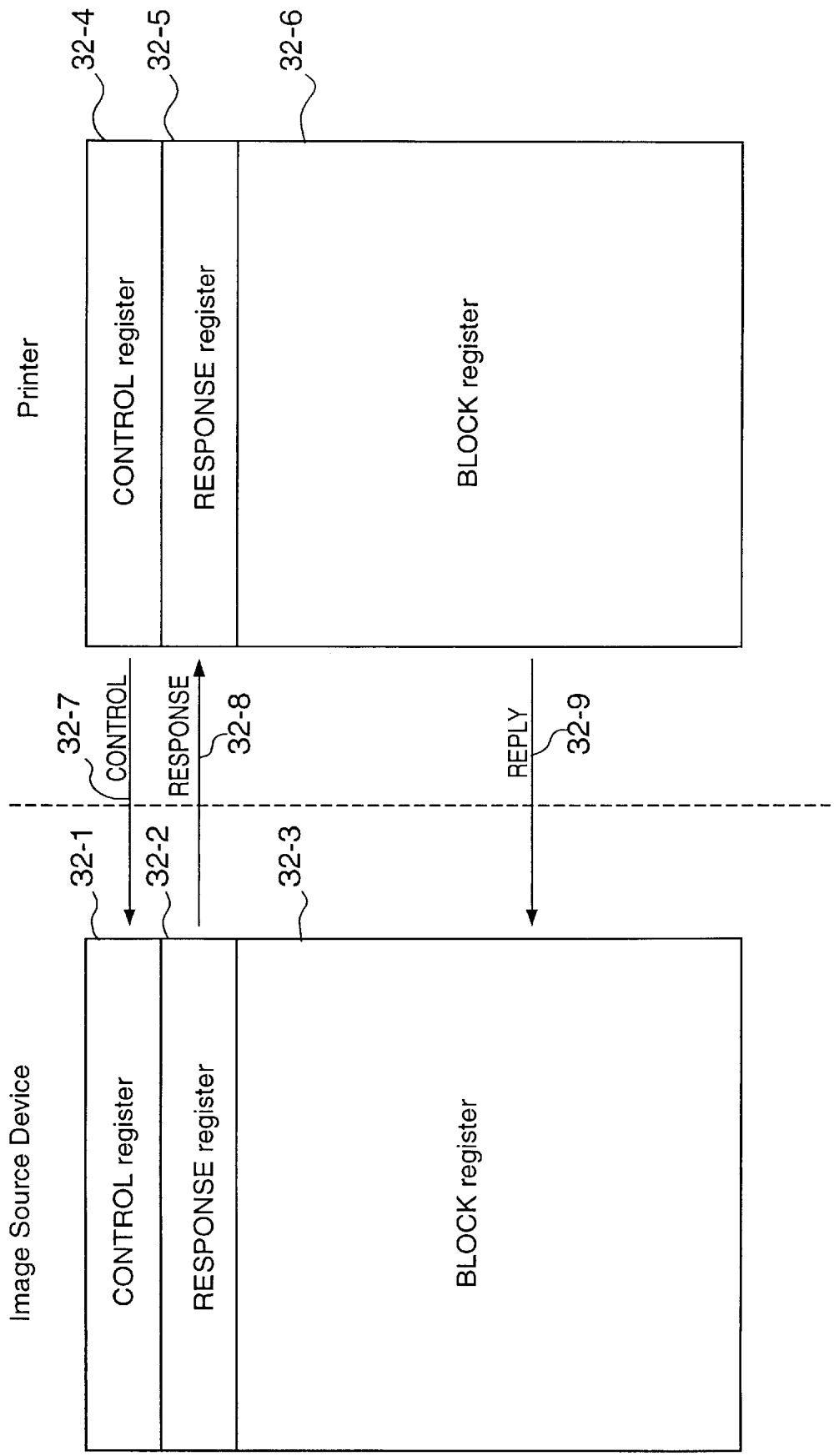
FIG. 32 is a view schematically showing reply control from the printer to the image source device.

FIG. 32 shows a procedure of returning a reply to the command written in the register in FIG. 31 from the printer to the image source device. The printer writes a reply to be sent to the image source device in a BLOCK register 32-3 on the image source device side (reply 32-9). Next, the printer writes data in a CONTROL register 32-1 on the image source device side to notify the image source device of completion of reply transmission (control 32-7). To notify the printer whether the data has been normally received, the image source device writes contents corresponding to ACK or NACK in a RESPONSE register 32-5 of the printer (response 32-8).

With the above procedure, a reply write from the printer to the register of the image source device, and a response to the write are performed. When ACK is written in the RESPONSE register of the printer, the image source device has normally received the reply. When NACK is returned, the data has not been normally sent to the image source device due to some reason. When NACK is returned, the printer must execute certain error processing such as error end processing or command retransmission processing.

The procedures of transmitting a command from the image source device to the printer and transmitting a reply to the command have been described above with reference to FIGS. 31 and 32. These are general command and reply procedures. Some commands require no replies. In this case, the procedure shown in FIG. 32 is not executed. This can be determined in units of commands.

Figure 33:
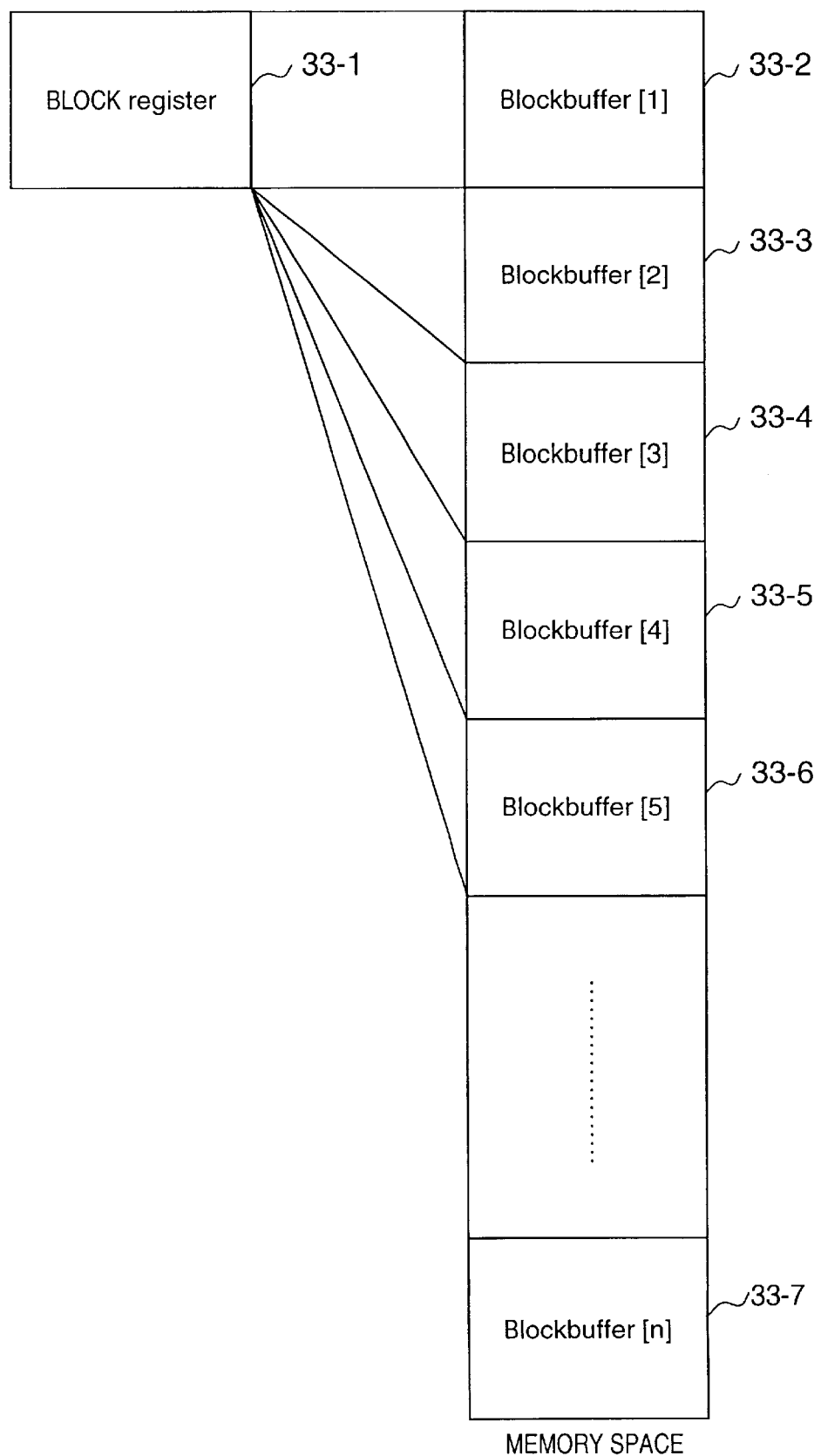
FIG. 33 is a view showing a BLOCK register and internal buffer structure of the printer.

FIG. 33 is a view showing the relationship between a BLOCK register 33-1 and internal buffer in the printer. A plurality of internal buffers Blockbuffers [1] to [n] (33-2 to 33-7) each having the same size as that of the BLOCK register 33-1 are prepared. When data is written in the BLOCK register 33-1, the data is stored in the Blockbuffers [1] to [n]. In the write in the BLOCK register 33-1, when a free internal buffer is present, the written data is stored in the buffer. When a free buffer capable of storing the next data is present, ACK is returned to the image source device. When all buffers are full, no ACK is returned to the image source device after data is stored in the final buffer until a buffer becomes free.

Unless the printer side has a free buffer and returns ACK, the image source device cannot transmit the next command. A free buffer is generated in the printer in the following case. When transmitted data is print data, data in, e.g., Blockbuffer [1] is converted into data for printing. When the data in the buffer is completely processed, the buffer becomes free, so data written in the BLOCK register 33-1 can be written in the buffer again.

Figure 34:
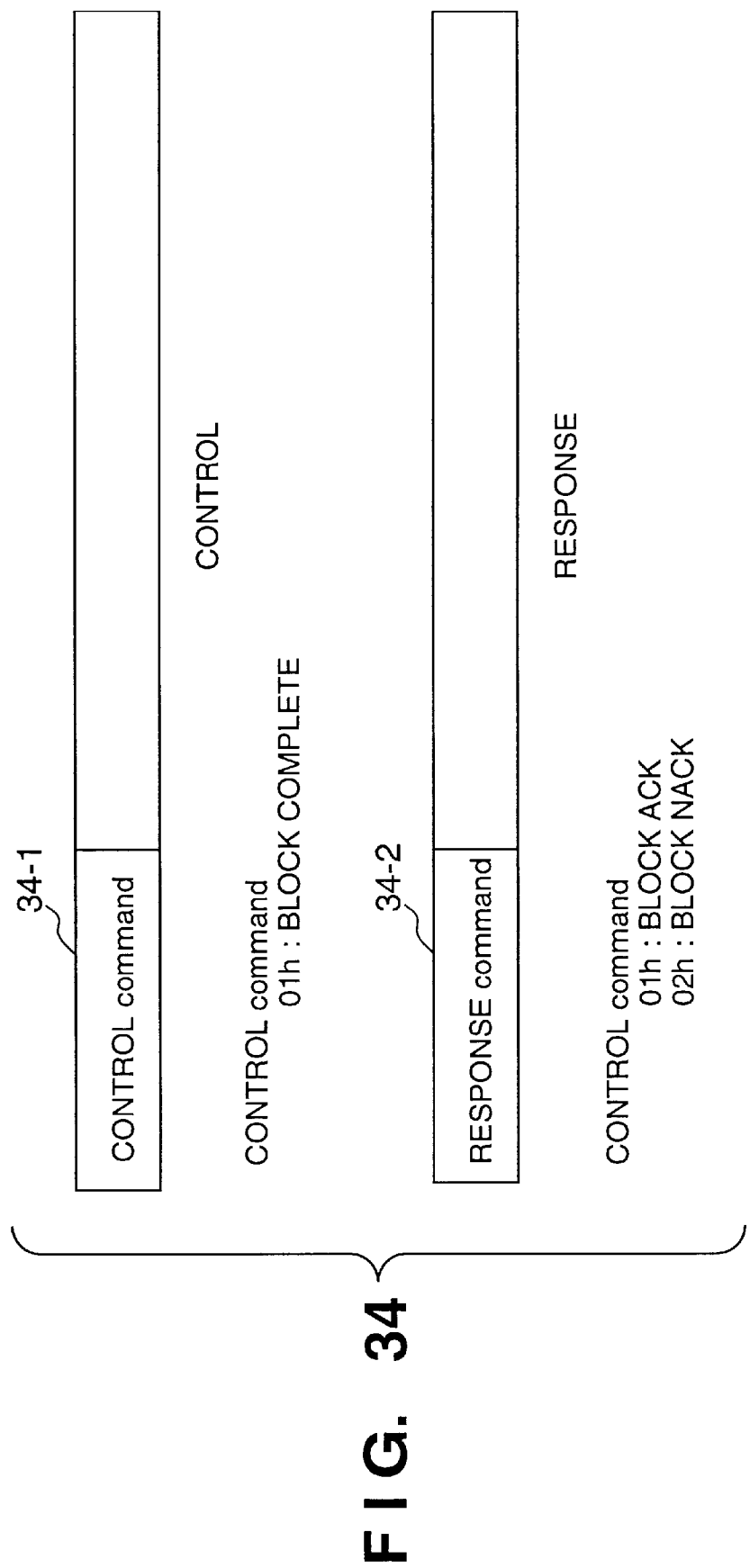
FIG. 34 is a view showing the general structures of CONTROL and RESPONSE registers.

FIG. 34 shows the structure of the CONTROL register 30-1 shown in FIG. 30 on the upper side. The control contents are set in a CONTROL command 34-1. For example, when the CONTROL command 34-1 is 01h, it represents BLOCK COMPLETE, i.e., completion of write in the BLOCK register.

FIG. 34 shows the structure of the RESPONSE register 30-2 shown in FIG. 30 on the lower side. The response contents are set in a RESPONSE command 34-2. For example, when the RESPONSE command 34-2 is 01h, it represents BLOCK ACK, i.e., that after BLOCK COMPLETE is written in the CONTROL register 30-1, the data has been normally received. When the RESPONSE command 34-2 is 02h, it represents BLOCK NACK, i.e., that after BLOCK COMPLETE is written in the CONTROL register 30-1, the data has not been normally received.

By using the CONTROL command and RESPONSE command, a notification of completion of data write in the BLOCK register and a response to the notification can be sent.

Figure 35:
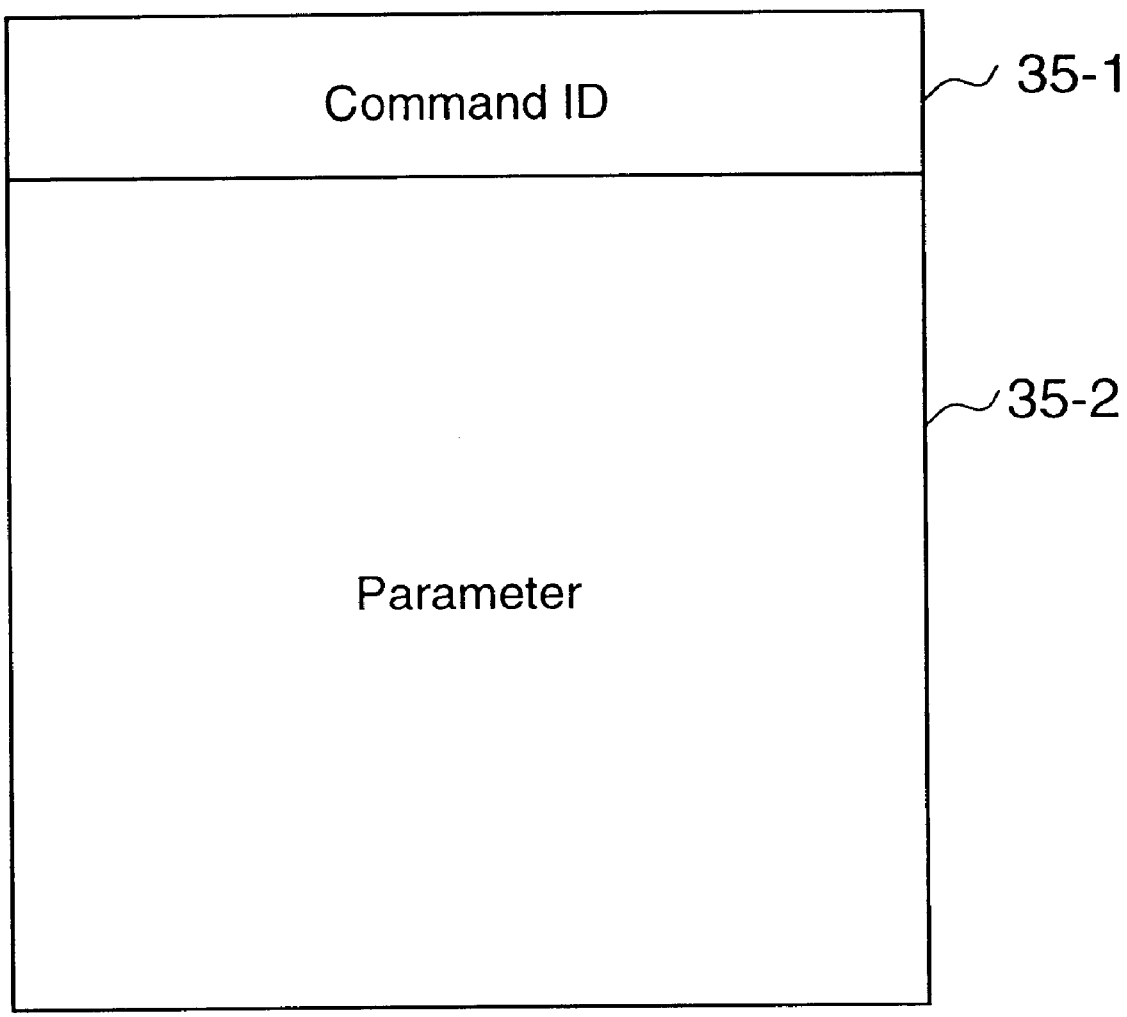
FIG. 35 is a view showing the structure of a command.

FIG. 35 is a view showing the general format of a command to be written in the BLOCK register 30-3. A command is formed from a Command ID 35-1 as an identifier and a Parameter 35-2 added to the command.

Figure 36:
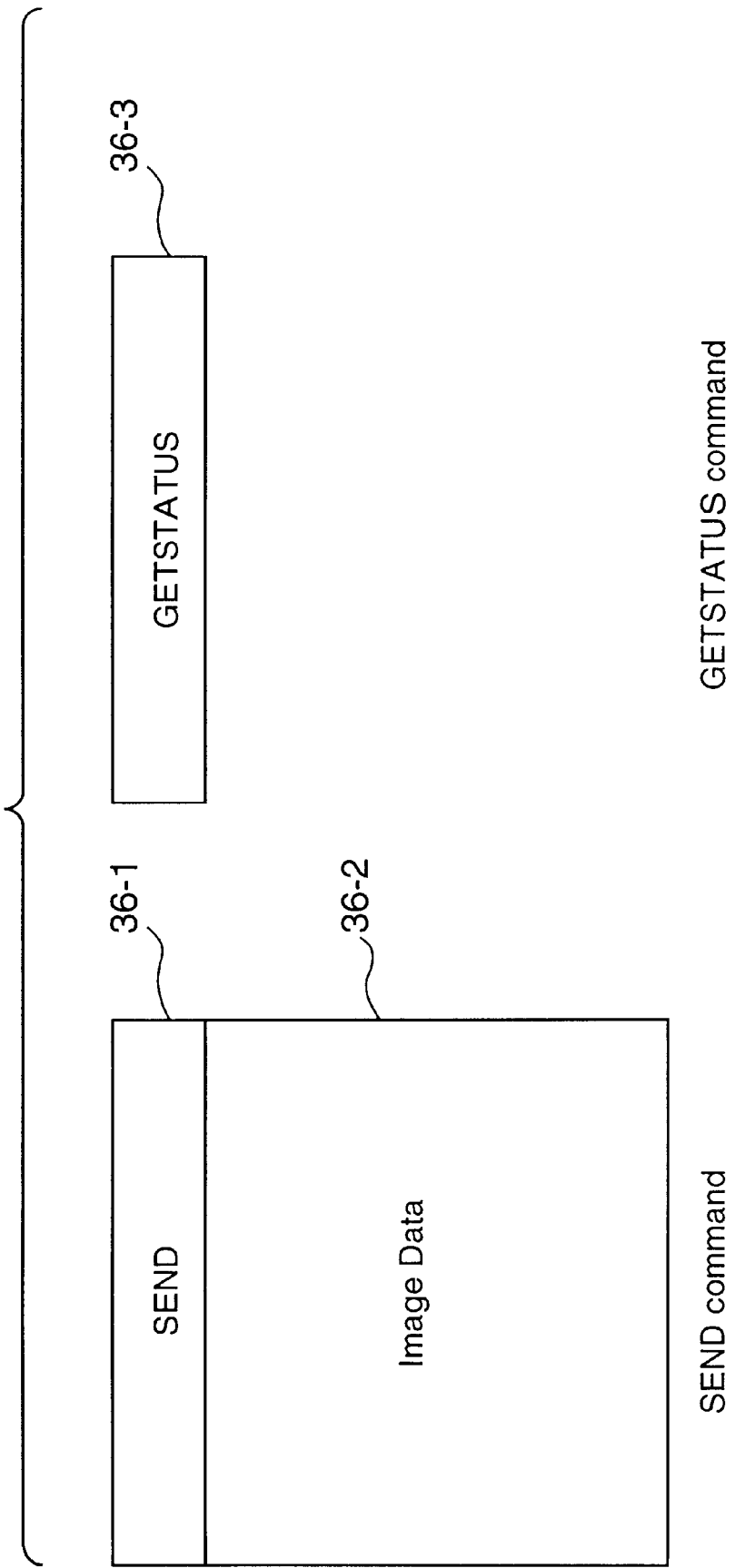
FIG. 36 is a view showing the structures of SEND and GETSTATUS commands.

FIG. 36 is a view showing actual commands. FIG. 36 shows, on the left side, a command (SEND command) for transmitting image data having SEND (36-1) as a Command ID and Image Data (36-2) to be transmitted as a Parameter. This command allows image data transmission from the image source device to the printer for printing.

FIG. 36 shows, on the right side, a command (GETSTATUS command) with which the image source device receives a status representing the state of the printer. This command has GETSTATUS (36-3) as a Command ID and no Parameter. That is, the GETSTATUS command requires no Parameter.

These commands are transmitted from the image source device to the printer as the command 31-9 in FIG. 31. In the SEND command, the size of image data is normally larger than the size of BLOCK register 30-3. In this case, data with a size corresponding to that of the BLOCK register 30-3 is written a plurality of number of times.

Figure 37:
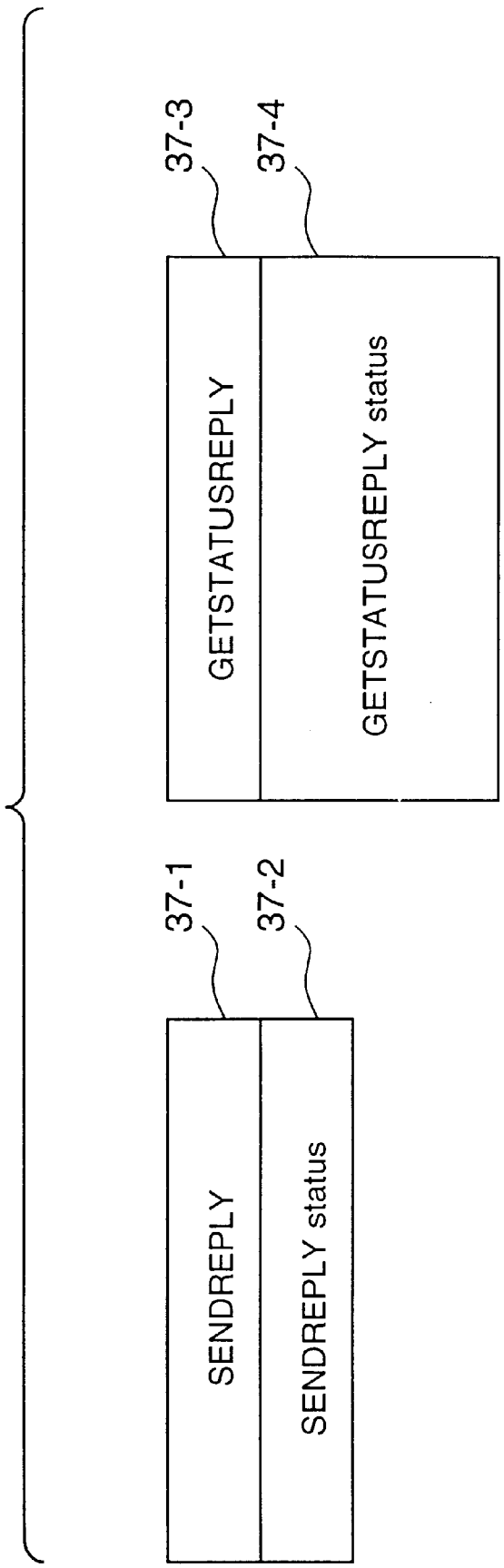
FIG. 37 is a view showing the structures of SEND and GETSTATUS replies.

FIG. 37 is a view showing replies to the commands shown in FIG. 36. FIG. 37 shows, on the left side, a reply (SENDREPLY) to the SEND command. With this reply, the execution status of the SEND command is returned from the printer to the image source device. This reply is formed from a SENDREPLY 37-1 and SENDREPLY status 37-2 representing a command execution status.

FIG. 37 shows, on the right side, a reply to the GETSTATUS command. With this reply, the printer returns its status to the image source device in accordance with the GETSTATUS command.

These replies are transmitted from the printer to the image source device as the reply 32-9 in FIG. 32.

By using the commands and replies shown in FIGS. 36 and 37, the application of the image source device can request the printer application to print transmitted image data and send the printer status.

Figure 38:
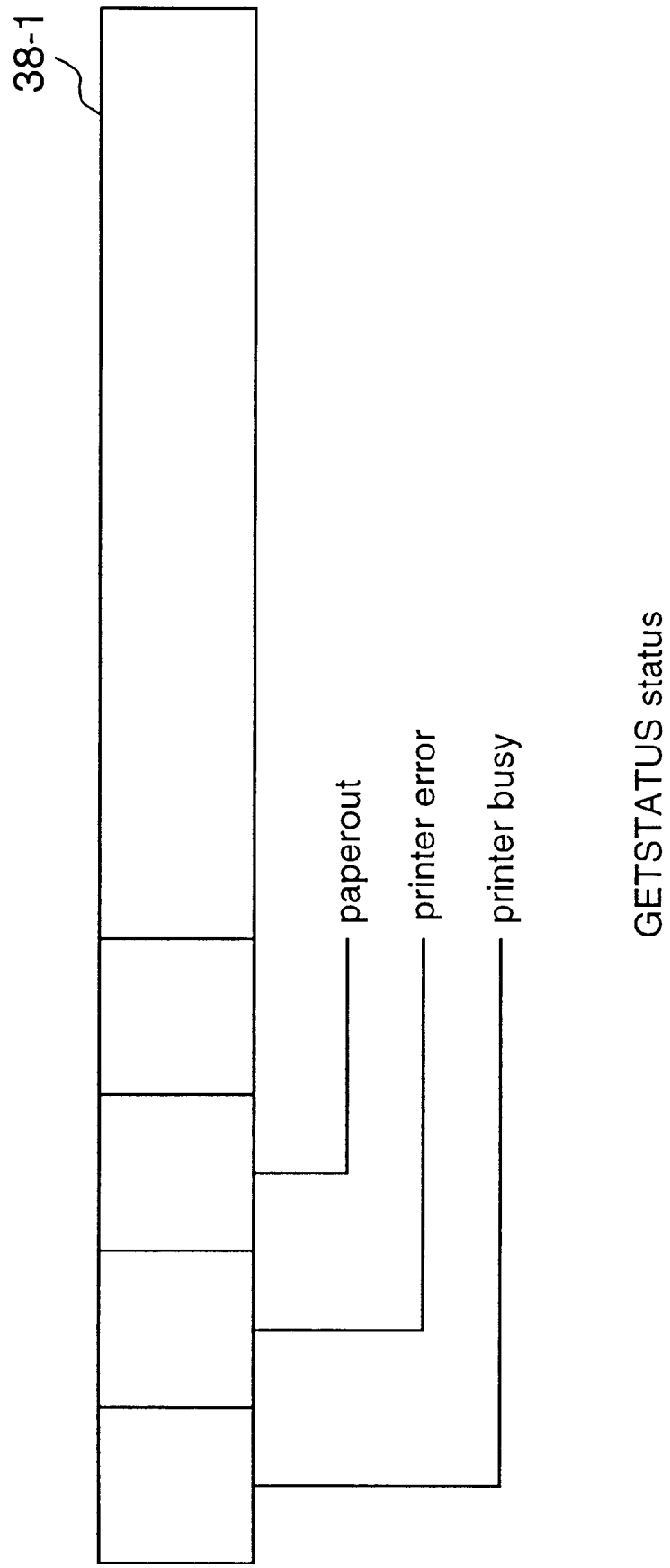
FIG. 38 is a view showing the status of the GETSTATUS command.

FIG. 38 is a view showing details of a printer status 38-1 returned in accordance with the GETSTATUSREPLY shown in FIG. 37. Examples of the status are "paperout", "printer error", and "printer busy". The image source device can know the current state of the printer from this status. For example, the image source device can know that the printer has no more paper. In this case, the user of the image source device can be notified of it. When an error occurs in the printer, printing can be inhibited.

Figure 39:
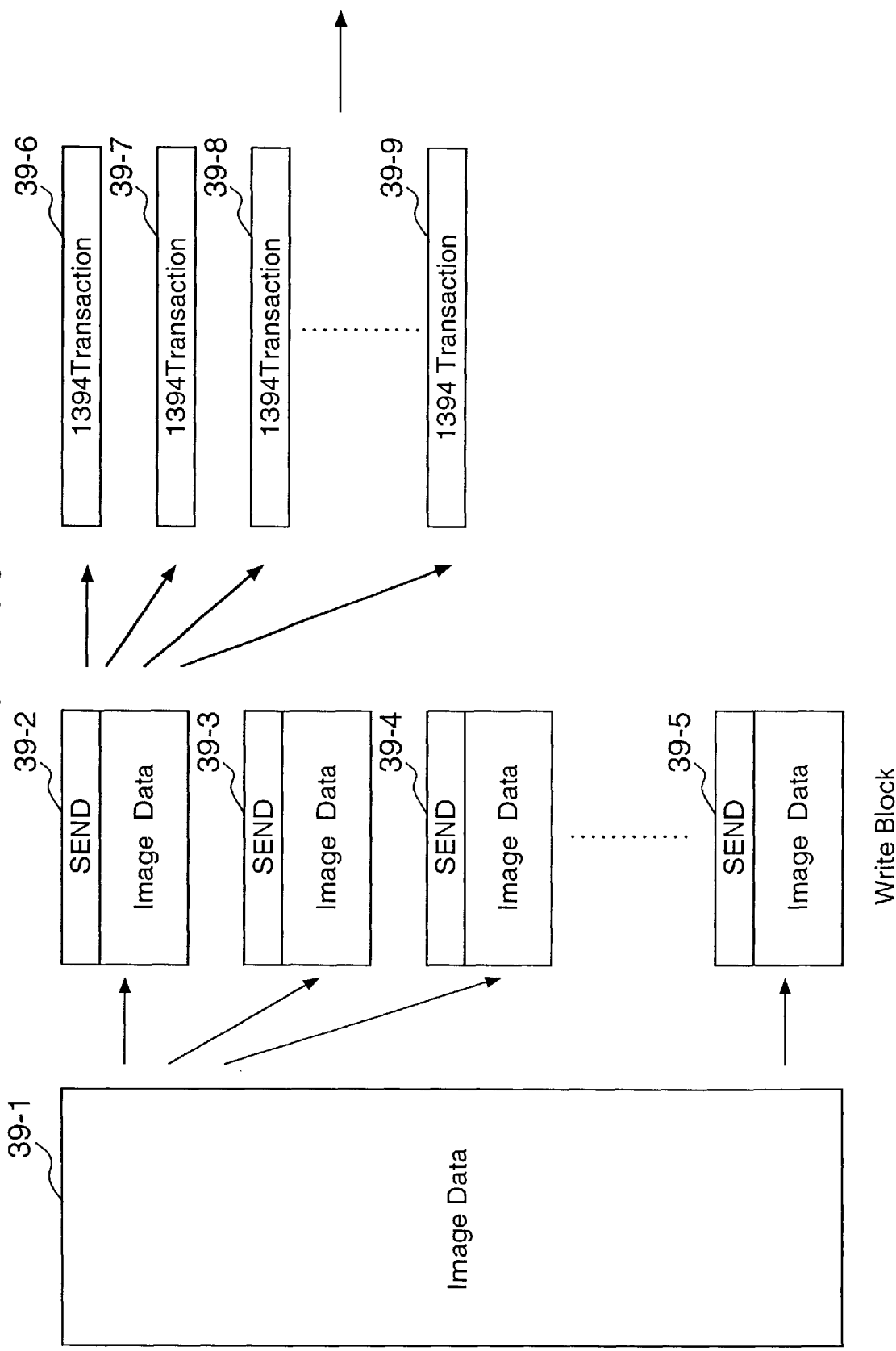
FIG. 39 is a view showing image data segmentation in the SEND command.

FIG. 39 shows a case wherein the size of image data 39-1 is larger than that of a BLOCK register 31-3 when the image data 39-1 is to be sent using the SEND command. In this case, the image data cannot be transmitted at once. The image data 39-1 is segmented in accordance with the size of the BLOCK register 31-3, as shown in FIG. 39, and transmitted as a plurality of commands 39-2 to 39-5. This processing is performed in the session layer 29-2 shown in FIG. 29. One cycle of transmission processing of segmented commands will be called WriteBlock. To transmit a large quantity of image data, WriteBlock is executed a plurality of number of times. Image data transmitted from the image source device to a BLOCK register 31-6 of the printer is stored in the internal buffer on the printer side, as shown in FIG. 33.

The image data segmented by WriteBlock under the control of the session layer 29-2 are further segmented into data transmission units (1394 transactions 39-6 to 39-9) complying with the IEEE 1394 standard by the transaction layer 29-3. More specifically, when data transmission in units of 1394 transactions 39-6 is performed a plurality of number of times, the image data is written in all areas of the BLOCK register 31-3.

General Data Transmission Control

Figure 40:
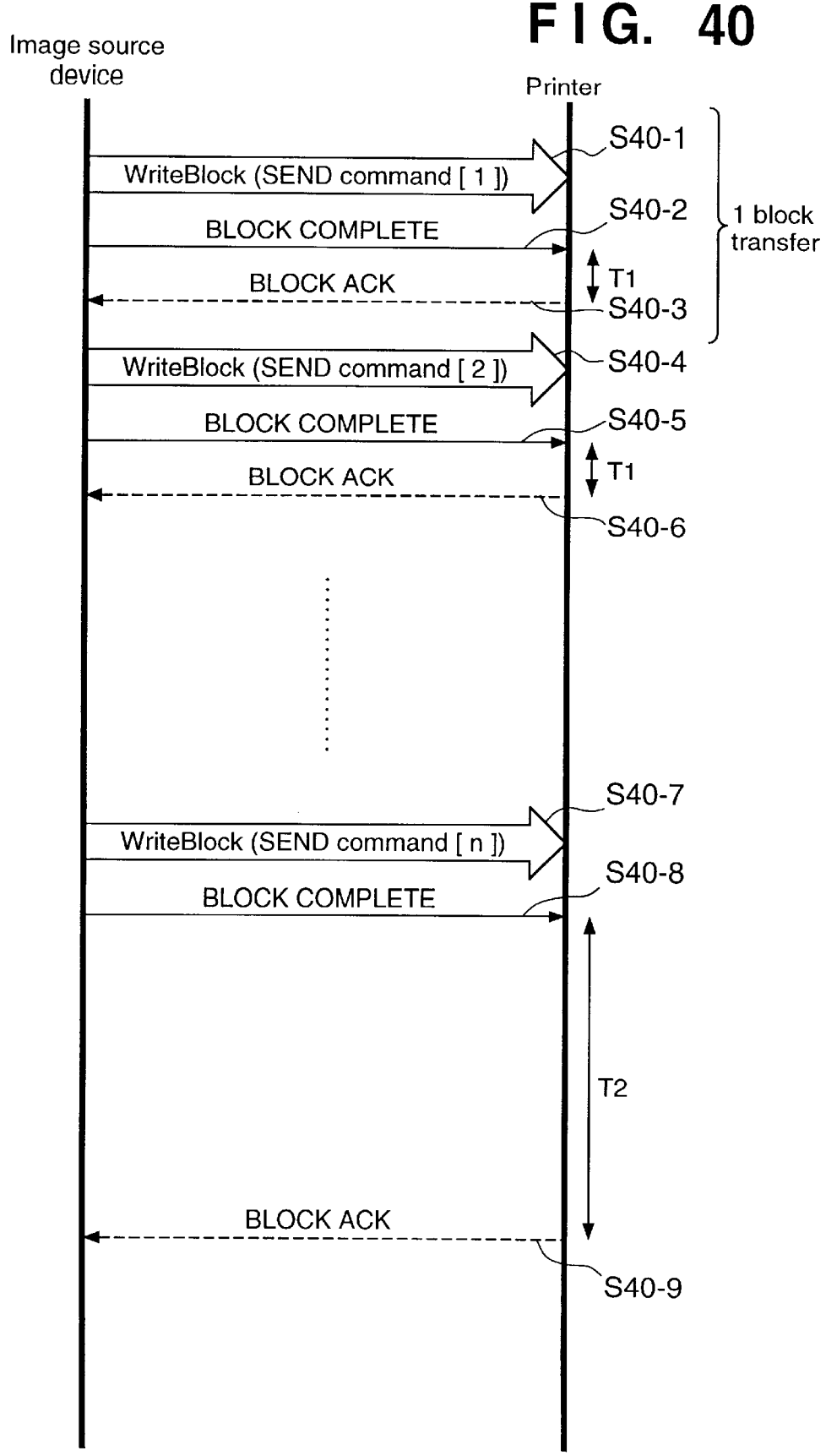
FIG. 40 is a view showing the general control procedure of the image source device and printer.

FIG. 40 is a view showing the general control procedure of the image source device and printer in repeatedly executing WriteBlock. The image source device executes WriteBlock for the printer in units of segmented commands. More specifically, the SEND command is transmitted by a unit of segment.

In step S40-1, the image source device performs WriteBlock to write the first command segment in the BLOCK register 31-6 of the printer. When the data in the BLOCK register 31-1 is completely written, the image source device writes BLOCK COMPLETE for notifying the printer of completion of WriteBlock in the CONTROL register 31-4 of the printer in step S40-2.

Since the printer has a free buffer, and the command has normally been written in the BLOCK register, the printer writes BLOCK ACK in a RESPONSE register 31-2 of the image source device in step S40-3. The response time from generation of BLOCK COMPLETE to return of BLOCK ACK is represented by T1. With the series of processing operations from WriteBlock to BLOCK ACK (steps S40-1 to S40-3), transmission of one block unit is ended. Subsequently, as shown in steps S40-4 to 40-6, WriteBlock is repeated until no more buffer remains free in the printer.

The printer consumes data sent in accordance with printing operation to make the buffers free and reuses the buffers. However, when the data transmission rate from the image source device is higher than the buffer consumption speed of the printer, no more buffer remains free, so WriteBlock for the final buffer of the printer is performed in step S40-7. This is because the image source device does not have information of the number of remaining buffers of the printer and therefore immediately executes WriteBlock upon receiving BLOCK ACK. In FIG. 40, n buffers are present on the printer side.

In step S40-7, WriteBlock in the final buffer is performed. In step S40-8, BLOCK COMPLETE is transmitted. The buffers of the printer become full in this transmission, the printer cannot transmit BLOCK ACK to the image source device until a buffer becomes free. Normally, the response time from BLOCK COMPLETE to BLOCK ACK is T1. However, during time T2 until a buffer becomes free, the image source device cannot transmit data. After the time T2 elapses, and BLOCK ACK is returned from the printer, the image source device can transmit the next data. That is, the response time T2 is much longer than the time T1.

Figure 41:
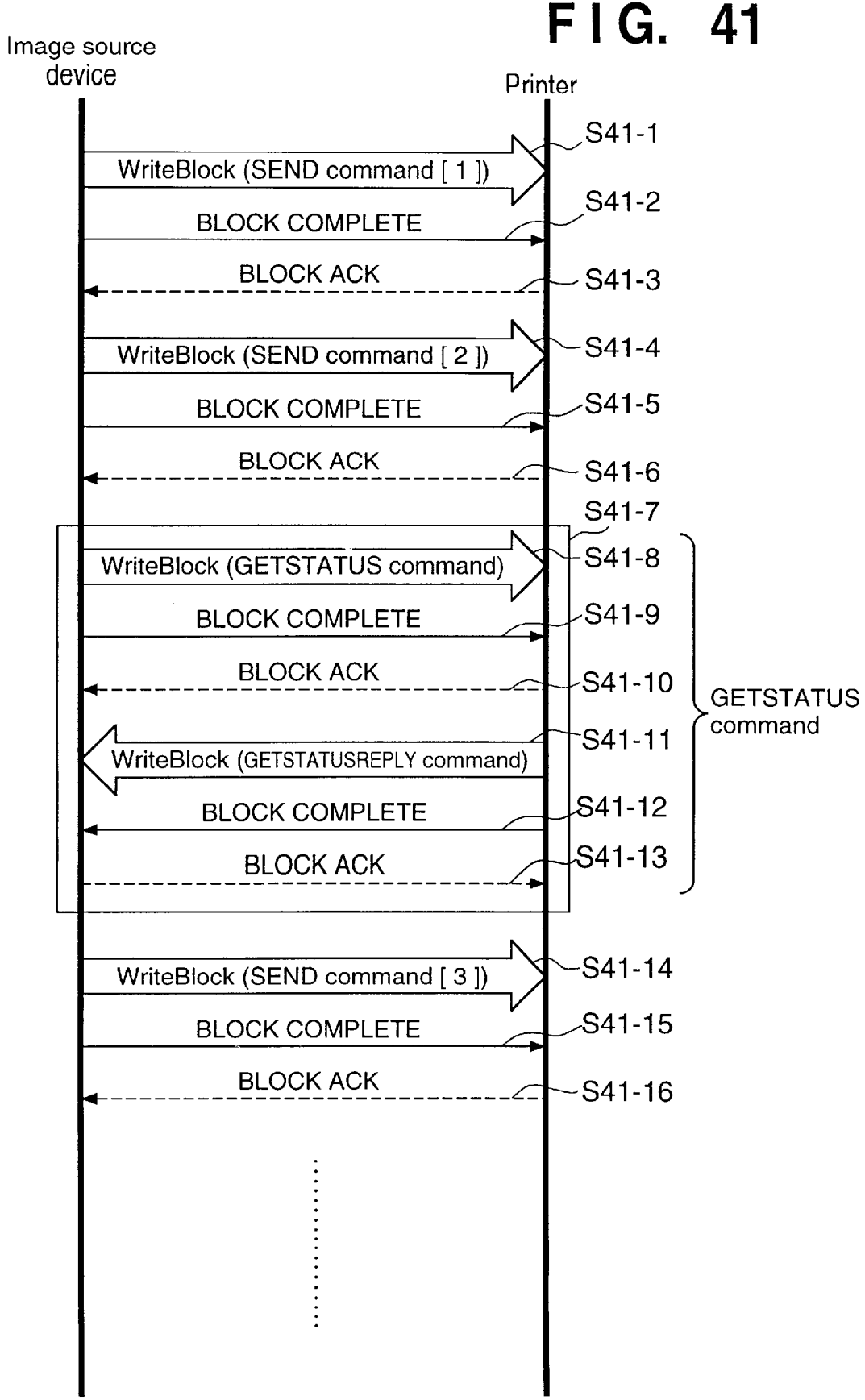
FIG. 41 is a view showing the GETSTATUS command control procedure.

FIG. 41 is a view showing the control procedure of the GETSTATUS command in this embodiment. FIG. 41 shows the processing flow in executing the GETSTATUS command while image data is being transmitted using the SEND command.

When the printer status must be acquired while WriteBlock is being repeated, the GETSTATUS command is periodically executed. That is, the GETSTATUS command is executed while the SEND command is being executed. In steps S41-1 to S41-6, the SEND command is executed. After a predetermined time elapses, the GETSTATUS command is executed in step S41-7.

GETSTATUS command control in step S41-7 will be described below in detail. First, in step S41-8, the GETSTATUS command is written in the BLOCK register of the printer by WriteBlock. In step S41-9, BLOCK COMPLETE is written in the CONTROL register of the printer. In step S41-10, BLOCK ACK is returned from the printer to the RESPONSE register of the image source device. In step S41-11, GETSTATUSREPLY is written from the printer side in the BLOCK register of the image source device. In step S41-12, the printer writes BLOCK COMPLETE in the CONTROL register of the image source device. In step S41-13, BLOCK ACK is returned to the RESPONSE register of the printer.

With the series of processing operations shown in step S41-7, the SEND command is interrupted to execute the GETSTATUS command. After execution of the GETSTATUS command, in steps S41-14 to S41-16, the SEND command interrupted is resumed. That is, the GETSTATUS command is executed by interrupting the SEND command, and the SEND command is resumed when the GETSTATUS command is ended.

Hence, the image source device can obtain the current printer status using the GETSTATUS command even during execution of the SEND command, and can transmit data while confirming the printer status. This GETSTATUS command interrupt processing is instructed by the application layer 29-1 shown in FIG. 29 and processed by the session layer 29-2. More specifically, the application of the image source device instructs the session layer to execute the SEND command and then issues the GETSTATUS command to the session layer to obtain the printer status every predetermined time.

However, in the general control example shown in FIG. 41, the GETSTATUS command can be executed only when the printer has a free buffer. For example, if the GETSTATUS command execution time comes during the response time T2 when WriteBlock cannot be performed in steps S40-8 and 40-9 in FIG. 40, the GETSTATUS command cannot be transmitted. This is because the printer has no free buffer, as described above. If this response time T2 is long, the printer status cannot be obtained every predetermined time. In the general data transmission control, the printer status cannot be periodically obtained depending on the number of remaining buffers on the printer side.

Data Transmission Processing of This Embodiment

Outline of DUMMY Processing

This embodiment solves the problems associated with general command transmission described above with reference to FIGS. 29 to 41. The solution will be described below in detail. A description will be made below with reference to appropriate alterations of FIGS. 34 and 40. The remaining drawings in FIGS. 29 to 41 are the same as described above, and a detailed description thereof will be omitted.

Figure 42:
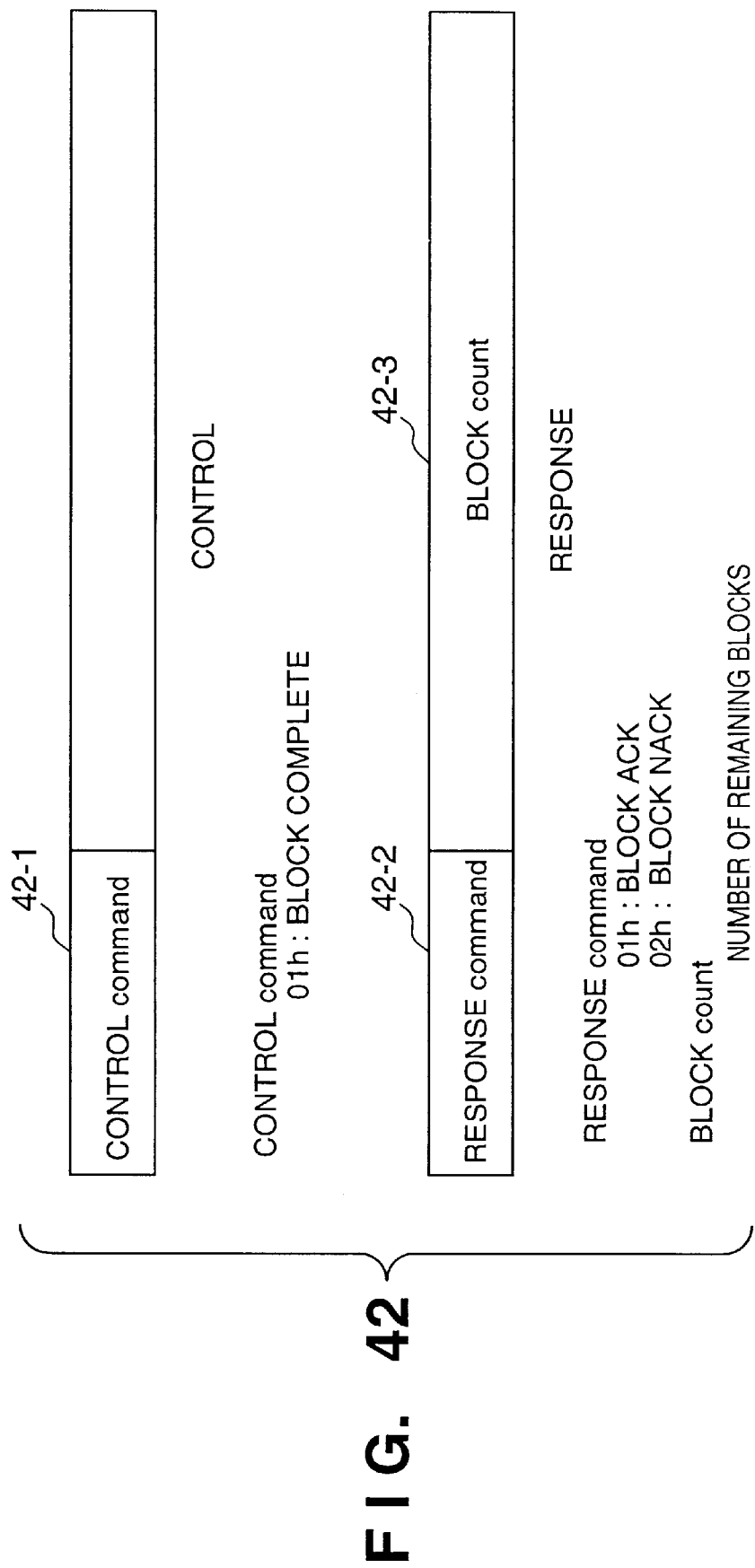
FIG. 42 is a view showing the structures of CONTROL and RESPONSE registers.

In this embodiment, the CONTROL register 30-1 and RESPONSE register 30-2 shown in FIG. 34 are modified as shown in FIG. 42. FIG. 42 shows the structure of the RESPONSE register 30-2 on the lower side. A BLOCK count 42-3 is added to the RESPONSE register. The BLOCK count 42-3 sets the number of free buffers on the printer side. Hence, in this embodiment, the printer can return not only the ACK/NACK in response to WriteBlock but also the BLOCK count to the image source device.

Figure 43:
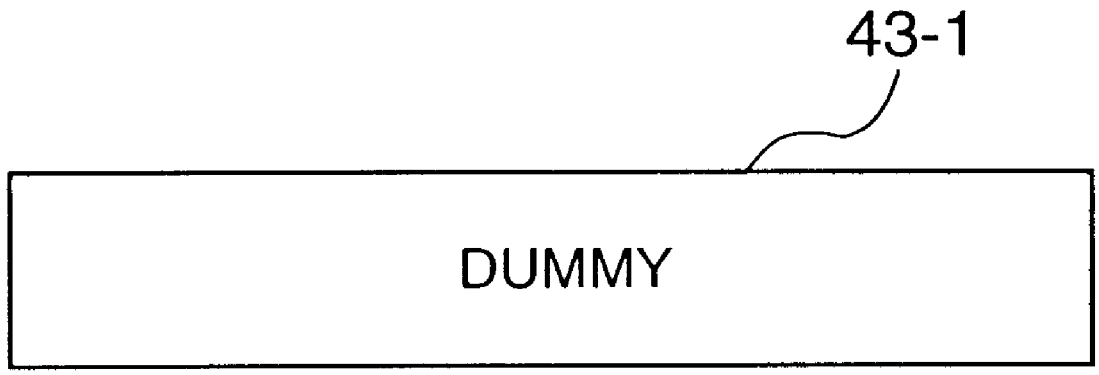
FIG. 43 is a view showing the structure of a DUMMY command.

FIG. 43 shows a DUMMYBLOCK command (to be simply referred to as a DUMMY command hereinafter) added in this embodiment in addition to the SEND command and GETSTATUS command shown in FIG. 36. The DUMMY command is sent from the image source device to the printer. When the number of free blocks, which is indicated by the BLOCK count 42-3, is smaller than a predetermined number in the response returned from the printer, the DUMMY command is sent to the printer in place of the SEND command. Upon receiving the DUMMY command, the printer returns BLOCK ACK/NACK to the RESPONSE register 31-2 of the image source device without storing the DUMMY command in the internal block buffers 33-2 to 33-7 and changing the number of free buffers. The DUMMY command has no corresponding reply.

DUMMY Command Control Procedure

Figure 44:
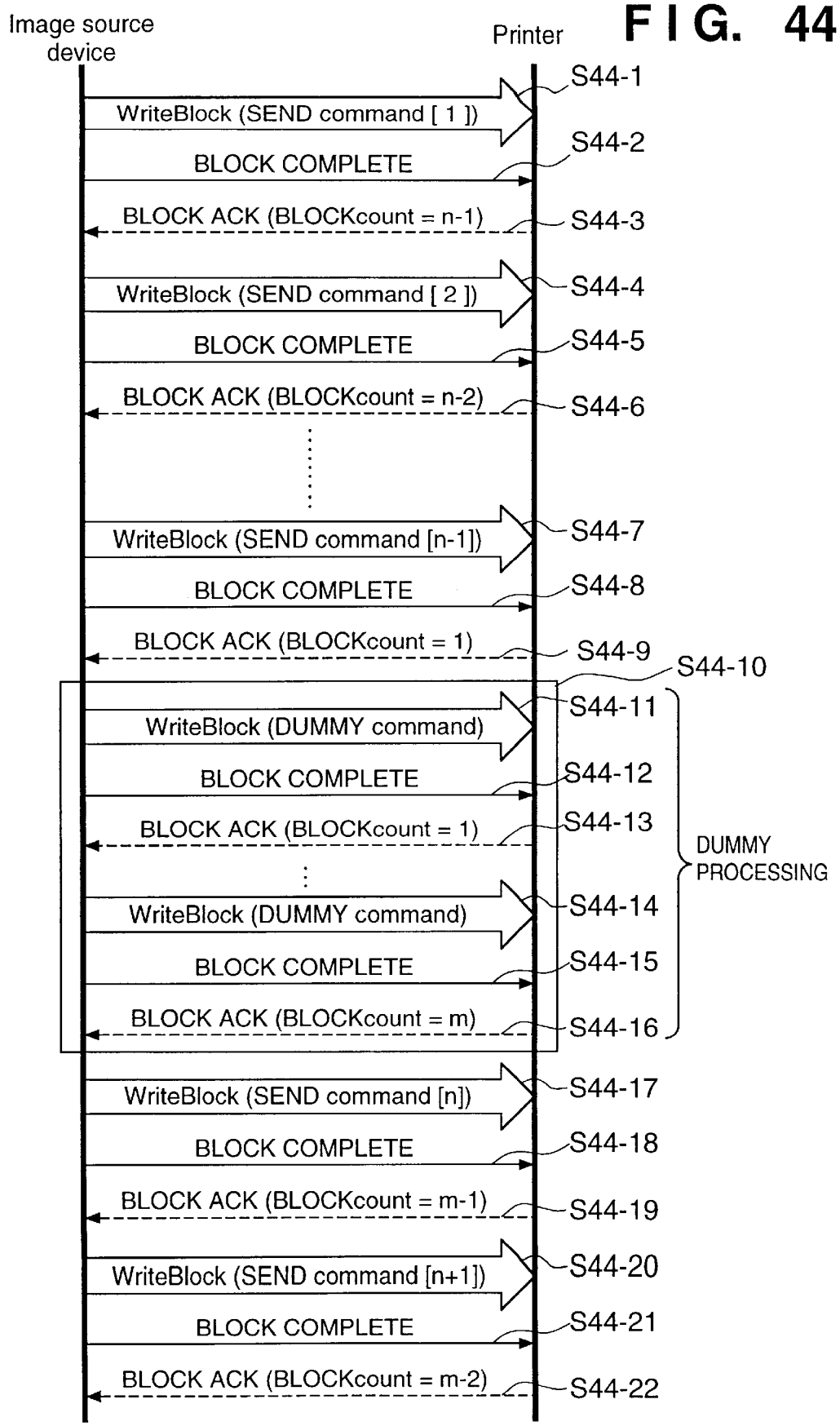
FIG. 44 is a view showing the DUMMY command control procedure.

In this embodiment, WriteBlock repeat processing shown in FIG. 40 is modified as shown in FIG. 44. FIG. 44 is different from FIG. 40 in the following point. In step S44-3 of FIG. 44, the BLOCK count 42-3 representing the number of remaining buffers is set in the BLOCK ACK reply, unlike BLOCK ACK reply shown in step S40-3 of FIG. 40. In FIG. 40, transmission waits during the response time T2 from sending WriteBlock to the final buffer in step S40-7 to the return of BLOCK ACK in step S40-9. In FIG. 44, however, when BLOCK ACK with a BLOCK count "1" is returned in step S44-9, DUMMY processing in step S44-10 is performed until BLOCK ACK with a BLOCK count m (m is a value other than 1) is returned.

DUMMY processing of this embodiment will be described below. In step S44-11, the image source device determines that the BLOCK count in BLOCK ACK is 1 and writes a DUMMY command in the BLOCK register of the printer in place of the SEND command. In step S44-12, BLOCK COMPLETE for notifying the printer of completion of WriteBlock is written in the CONTROL register of the printer. In step S44-13, BLOCK ACK is returned to the RESPONSE register of the image source device. As long as the BLOCK count set in the BLOCK ACK is 1, the DUMMY command write in the BLOCK register of the printer is continued in steps S44-13 and S44-14.

When the DUMMY command is written in the BLOCK register on the printer side, the printer determines that the DUMMY command is written, and returns BLOCK ACK without storing the DUMMY command. The number of free buffers at the time point of reply is returned as the BLOCK count. For this reason, when the number of free buffers increases, the BLOCK count is incremented. When the number of free buffers does not increase, "1" is set in the BLOCK count, and BLOCK ACK is returned.

When BLOCK ACK is returned with a BLOCK count having a number other than 1 in step S44-16, the image source device resumes SEND command transmission processing interrupted by DUMMY processing in steps S44-17 to S44-22.

As shown in FIG. 44, in this embodiment, DUMMY processing can be continued until the number of free buffers on the printer side increases. Hence, even when the printer has no free buffer, the GETSTATUS command can be executed, as will be described below.

DUMMY and GETSTATUS Command Control Procedure

Figure 45:
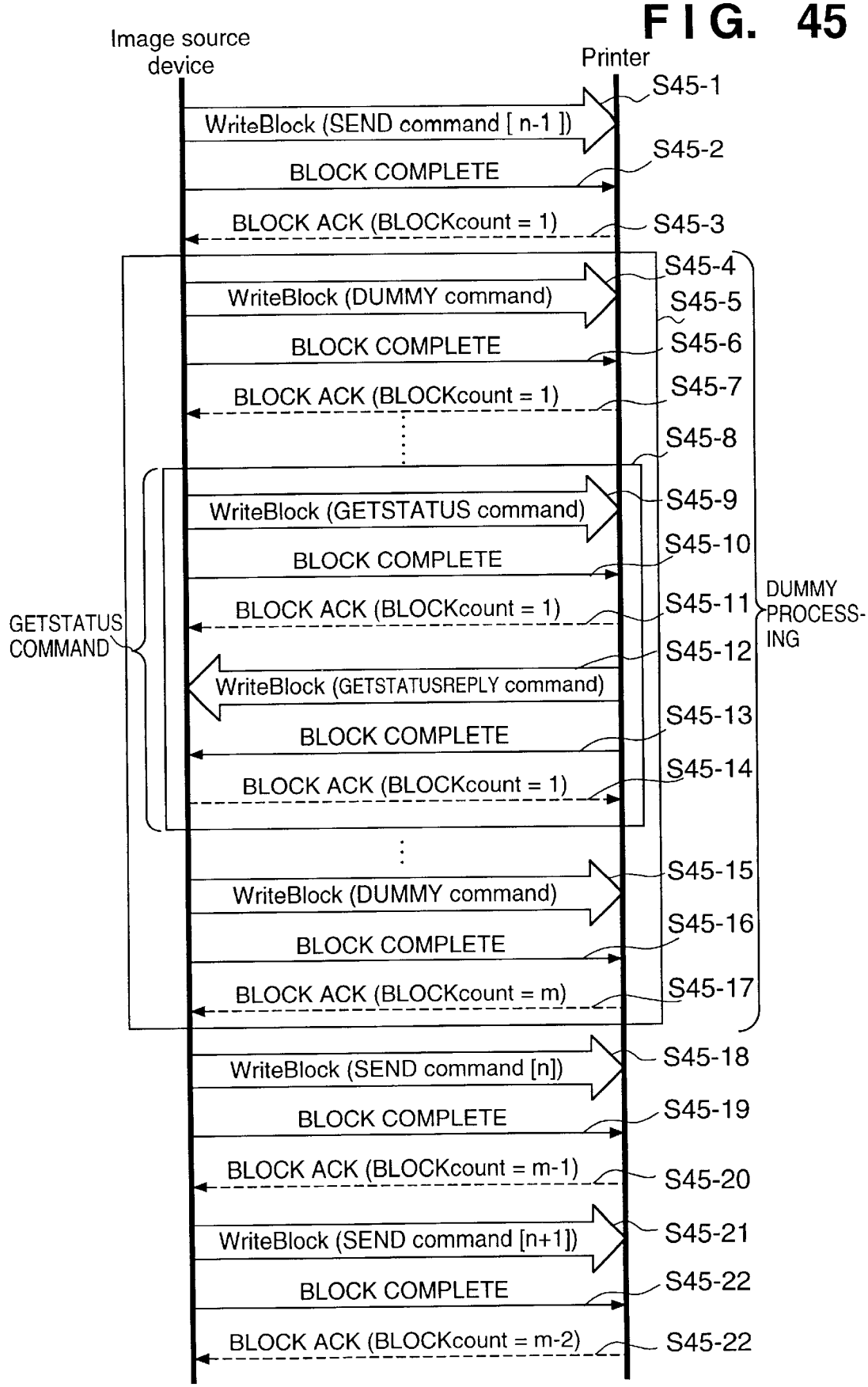
FIG. 45 is a view showing the DUMMY and GETSTATUS command control procedure.

FIG. 45 shows the control procedure of the DUMMY command and GETSTATUS command in this embodiment. As described above, in step S44-9 of FIG. 44, when the BLOCK count is 1, DUMMY processing of this embodiment is executed. Referring to FIG. 45, step S45-5 represents DUMMY processing, and step S45-8 represents GETSTATUS command execution processing during DUMMY processing. GETSTATUS command execution processing during DUMMY processing in step S45-8 will be described below in detail.

When the time when the image source device is to receive the printer status comes during DUMMY processing in step S45-5, the image source device writes a GETSTATUS command in place of the DUMMY command that is being written in the BLOCK register of the printer (step S45-9). The GETSTATUS command execution processing is in FIG. 41, and a detailed description thereof will be omitted.

When the BLOCK count set in BLOCK ACK returned in response to the GETSTATUS command is still 1 in step S45-11, DUMMY command processing is executed even after execution of GETSTATUS command processing until the BLOCK count has a number other than 1 in steps S45-15 to S45-17.

When a BLOCK count with a value other than 1 is returned in step S45-17, SEND command processing is resumed from step S45-18, as described above with reference to FIG. 44.

As described above with reference to FIGS. 44 and 45, in this embodiment, the image source device can know the number of remaining buffers on the printer side, and DUMMY processing is executed when the number of remaining buffers is 1. During DUMMY processing, the DUMMY command is not stored in any buffer on the printer side, so the number of remaining buffers does not decrease. Hence, another command such as a GETSTATUS command can be written in the BLOCK register during DUMMY processing. More specifically, in the example shown in FIG. 40, when no free buffers remain, i.e., during the response time T2, no GETSTATUS command can be issued by an interrupt. However, in this embodiment, a GETSTATUS command can be issued by an interrupt using a DUMMY command for preventing the printer having no free buffer. Details of processing of the image source device and printer at this time will be described later.

DUMMY Command Control Procedure Before SEND

Figure 46:
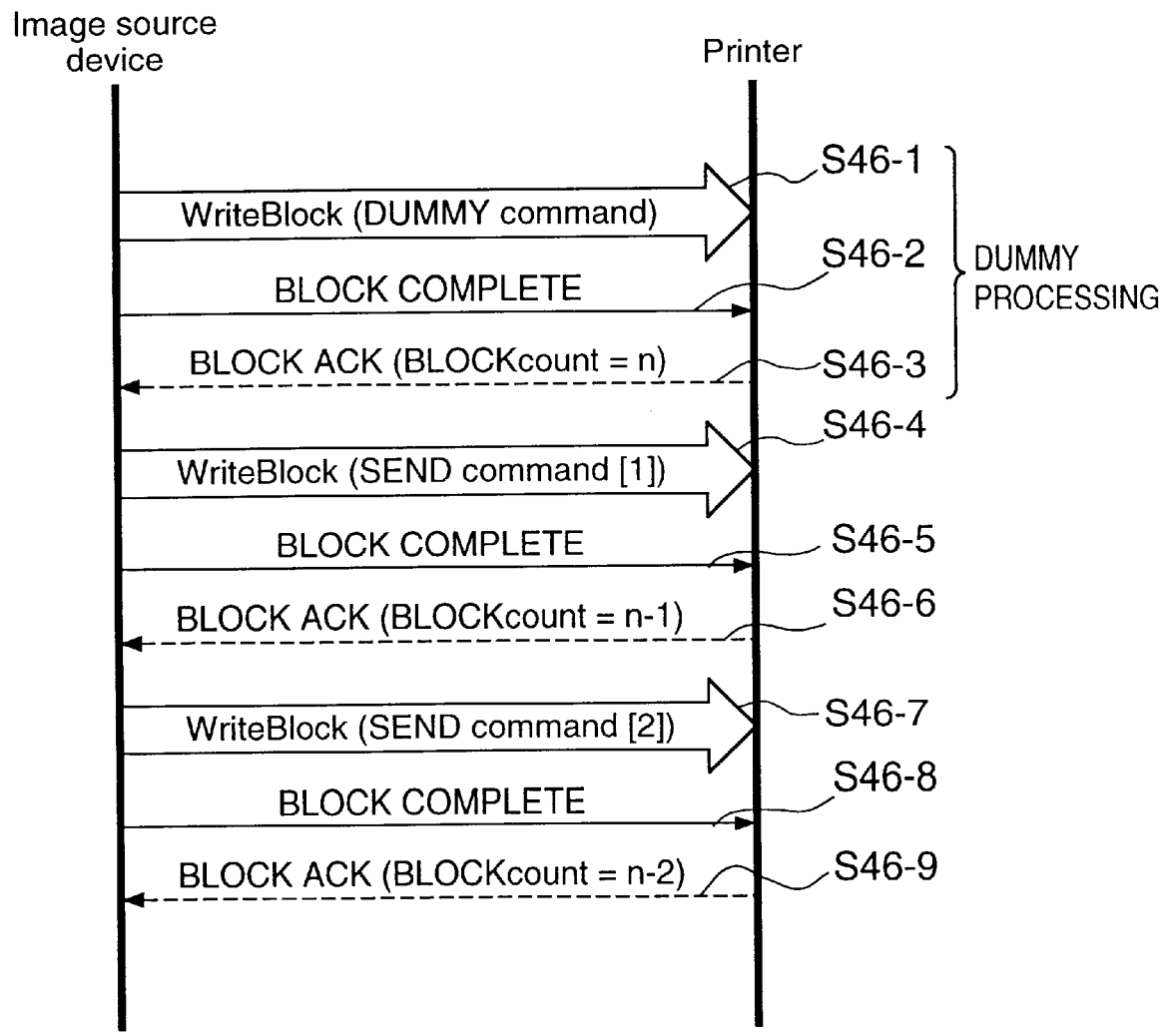
FIG. 46 is a view showing the DUMMY command control procedure before a SEND command.

FIG. 46 is a view showing the control procedure of a DUMMY command before a SEND command in this embodiment. That is, FIG. 46 shows a procedure of sending a DUMMY command before the first SEND command is executed.

Referring to FIG. 46, the first SEND command is executed in step S46-4. Prior to this step, DUMMY processing is performed in steps S46-1 to S46-3. When DUMMY command processing is performed first, no buffers are used by SEND commands. Since the BLOCK count n returned in step S46-3 represents the total number of buffers of the printer, the image source device can know the total number of buffers of the printer before the start of SEND command processing. That is, before the start of use of buffers, the total number of buffers can be known.

For example, when DUMMY processing is executed for a printer having only one buffer, the SEND command cannot be executed, and DUMMY command processing may be endlessly repeated. As shown in FIG. 46, by executing the DUMMY command before the SEND command, DUMMY processing can be inhibited when the number of buffers of the printer is 1.

Increase in Traffic Efficiency

Figure 47:
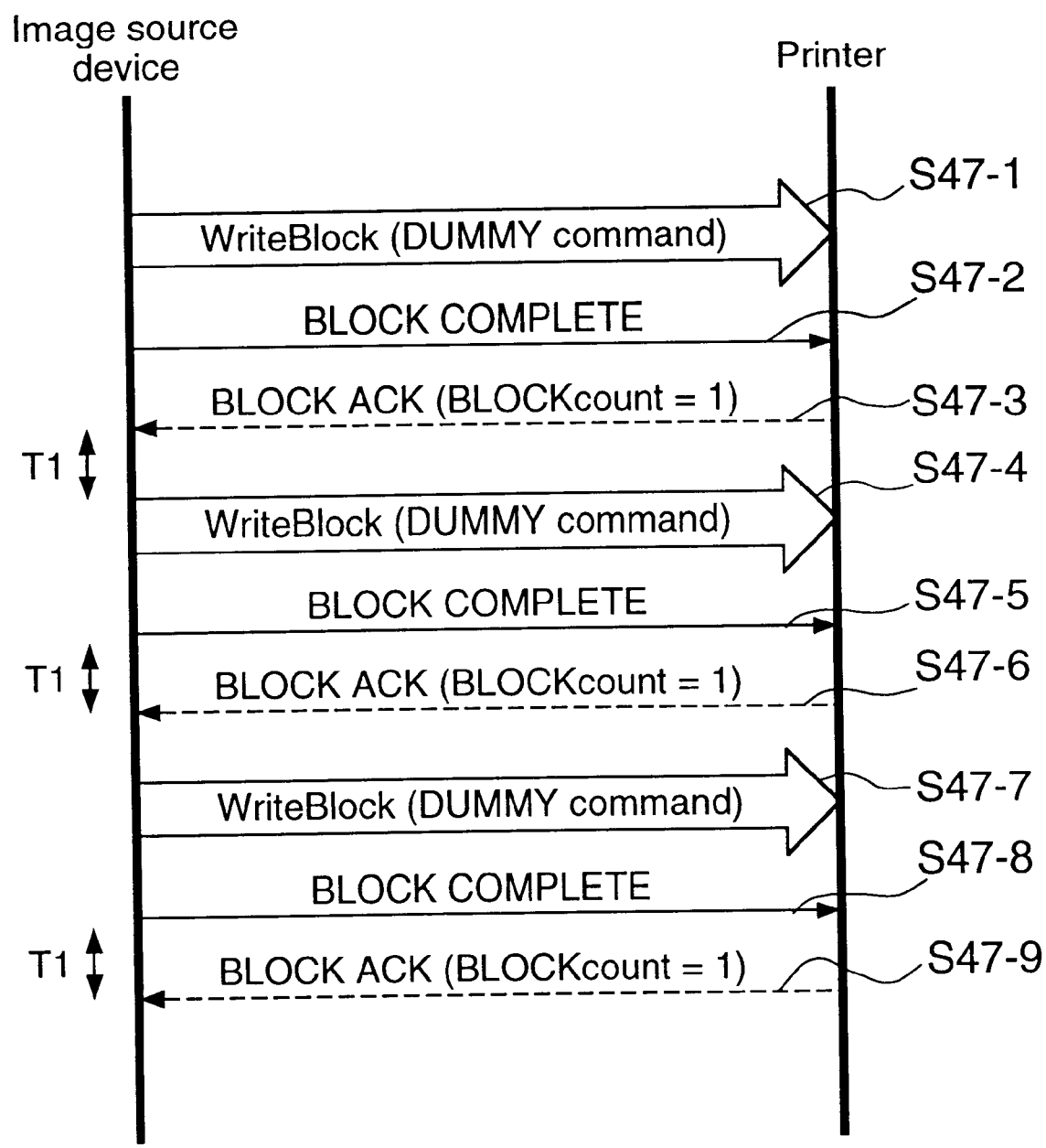
FIG. 47 is a view showing the general DUMMY command control procedure.

FIG. 47 is a view showing the control procedure of a DUMMY command, that has been described above with reference to FIG. 44. The response time of BLOCK ACK to BLOCK COMPLETE is T1. As far as BLOCK ACK with a BLOCK count "1" is returned, the image source device repeatedly writes a DUMMY command in the BLOCK register on the printer side.

If the response time T1 is short, DUMMY processing is executed many times to undesirably increase traffics on the bus. To solve this on the image source device side, after BLOCK ACK is returned, the time until the next DUMMY command is written in the BLOCK register may be counted by a timer to adjust the number of DUMMY command writes in the BLOCK register. With this method, however, processing on the image source device side increases and becomes complex.

In this embodiment, traffic efficiency on the 1394 serial bus is increased by the following method.

Figure 48:
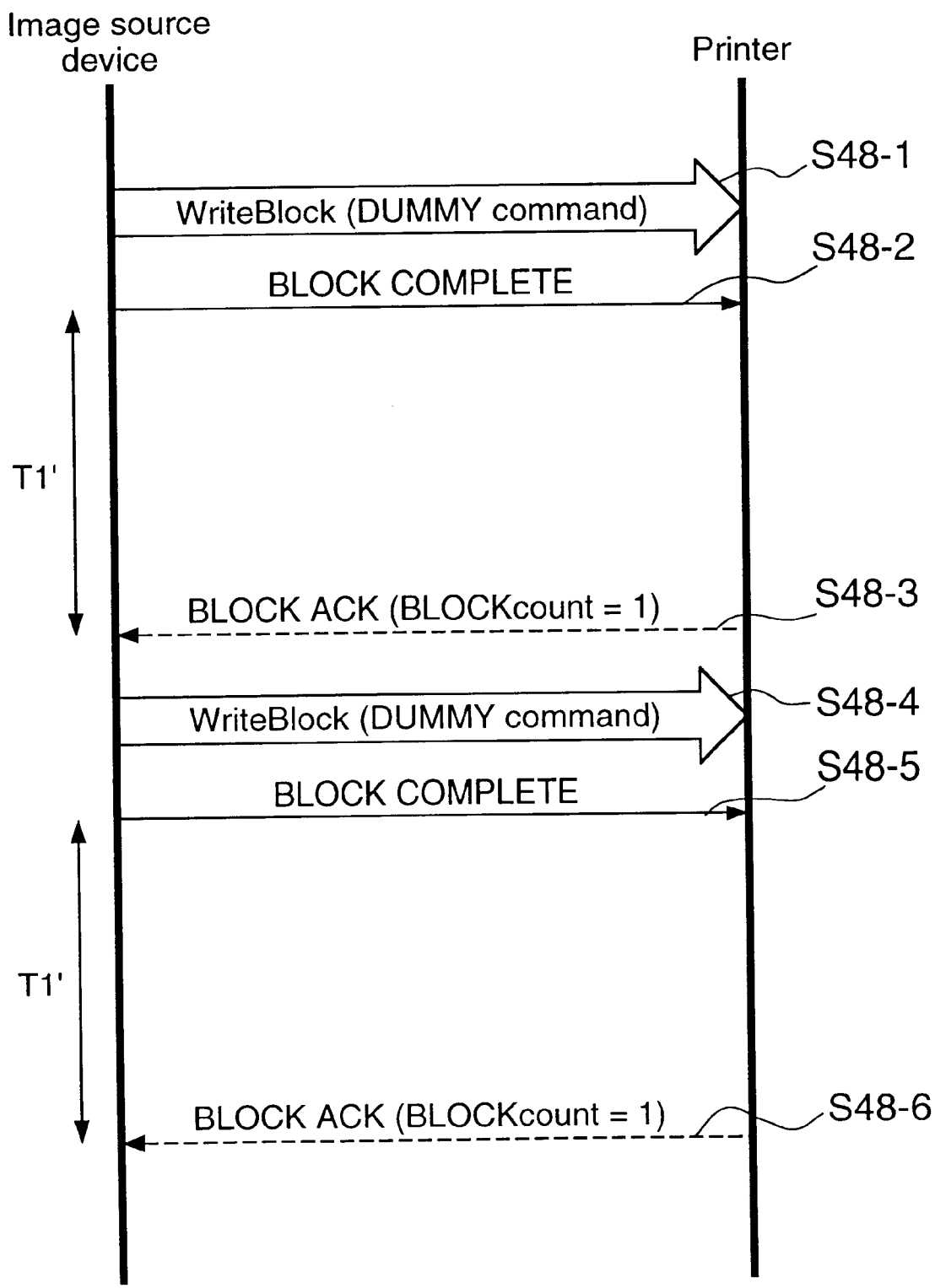
FIG. 48 is a view showing the DUMMY command control procedure for increasing the traffic efficiency.

FIG. 48 is a view showing the DUMMY command control procedure for suppressing an increase in number of traffics in this embodiment. Referring to FIG. 48, the response time until the printer returns BLOCK ACK in response to BLOCK COMPLETE (steps S48-2 and S48-3) is adjusted to T1' longer than T1. When BLOCK ACK is returned, the image source device can immediately write a DUMMY command in the BLOCK register of the printer.

Since the response time T1' can be controlled on the printer side, the time T1' can be adjusted in consideration of conditions on the printer side, e.g., the print speed, buffer consumption speed, and the like.

In this embodiment, by only adjusting the response time to T1' on the printer side, the traffic efficiency on the 1394 serial bus can be increased without adding any processing to the image source device side.

Data transmission processing on the image source device side and that on the printer side in this embodiment will be described below in detail.

Image Transmission Processing of Image Source Device

Figure 49:
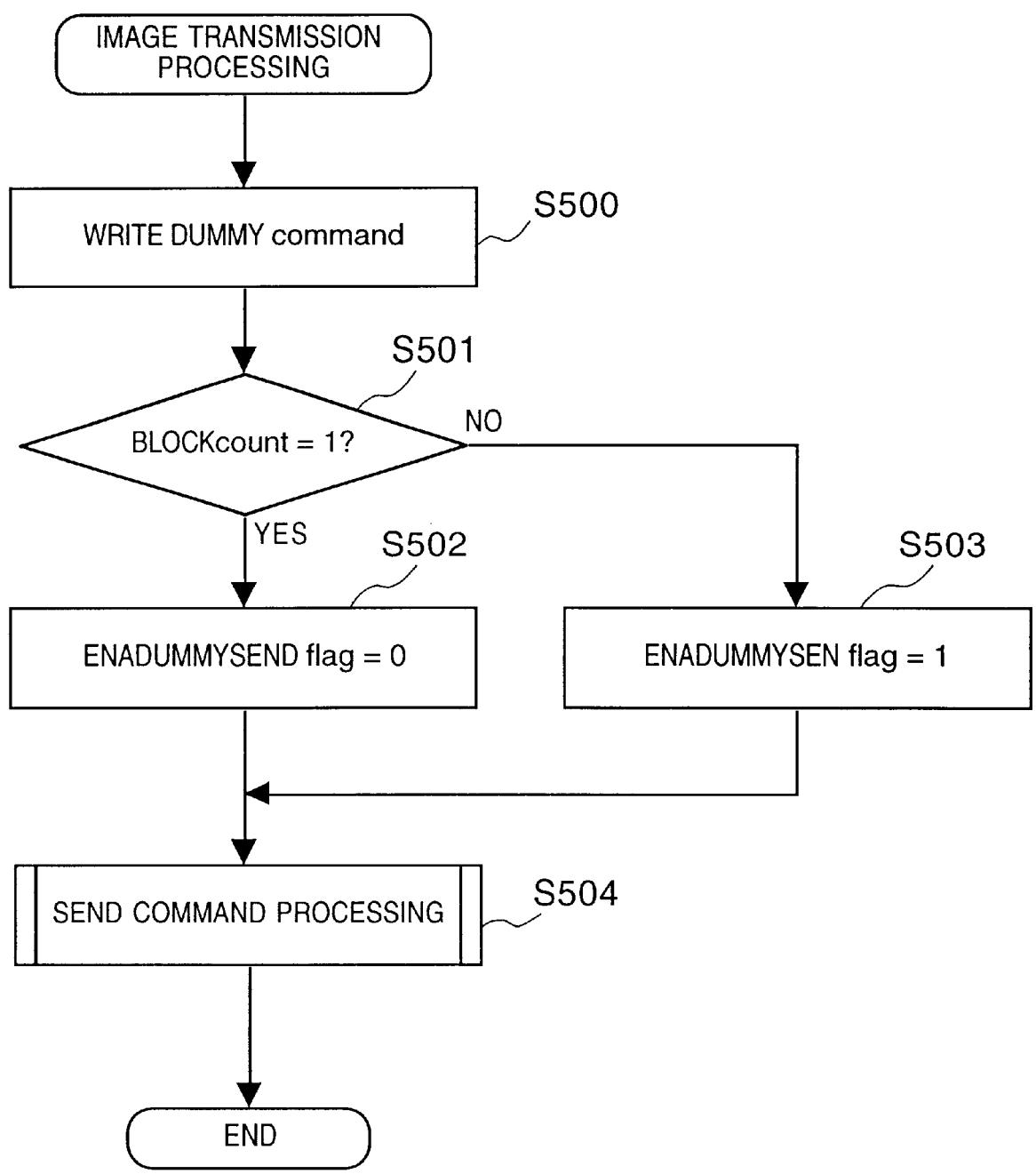
FIG. 49 is a flow chart showing image transmission processing of the image source device.

FIG. 49 is a flow chart showing image transmission processing of the image source device of this embodiment. In image transmission processing, the image source device transmits image data to the printer, and the printer prints the image data. In step S500, DUMMY command write processing is performed. With this processing, the number of buffers of the transmission destination is confirmed, as described above with reference to FIG. 46. In step S501, it is determined whether the BLOCK count returned in step S500 is 1. If YES in step S501, the flow advances to step S502 to set the ENADUMMYSEND flag at 0. The ENADUMMYSEND flag is used to determine whether DUMMY processing is to be executed. If the ENADUMMYSEND flag is at 0, DUMMY processing is not executed. If the ENADUMMYSEND flag is at 1, DUMMY processing is performed. If NO in step S501, the flow advances to step S503 to set the ENADUMMYSEND flag at 1. The flow advances to step S504 to execute SEND command processing to be described later.

Figure 50:
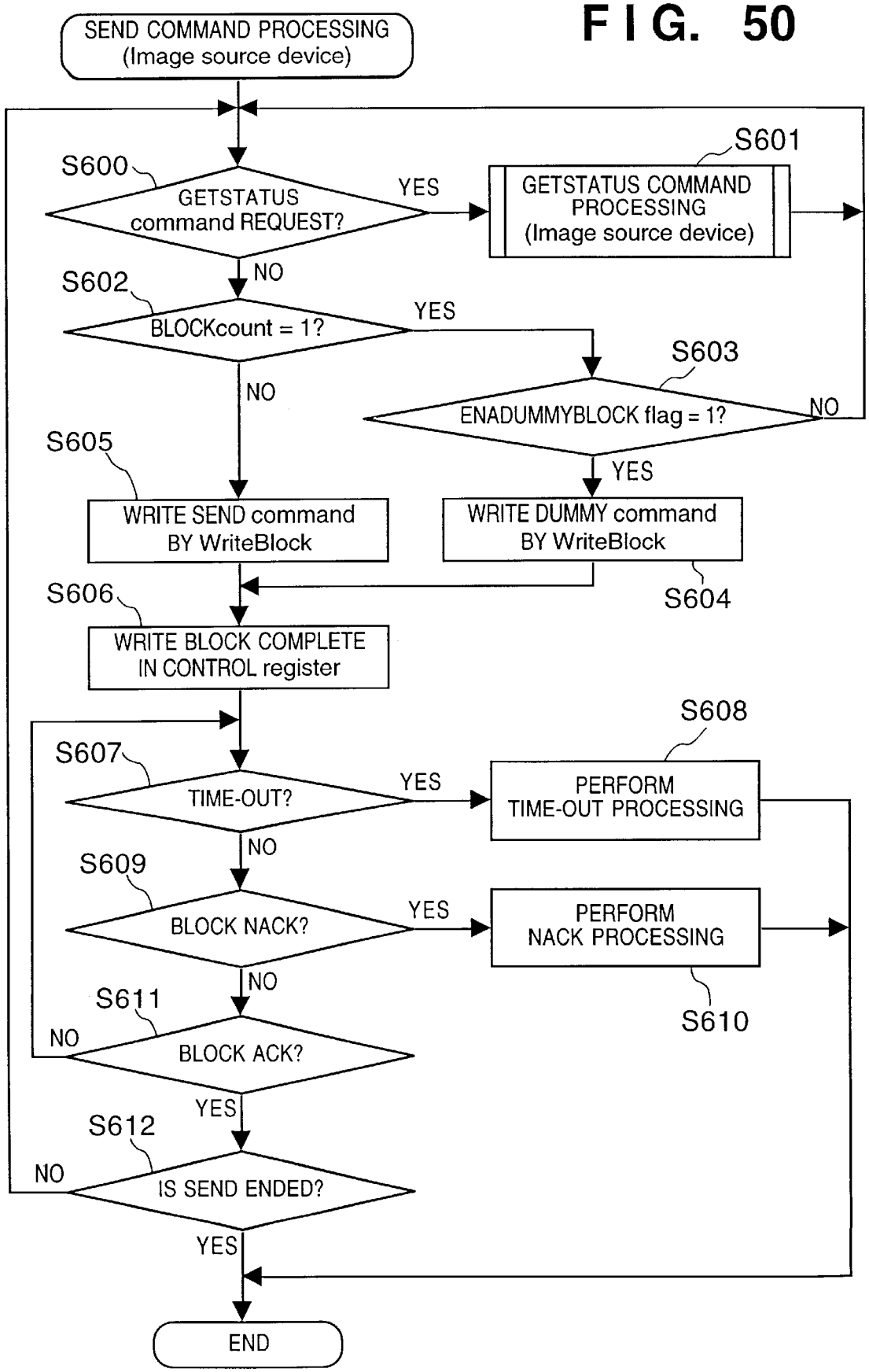
FIG. 50 is a flow chart showing SEND command processing of the image source device.

FIG. 50 is a flow chart showing details of SEND command processing of the image source device in step S504. In step S600, it is determined whether a GETSTATUS command is requested during SEND command processing. In this embodiment, a GETSTATUS command interrupt is done by timer processing every predetermined time to set a GETSTATUS command request. Details of this GETSTATUS command interrupt will be described later in detail. If YES in step S600, the flow advances to step S601 to execute GETSTATUS command processing. With this processing, the printer status is acquired as described above with reference to FIG. 38. This is used during execution of the SEND command to confirm whether the printer has no error or abnormality.

When GETSTATUS command processing in step S601 is ended, the flow returns to step S600. If NO in step S600, the flow advances to step S602 to check whether the BLOCK count is 1. If YES in step S602, the number of free buffers of the printer is 1. The flow advances to step S603 to check whether the ENADUMMYBLOCK flag is 1. The ENADUMMYBLOCK flag represents whether DUMMY command processing can be executed and is set in accordance with the total number of free buffers on the printer side in steps S502 and S503 of FIG. 49. If NO in step S603, the flow returns to step S600 without executing DUMMY command processing. This corresponds to processing of inhibiting DUMMY command processing when the total number of buffers on the printer side is 1, as shown in FIG. 46 of this embodiment. If YES in step S603, the flow advances to step S604 to execute DUMMY command transmission processing shown in step S45-4 of FIG. 45. More specifically, when the total number of buffers on the printer side is 1 or more, and the BLOCK count is 1 (the number of remaining free buffers of the printer is 1), a DUMMY command is transmitted. The flow advances to step S606.

If NO in step S602, the flow advances to step S605 to transmit a SEND command. This processing corresponds to step S45-1, S45-18, or S45-21 in FIG. 45 and is performed to send image data to the printer. When image data cannot be stored in one buffer, the image data is segmented into a plurality of SEND commands and written in the BLOCK register of the printer, as shown with reference to FIG. 39. Step S605 corresponds to processing of writing one of segmented image data. The entire image data is transmitted by repeatedly executing step S605.

The flow advances to step S606 to write BLOCK COMPLETE in the CONTROL register on the printer side. By writing BLOCK COMPLETE, the printer side is notified of completion of the data write in the BLOCK register.

Next, the flow advances to step S607 to check whether the time is out. More specifically, the time after BLOCK COMPLETE is written in the CONTROL register of the printer in step S606 until BLOCK ACK/NACK is returned to the RESPONSE register of the image source device is counted by a timer. The time is out when no BLOCK ACK/NACK is returned even after the elapse of a predetermined time. If YES in step S607, the flow advances to step S608 to execute time-out processing. In this time-out processing, the user is notified that the time is out or data transmission to the printer has failed due to some reason, or data transmission to the printer is ended. After time-out processing, SEND command processing is ended.

If NO in step S607, the flow advances to step S609 to check whether BLOCK NACK is returned from the printer to the RESPONSE register of the image source device. If YES in step S609, the flow advances to step S610 to execute NACK processing because the data sent to the printer has a certain error. In NACK processing in step S610, data transmission to the printer is ended because data transmission to the printer has failed due to some reason, as in time-out processing. After NACK processing, SEND command processing is ended.

If NO in step S609, the flow advances to step S611 to check whether BLOCK ACK is returned from the printer. If NO in step S611, the flow returns to step S607. If YES in step S611, the flow advances to step S612 to check whether the SEND command is ended. If NO in step S612, the flow returns to step S600 to repeat the above-described processing. If YES in step S612, SEND command processing is ended.

As described above with reference to FIG. 50, the image source device of this embodiment can execute the SEND and DUMMY commands and process the GETSTATUS command during execution of the SEND command. This processing corresponds to the procedure on the image source device side in the DUMMY and GETSTATUS command control procedures described above with reference to FIG. 45.

Figure 51:
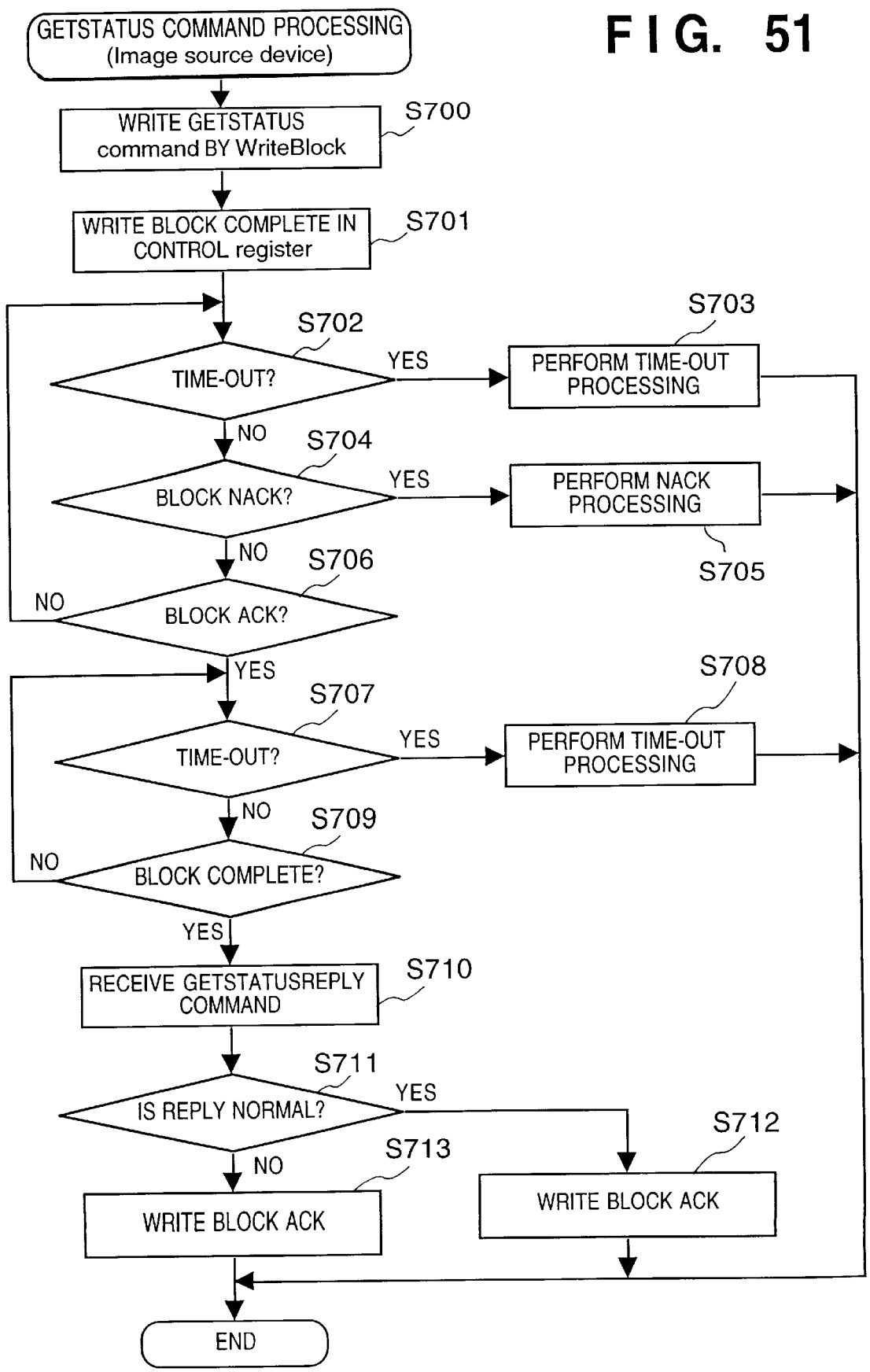
FIG. 51 is a flow chart showing GETSTATUS command processing of the image source device.

FIG. 51 is a flow chart showing details of GETSTATUS command processing in step S601 of FIG. 50. In this processing, the image source device writes a command for receiving the status from the printer in the BLOCK register on the printer side. In step S700, a GETSTATUS command is written in the BLOCK register on the printer side. This corresponds to step S45-9 in FIG. 45. The flow advances to step S701 to write BLOCK COMPLETE in the CONTROL register of the printer. This corresponds to step S45-10 in FIG. 45. The flow advances to step S702 to check whether the time is out. More specifically, the response time after BLOCK COMPLETE is written in the CONTROL register of the printer in step S701 until BLOCK ACK/NACK is returned from the printer to the RESPONSE register is counted. The time is out when BLOCK ACK/NACK is not returned even after the elapse of a predetermined time. If YES in step S702, the flow advances to step S703 to execute time-out processing. This time-out processing is the same as that in step S608 of FIG. 50. After time-out processing, GETSTATUS command processing is ended.

If NO in step S702, the flow advances to step S704 to check whether BLOCK NACK is returned from the printer to the RESPONSE register of the image source device. If YES in step S704, the flow advances to step S705 to execute NACK processing because the data sent to the printer has a certain error. This NACK processing is the same as in step S610 of FIG. 50. After NACK processing, GETSTATUS command processing is ended. If NO in step S704, the flow advances to step S706 to check whether BLOCK ACK is returned from the printer. If NO in step S706, the flow returns to step S702. Processing in steps S702 to S706 corresponds to step S45-11 in FIG. 45.

Next, the flow advances to step S707. In steps S707 to S709, time-out until BLOCK COMPLETE is checked. This corresponds to determination of the BLOCK COMPLETE response time from the printer in steps S45-12 and S45-13 of FIG. 45. If YES in step S707, it means that BLOCK COMPLETE has not arrived within a predetermined time, and the flow advances to step S708. In step S708, the same time-out processing as in step S703 is performed, and after this, GETSTATUS command processing is ended. If NO in step S707, the flow advances to step S709 to check whether BLOCK COMPLETE is written in the CONTROL register of the image source device. If NO in step S709, the flow returns to step S707.

If YES in step S709, the flow advances to step S710 to receive a GETSTATUS reply. This reply responding to the GETSTATUS command is shown on the right side of FIG. 37. FIG. 38 shows the contents of the reply. In step S711, it is determined whether the reply in step S710 is normal, i.e., the returned status is correctly written in the BLOCK register of the image source device. If YES in step S711, BLOCK ACK is written in the RESPONSE register of the printer in step S712. If NO in step S711, BLOCK NACK is written in step S713. Processing in step S712 or S713 corresponds to step S45-14 in FIG. 45. GETSTATUS command processing is ended.

With the GETSTATUS command processing (step S45-8 in FIG. 45) shown in FIG. 51, the image source device can obtain the status from the printer.

Figure 52:
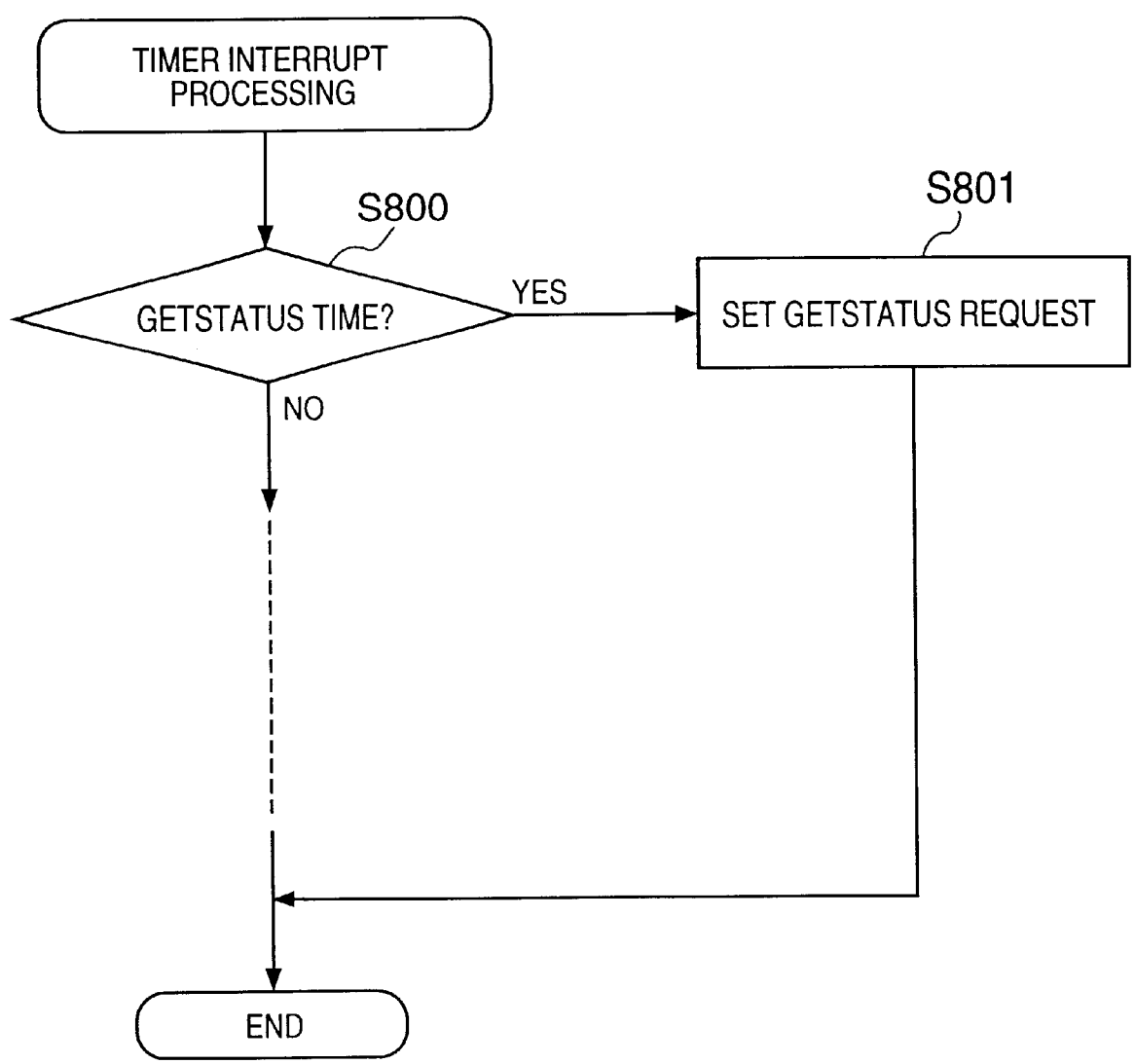
FIG. 52 is a flow chart showing timer interrupt processing of the image source device.

FIG. 52 is a flow chart showing details of timer interrupt processing of the image source device. In the image source device, this timer interrupt processing is called every predetermined time. First, in step S800, it is checked whether it is time of GETSTATUS command processing. If YES in step S800, the flow advances to step S801 to set a GETSTATUS command request. When this request is determined in step S600 of FIG. 50, the above-described GETSTATUS command processing is executed. After the request is set in step S801, timer processing is ended.

Image Transmission Processing of Printer

Figure 53:
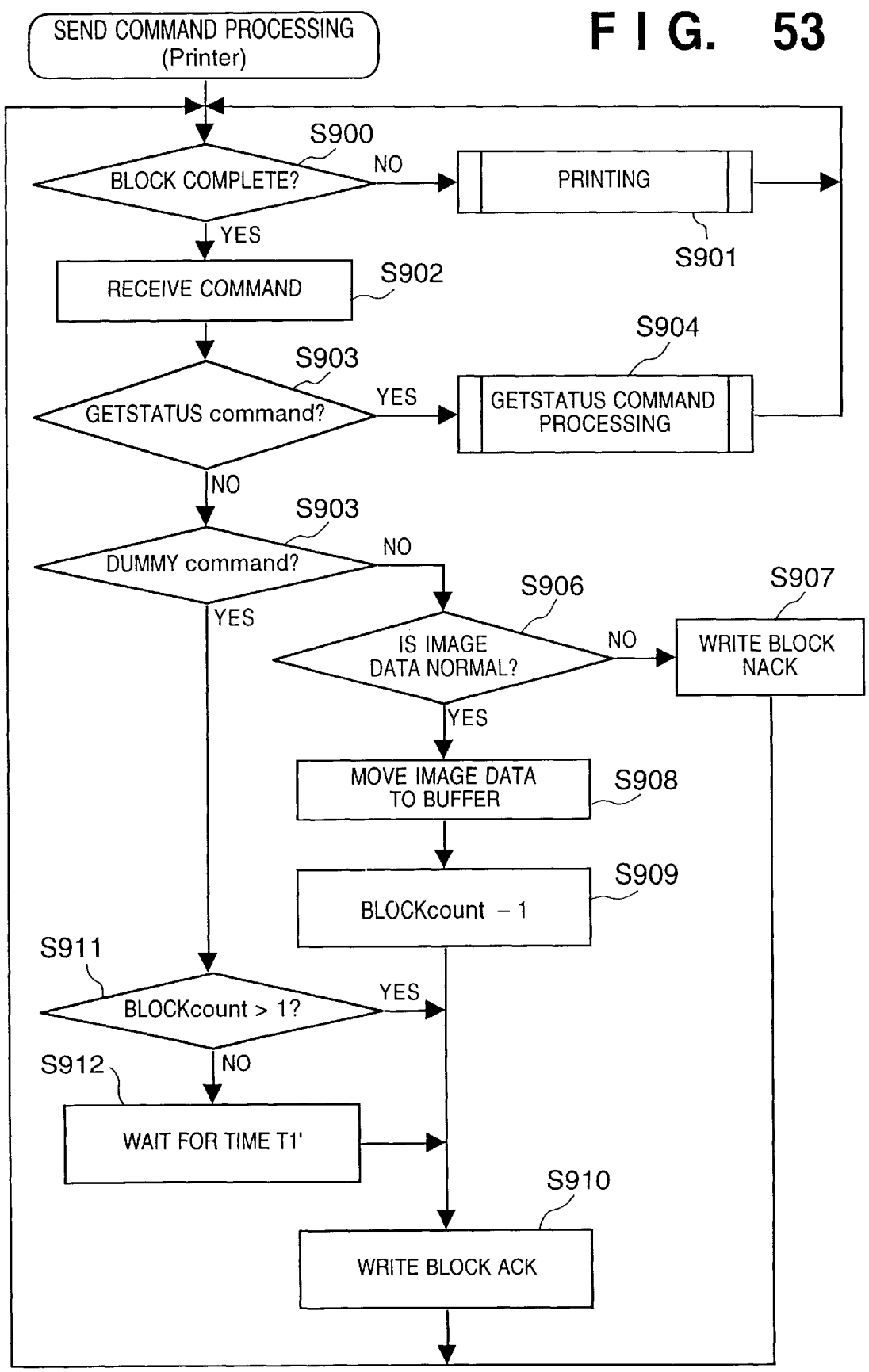
FIG. 53 is a flow chart showing SEND command processing of the printer.

FIG. 53 is a flow chart showing SEND command processing on the printer side. In step S900, it is checked whether BLOCK COMPLETE is written in the CONTROL register on the printer side. If NO in step S900, the flow advances to step S901 to execute printing, and after this, the flow returns to step S900. If YES in step S900, the flow advances to step S902 to receive the written command. This command comprises the Command ID 35-1 and Parameter 35-2, as shown in FIG. 35. The type of command can be known by checking the Command ID.

Next, the flow advances to step S903 to check whether the command written in the BLOCK register is a GETSTATUS command, i.e., the Command ID represents a GETSTATUS command. If YES in step S903, the flow advances to step S904 to execute GETSTATUS command processing on the printer side (to be described later). After GETSTATUS command processing is executed, the flow returns to step S900. If NO in step S903, it is checked whether the command is a DUMMY command. If NO in step S905, it is determined that the command is a SEND command, and the flow advances to step S906 to check whether image data sent by the SEND command is normal. If NO in step S906, the flow advances to step S907 to write BLOCK NACK in the RESPONSE register of the image source device. With this processing, the image source device is notified that the image data is not normally sent.

If YES in step S906, the flow advances to step S908 to move the image data written in the BLOCK register to an appropriate internal buffer. This is processing of moving the image data in the BLOCK register to one of the buffers 33-2 to 33-7 shown in FIG. 33. The flow advances to step S909 to decrement the BLOCK count representing the number of remaining free buffers by one. The flow advances to step S910 to write BLOCK ACK in the RESPONSE register of the image source device, and the flow returns to step S900.

If YES in step S905, the flow advances to step S911 to check whether the BLOCK count is larger than 1. If YES in step S911, the DUMMY command is not written in the final buffer, the flow advances to step S910 to write BLOCK ACK in the RESPONSE register of the image source device. If NO in step S911, the flow advances to step S912 to wait for the time T1'. T1' is the response time shown in FIG. 48 until BLOCK ACK is returned in response to BLOCK COMPLETE. As the time T1', a longer time than T1 in FIG. 47 is set. The time until BLOCK ACK is returned is adjusted by this time T1', and consequently, the number of DUMMY commands transmitted from the image source device to the printer can be decreased.

With SEND command processing shown in FIG. 53, image data reception processing on the printer side is executed, GETSTATUS and DUMMY commands can be processed during execution of a SEND command, and the time until ACK is returned can be adjusted in accordance with the number of free buffers represented by the BLOCK count.

Figure 54:
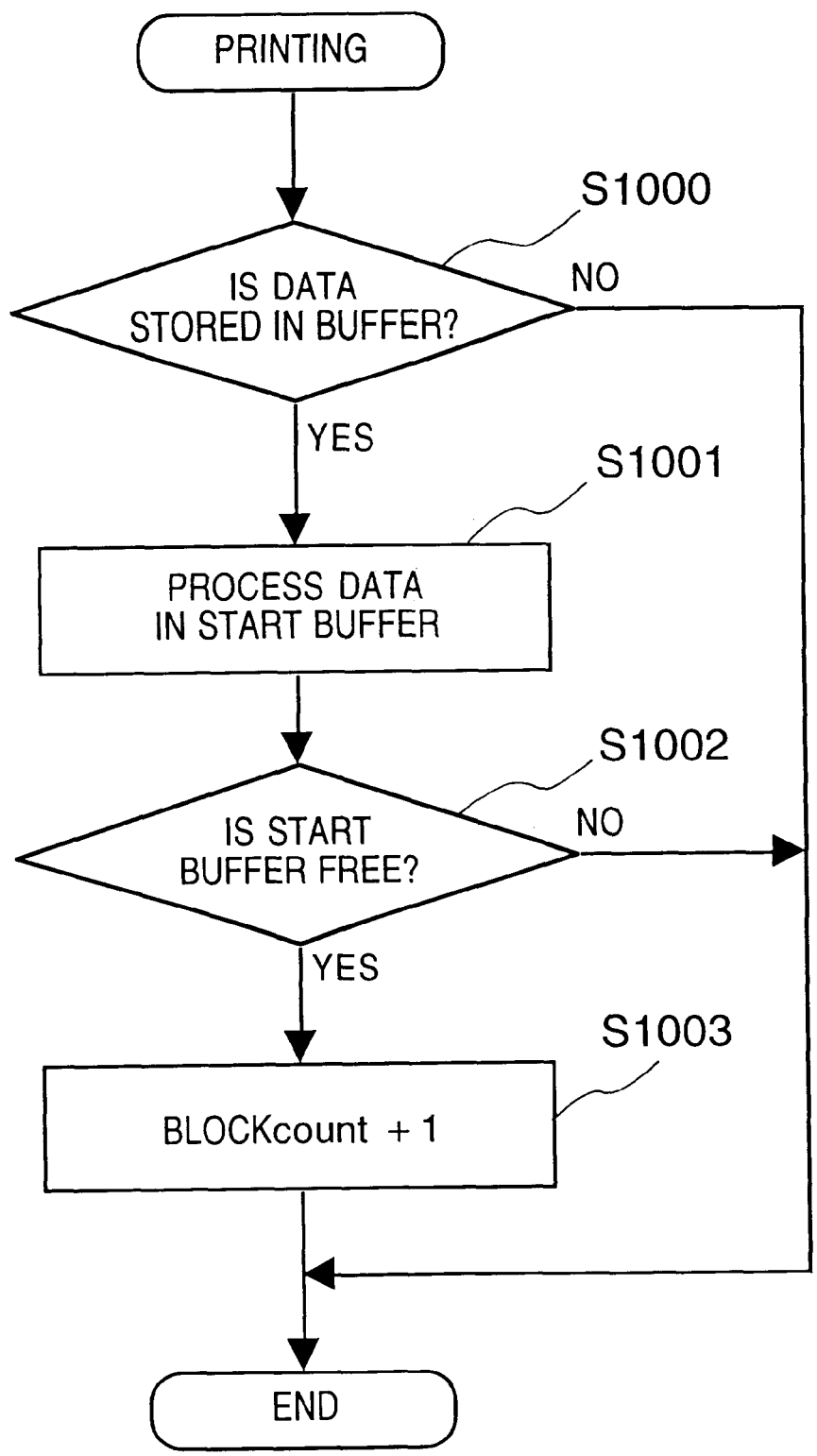
FIG. 54 is a flow chart showing printing by the printer.

FIG. 54 is a flow chart showing printing in step S901 of FIG. 53. First, in step S1000, it is checked whether data is present in the buffer. If NO in step S1000, printing is ended. If YES in step S1000, the flow advances to step S1001 to print data in the start buffer. The start buffer means a buffer at the start of unprinted data. In step S1002, it is checked whether the start buffer is free. If YES in step S1002, the flow advances to step S1003 to increment the BLOCK count by one. That is, data in the start buffer is completely printed to make the buffer free, the free buffer count is incremented by one. Printing is ended. With this printing processing, printing and free buffer management in this embodiment can be performed.

Figure 55:
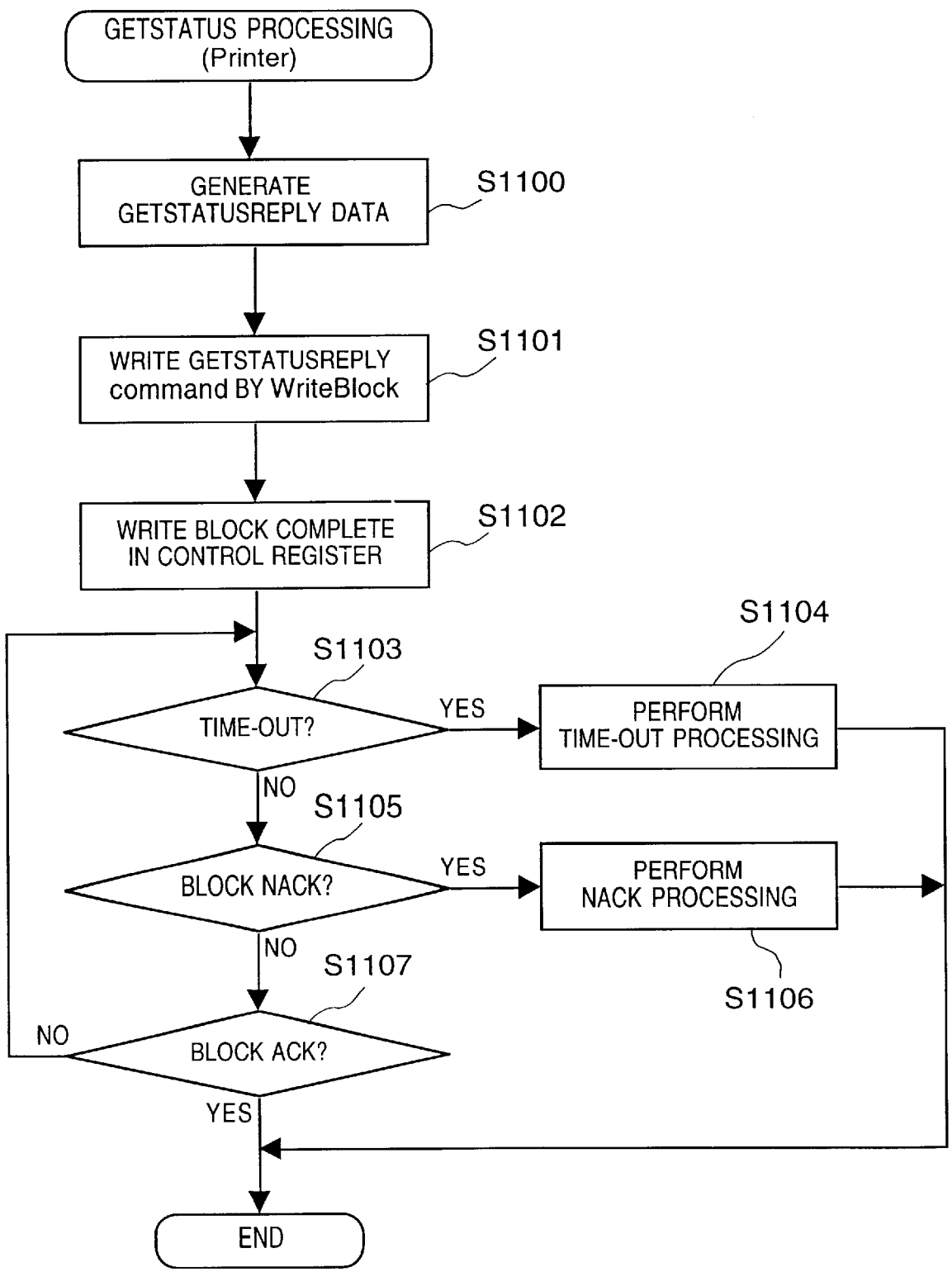
FIG. 55 is a flow chart showing GETSTATUS command processing of the printer.

FIG. 55 is a flow chart showing details of GETSTATUS command processing of the printer in step S904 of FIG. 53. In this processing, a reply is returned from the printer in response to the GETSTATUS command from the image source device. First, in step S1100, a status to be returned is generated. The contents of this status are shown in FIG. 38, and corresponding contents are set by inspecting the printer status. In step S1101, a GETSTATUS reply is written in the BLOCK register of the image source device. This corresponds to step S45-12 in FIG. 45.

In step S1102, BLOCK COMPLETE is written in the CONTROL register of the image source device. This corresponds to step S45-13 of FIG. 45. The flow advances to step S1103 to check whether the time is out. More specifically, the time after BLOCK COMPLETE is written in the CONTROL register of the image source device in step S1102 until BLOCK ACK/NACK is returned to the RESPONSE register of the printer is counted. The time is out when BLOCK ACK/NACK is not returned even after the elapse of a predetermined time. If YES in step S1103, the flow advances to step S1104 to execute time-out processing. This processing is the same as that in step S608 of FIG. 50. After time-out processing, GETSTATUS command processing is ended.

If NO in step S1103, the flow advances to step S1105 to check whether BLOCK NACK is returned from the image source device to the RESPONSE register of the printer. If YES in step S1105, the flow advances to step S1106 to execute the same NACK processing as in step S610 of FIG. 50 because the data sent to the image source device has a certain error. After NACK processing, GETSTATUS command processing is ended. If NO in step S1105, the flow advances to step S1107 to check whether BLOCK ACK is returned from the image source device. If NO in step S1107, the flow returns to step S1103. Processing in steps S1103 to S1107 corresponds to step S45-14 in FIG. 45. If YES in step S1107, GETSTATUS processing is ended.

With the GETSTATUS command processing shown in FIG. 55, the printer status is returned to the image source device.

As described above with reference to FIGS. 42 to 55, according to the first embodiment, the image source device can know the current number of free buffers of the printer on the basis of BLOCK ACK/NACK and BLOCK count written from the printer in the RESPONSE register. When the number of free buffers is 1, a DUMMY command can be sent in place of a SEND command. In addition, even while a DUMMY command is being executed, a GETSTATUS command can be executed. For this reason, even while a SEND command is being executed, a GETSTATUS command can be arbitrarily executed. The DUMMY command can have a smaller data amount as compared to the remaining commands such as a SEND command, so the influence on the traffics on the 1394 serial bus can be minimized.

Since the time interval of DUMMY command transmission can be adjusted on the printer side, the traffic efficiency on the 1394 serial bus can be increased without increasing the load on the image source device side.

When the total number of buffers of the printer is 1, DUMMY command processing is not performed. Hence, necessary SEND command processing is not impeded.

Second Embodiment

The second embodiment of the present invention will be described below.

Register Structure

Figure 56:
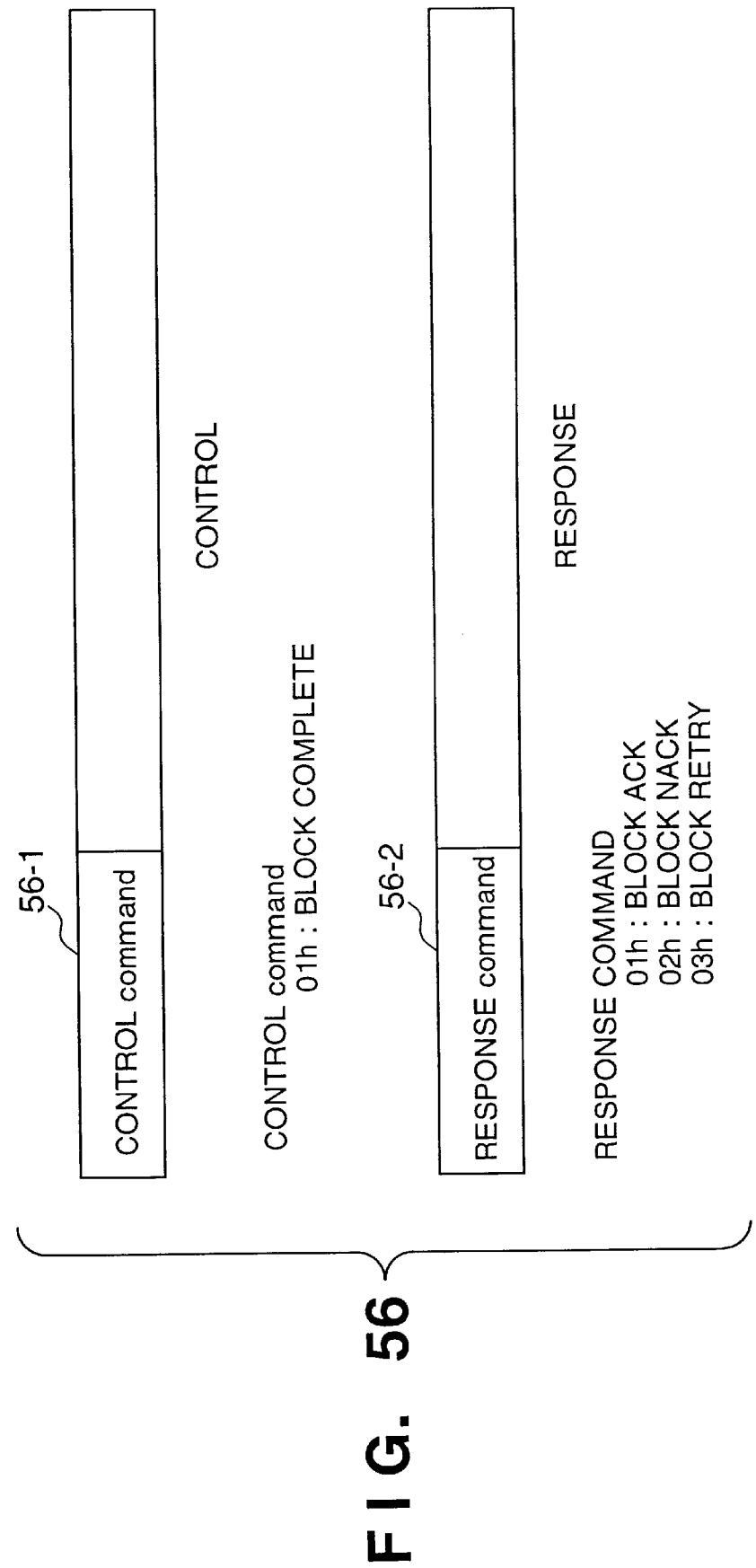
FIG. 56 is a view showing the structure of CONTROL and RESPONSE registers in the second embodiment.

In FIG. 56, the general structure of CONTROL and RESPONSE registers, which is shown in FIG. 34 of the first embodiment, is improved in the second embodiment. In the second embodiment, in the RESPONSE register shown on the lower side of FIG. 56, BLOCK RETRY of 03h is added as a RESPONSE 56-2. The BLOCK RETRY command 56-2 represents an image data retransmission request to the image source device when the number of free buffers on the printer side is 1. Hence, when the RESPONSE command 56-2 is 03h, it represents BLOCK RETRY, i.e., image data retransmission request.

Figure 57:
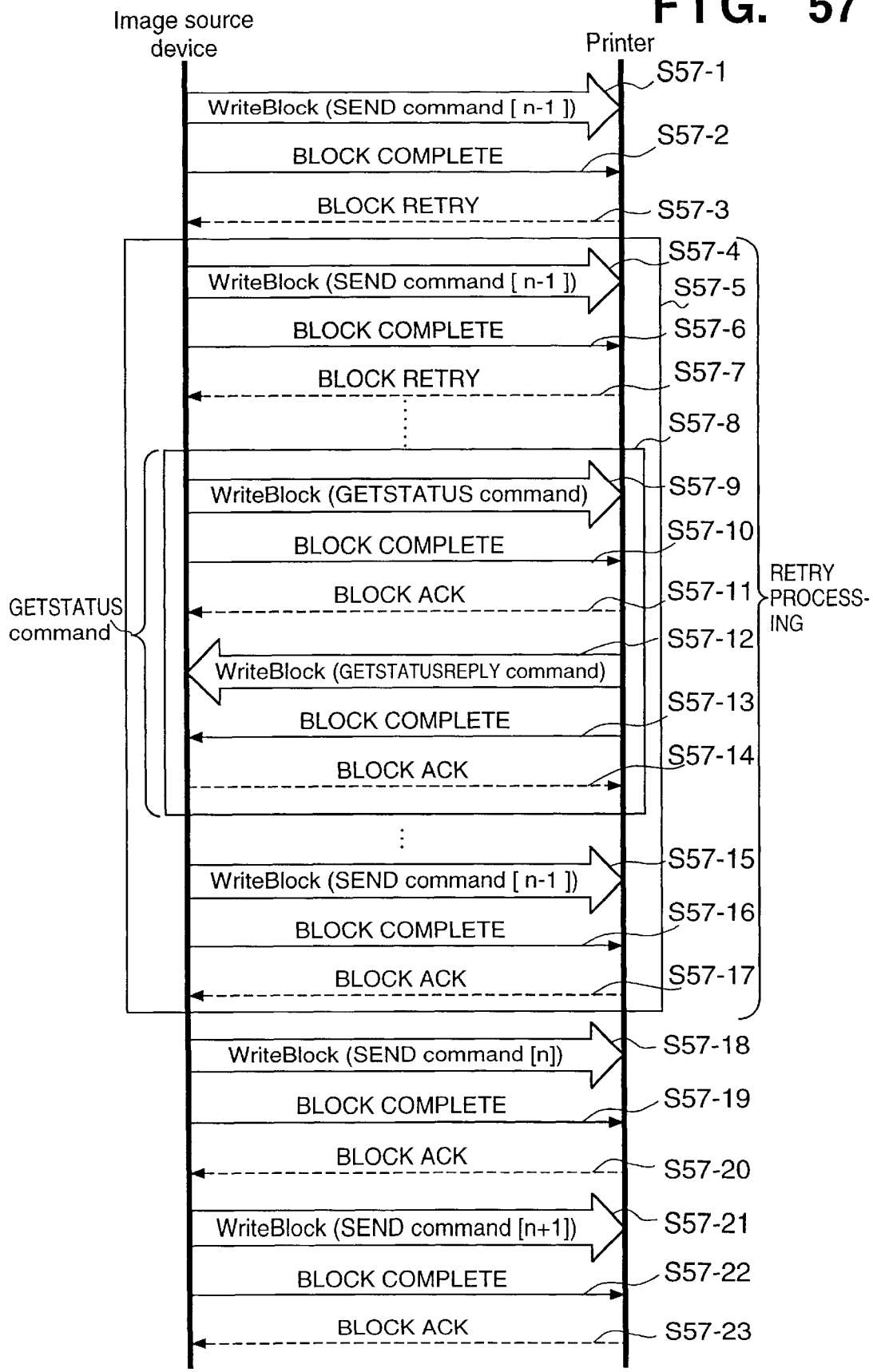
FIG. 57 is a view showing the RETRY and GETSTATUS command control procedure of the second embodiment.

FIG. 57 is a view showing the RETRY and GETSTATUS command control procedure of the second embodiment. This corresponds to the DUMMY and GETSTATUS command control procedure shown in FIG. 45 of the first embodiment. FIG. 57 is different from FIG. 45 in the following points. In step S45-3 of FIG. 45, a BLOCK count "1" is returned. In step S57-3 of FIG. 57, a BLOCK RETRY is returned. In step S45-4 of FIG. 45, a DUMMY command is written in the BLOCK register. However, in step S57-4 of FIG. 57, the same data as that of an immediately preceding SEND command is written. The remaining processing operations in FIG. 57 is the same as in FIG. 45, and a detailed description thereof will be omitted.

Processing on the image source device side and that of the printer side in the second embodiment will be described below in detail with reference to FIGS. 58 to 60.

Image Transmission Processing of Image Source Device

Figure 58:
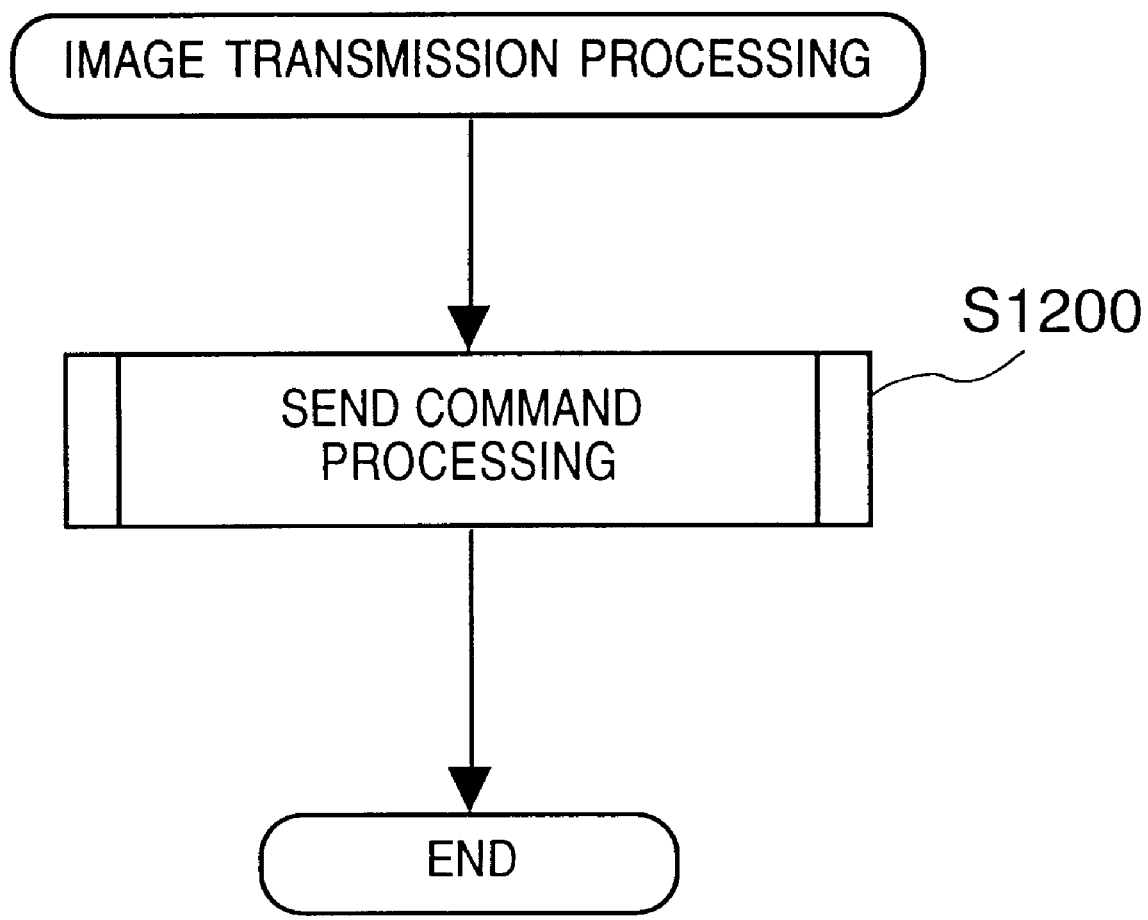
FIG. 58 is a flow chart showing image transmission processing of an image source device of the second embodiment.

FIG. 58 is a flow chart showing image transmission processing of an image source device of the second embodiment. Substantially, SEND command processing in step S1200 is performed.

Figure 59:
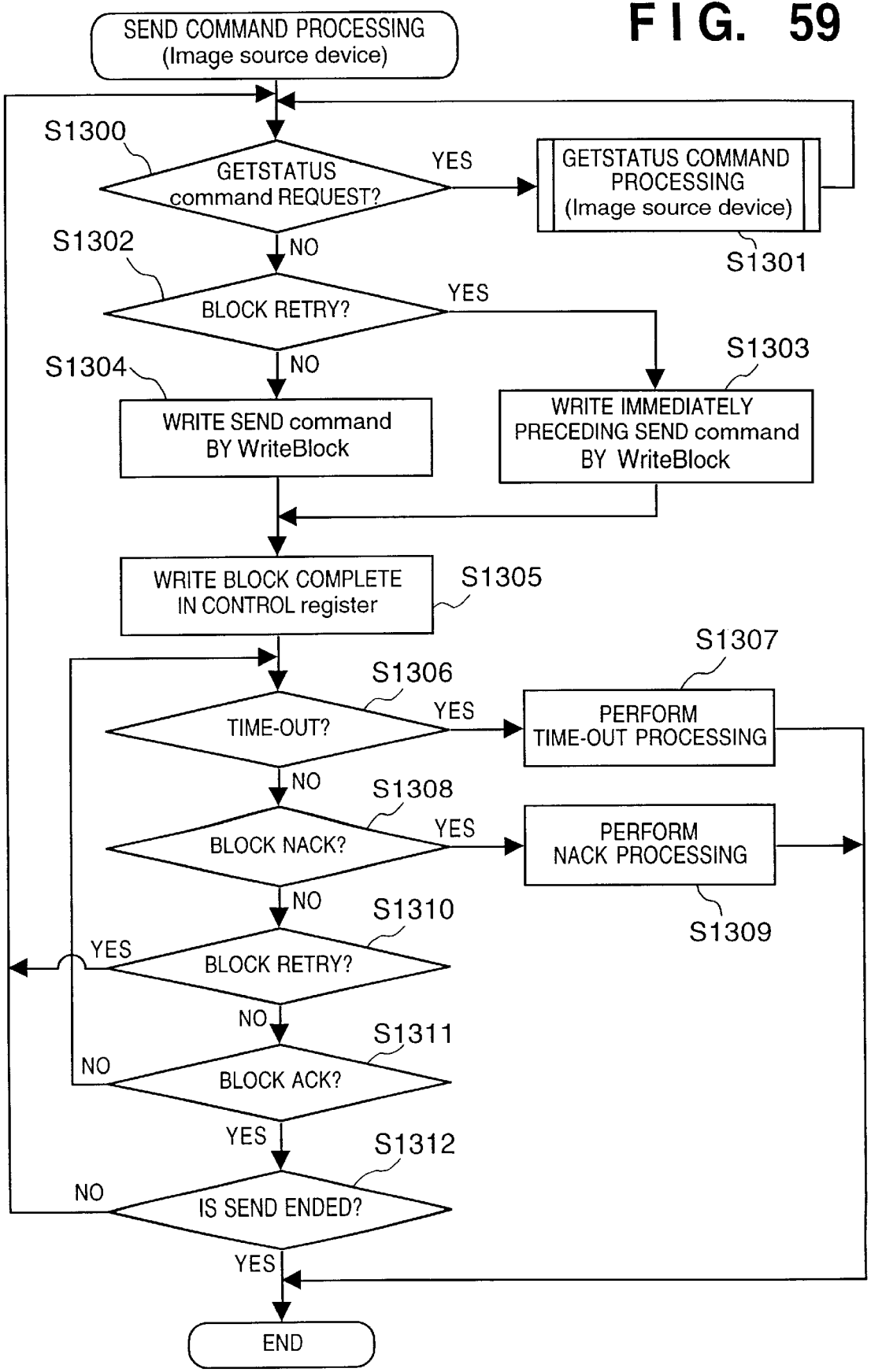
FIG. 59 is a flow chart showing SEND command processing in the image source device of the second embodiment.

FIG. 59 is a flow chart showing details of SEND command processing in step S1200. In step S1300, it is checked whether a GETSTATUS command request is present. The GETSTATUS command is started as in FIG. 52 of the first embodiment. If YES in step S1300, the flow advances to step S1301 to execute GETSTATUS command processing. This GETSTATUS command processing is the same as the processing of getting a printer status in FIG. 51 of the first embodiment. When GETSTATUS command processing in step S1301 is ended, the flow returns to step S1300.

If NO in step S1300, the flow advances to step S1302 to check a BLOCK RETRY is written in the RESPONSE register. If YES in step S1302, this means that the number of remaining free buffers of the printer is 1 and data retransmission is requested. The flow advances to step S1303 to write the same data as that written in the CONTROL register on the printer side by an immediately preceding SEND command again. This processing corresponds to step S57-4 or S57-15 in FIG. 57. If NO in step S1302, the flow advances to step S1304 to transmit a SEND command. This corresponds to step S57-1, S57-18, or S57-21 in FIG. 57, and processing of sending image data to the printer is executed. When image data cannot be stored in one buffer, the image data is segmented into a plurality of SEND commands and written in the BLOCK register of the printer, as in FIG. 39 of the first embodiment. Steps S1303 and S1304 correspond to processing of writing one of segmented image data. The entire image data is transmitted by repeatedly executing step S1304.

The flow advances to step S1305 to write BLOCK COMPLETE in the CONTROL register on the printer side. By writing BLOCK COMPLETE, the printer side is notified of completion of the data write in the BLOCK register. Next, the flow advances to step S1306 to check whether the time is out. More specifically, the time after BLOCK COMPLETE is written in the CONTROL register of the printer in step S1305 until BLOCK ACK/NACK or RETRY is returned to the RESPONSE register of the image source device is counted by a timer. The time is out when no BLOCK ACK/NACK and RETRY is returned even after the elapse of a predetermined time. If YES in step S1306, the flow advances to step S1307 to execute time-out processing. In this time-out processing, the user is notified that the time is out or data transmission to the printer has failed due to some reason, or image data transmission to the printer is ended. After time-out processing, SEND command processing is ended.

If NO in step S1306, the flow advances to step S1308 to check whether BLOCK NACK is returned from the printer to the RESPONSE register of the image source device. If YES in step S1308, the flow advances to step S1309 to execute NACK processing because the data sent to the printer has a certain error. In NACK processing in step S1309, image data transmission to the printer is ended because data transmission to the printer has failed due to some reason, as in time-out processing. After NACK processing, SEND command processing is ended.

If NO in step S1308, the flow advances to step S1310 to check whether BLOCK RETRY is returned from the printer. If YES in step S1310, the flow advances to step S1311 to check whether BLOCK ACK is returned from the printer. If NO in step S1311, the flow returns to step S1306. If YES in step S1311, the flow advances to step S1312 to check whether the SEND command is ended. If NO in step S1312, the flow returns to step S1300 to repeat the above-described processing. If YES in step S1312, SEND command processing is ended.

As described above with reference to FIG. 59, the image source device of the second embodiment can execute the SEND command, process BLOCK RETRY, and process the GETSTATUS command during execution of the SEND command. This processing corresponds to the procedure on the image source device side in the RETRY and GETSTATUS command control procedures described above with reference to FIG. 57.

Image Transmission Processing of Printer

Figure 60:
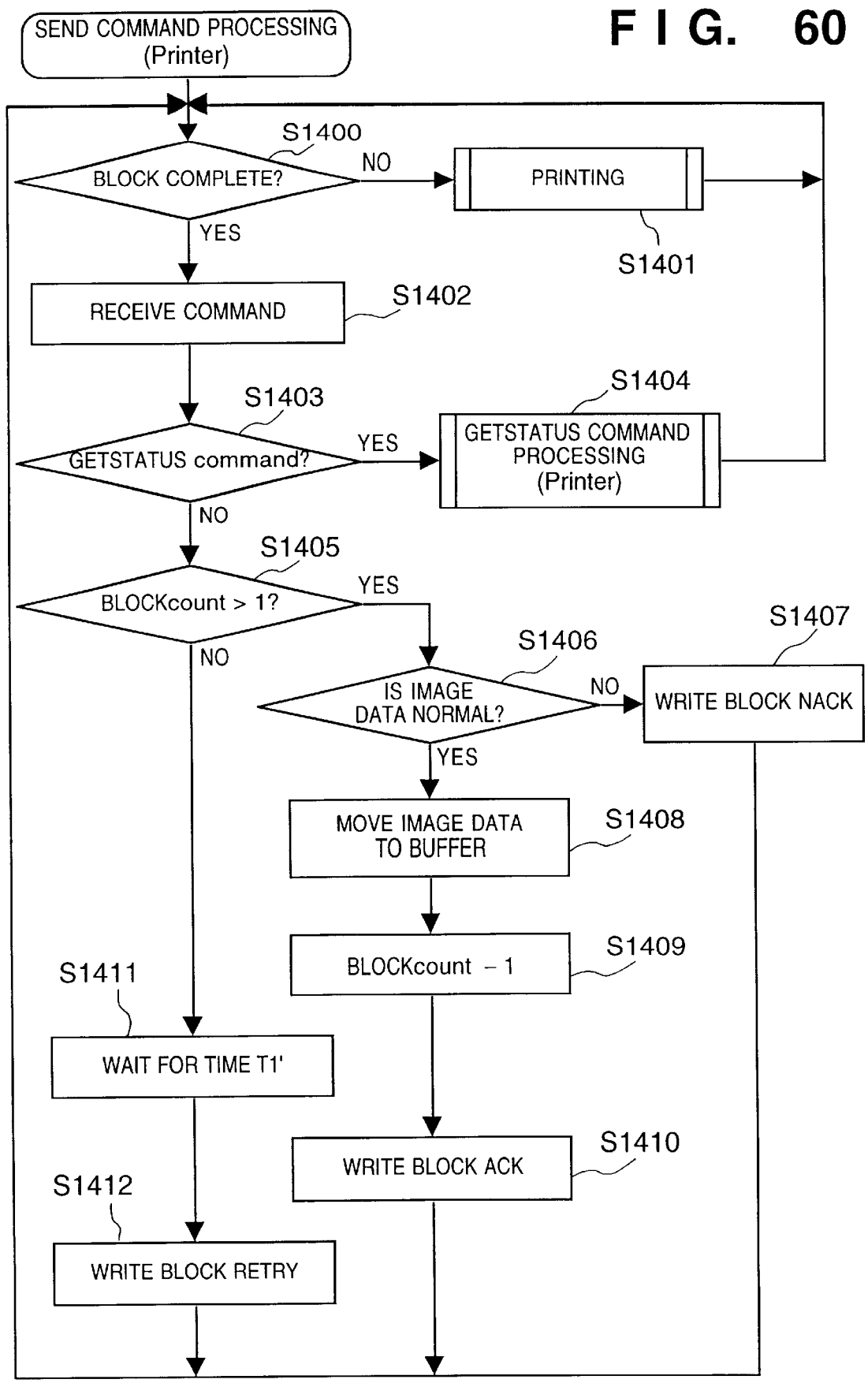
FIG. 60 is a flow chart showing SEND command processing of a printer of the second embodiment.

FIG. 60 is a flow chart showing SEND command processing of the printer side of the second embodiment.

In step S1400, it is checked whether BLOCK COMPLETE is written in the CONTROL register on the printer side. If NO in step S1400, the flow advances to step S1401 to execute printing, and after this, the flow returns to step S1400. This printing processing is the same as in step S901 of FIG. 53 described in the first embodiment. If YES in step S1400, the flow advances to step S1402 to receive the written command. This command comprises a Command ID 35-1 and Parameter 35-2, as shown in FIG. 35. The type of command can be known by checking the Command ID.

Next, the flow advances to step S1403 to check whether the written command is a GETSTATUS command, i.e., the Command ID represents a GETSTATUS command. If YES in step S1403, the flow advances to step S1404 to execute GETSTATUS command processing on the printer side, and after this, the flow returns to step S1400. This GETSTATUS command processing is the same as in FIG. 55 of the first embodiment. If NO in step S1403, it is determined that the command is a SEND command, and the flow advances to step S1405 to check whether the BLOCK count is larger than 1.

If YES in step S1405, the flow advances to step S1406 to check whether the image data sent by the SEND command is normal. If NO in step S1406, the flow advances to step S1407 to write BLOCK NACK in the RESPONSE register of the image source device. With this processing, the image source device is notified that the image data is not normally transmitted. If YES in step S1406, the flow advances to step S1408 to move the image data written in the BLOCK register to an appropriate internal buffer. This is processing of moving the image data in the BLOCK register to one of buffers 33-2 to 33-7 shown in FIG. 33. The flow advances to step S1409 to decrement the BLOCK count representing the number of remaining free buffers by one. The flow advances to step S1410 to write BLOCK ACK in the RESPONSE register of the image source device, and the flow returns to step S1400.

If NO in step S1405, the flow advances to step S1411 to wait for time T1'. T1' is the response time shown in FIG. 48 until BLOCK ACK is returned in response to BLOCK COMPLETE. As the time T1', a longer time than T1 in FIG. 47 is set. After the elapse of time T1', BLOCK RETRY for requesting retransmission of a SEND command is written in the RESPONSE register of the image source device in step S1412, and the flow returns to step S1400. In the second embodiment, SEND command retransmission is performed instead of DUMMY command transmission processing in FIGS. 47 and 48 of the first embodiment. The time until BLOCK RETRY is returned is adjusted by this time T1', and consequently, the number of SEND commands transmitted from the image source device to the printer can be decreased.

With the SEND command processing shown in FIG. 60, image data reception processing on the printer side is executed, and GETSTATUS command processing can be performed during execution of a SEND command. In addition, a SEND command can be retransmitted in accordance with the number of free buffers represented by the BLOCK count.

As described above with reference to FIGS. 56 to 60, according to the second embodiment, when the current number of free buffers of the printer is 1, the image source device can retransmit a SEND command in accordance with BLOCK ACK/NACK and BLOCK RETRY returned from the printer. Since a GETSTATUS command can be executed while a SEND command is being retransmitted, a GETSTATUS command can be arbitrarily executed even during execution of a SEND command.

This SEND command retransmission processing can be realized without adding any new processing because existing bus reset or error processing can be used.

Since the time interval of SEND command retransmission can be adjusted on the printer side, the traffic efficiency on the 1394 serial bus can be increased without increasing the load on the image source device side.

Third Embodiment

The third embodiment of the present invention will be described below.

Register

Figure 61:
FIG. 61 is a view showing the structure of a CONTROL register and RESPONSE register in the third embodiment of the present invention.

In FIG. 61, the general structure of CONTROL and RESPONSE registers, which is shown in FIG. 34 of the first embodiment, is improved in the third embodiment.

In the third embodiment, BLOCK DUMMY COMPLETE of 02h is added as a CONTROL command. In the first embodiment, after a DUMMY command is written in the CONTROL register, BLOCK COMPLETE is written to notify the printer side of the DUMMY command. Instead, in the third embodiment, the same operation as in the first embodiment is performed by detecting, on the printer side, that BLOCK DUMMY COMPLETE is written in the CONTROL register. That is, BLOCK DUMMY COMPLETE is used as a transmission control command for controlling DUMMY transmission.

Figure 62:
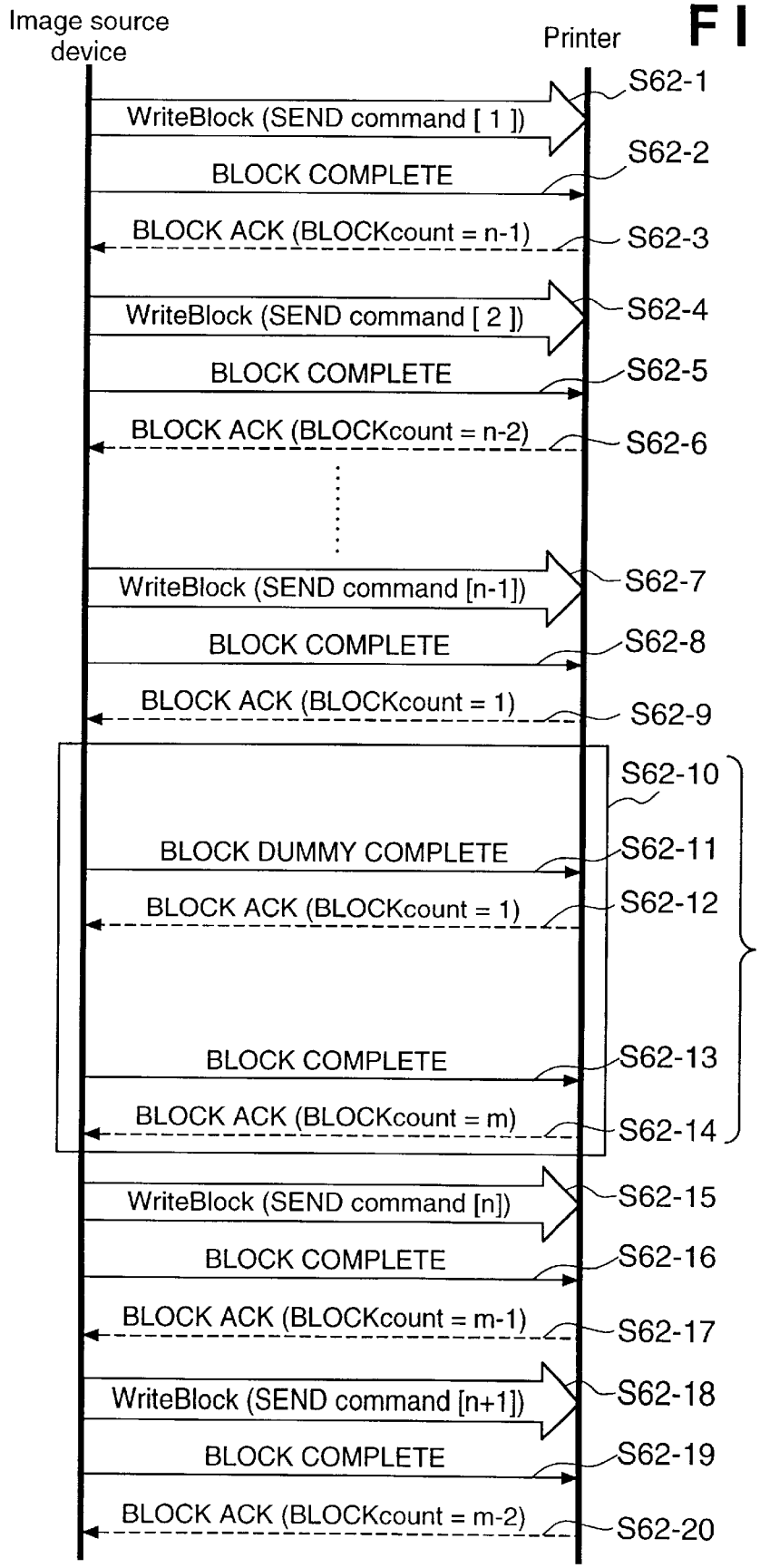
FIG. 62 is a view showing the DUMMY processing control procedure in the third embodiment.

FIG. 62 is a view showing the DUMMY processing control procedure in the third embodiment and corresponds to that shown in FIG. 44 in the first embodiment. FIG. 62 is different from FIG. 44 in the following points. In step S44-11 or 44-14 of FIG. 44, a DUMMY command is written by WriteBlock. However, in FIG. 62, this step is omitted. In step S44-12 or S44-15 of FIG. 44, BLOCK COMPLETE is written in the CONTROL register. However, in step S62-11 or S62-13 of FIG. 62, BLOCK DUMMY COMPLETE is written. The remaining processing operations in FIG. 62 are the same as those in FIG. 44, and a detailed description thereof will be omitted.

Figure 63:
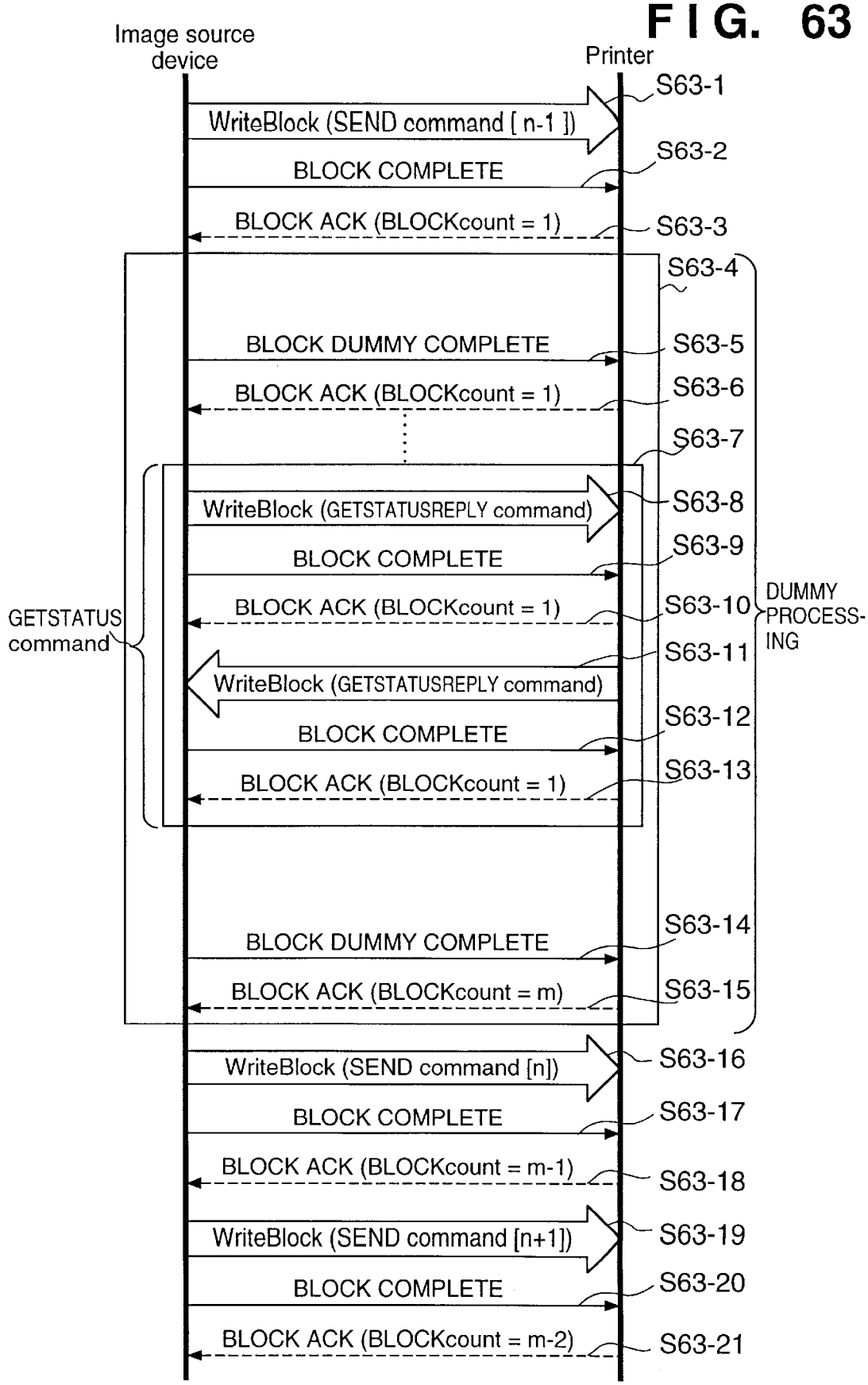
FIG. 63 is a view showing the DUMMY processing and GETSTATUS command control procedure in the third embodiment.

FIG. 63 is a view showing the DUMMY processing and GETSTATUS command control procedure in the third embodiment and corresponds to that shown in FIG. 45 of the first embodiment. FIG. 63 is different from FIG. 45 in the following points. In step S45-4 or S45-15 of FIG. 45, a DUMMY command is written by WriteBlock. In FIG. 63, this step is omitted. In step S45-6 or S45-16 of FIG. 45, BLOCK COMPLETE is written in the CONTROL register. In step S63-5 or S63-14 of FIG. 63, BLOCK DUMMY COMPLETE is written. The remaining processing operations in FIG. 63 are the same as those in FIG. 45 and a detailed description thereof will be omitted.

Figure 64:
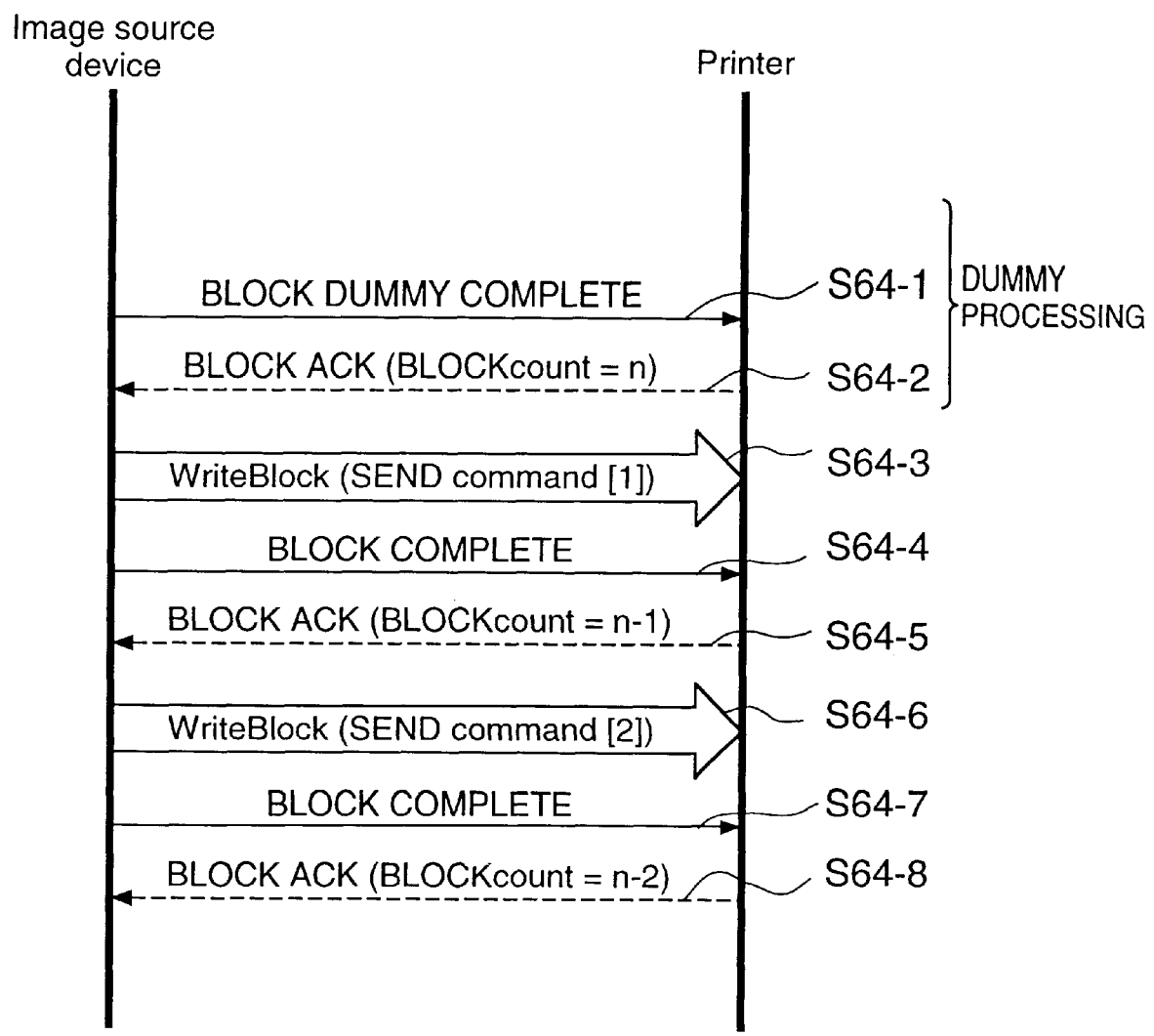
FIG. 64 is a view showing the DUMMY processing control procedure before SEND command processing in the third embodiment.

FIG. 64 is a view showing the DUMMY processing control procedure before image transmission processing in the third embodiment and corresponds to that shown in FIG. 46 of the first embodiment. FIG. 64 is different from FIG. 46 in the following points. In step S46-1 of FIG. 46, a DUMMY command is written by WriteBlock. In FIG. 64, this step is omitted. In step S46-2 of FIG. 46, BLOCK COMPLETE is written in the CONTROL register. In step S64-1 of FIG. 64, BLOCK DUMMY COMPLETE is written. The remaining processing operations in FIG. 64 are the same as those in FIG. 46 and a detailed description thereof will be omitted.

Processing on the image source device side and that on the printer side in the third embodiment will be described below in detail with reference to FIGS. 65 to 67.

Image Transmission Processing of Image Source Device

Figure 65:
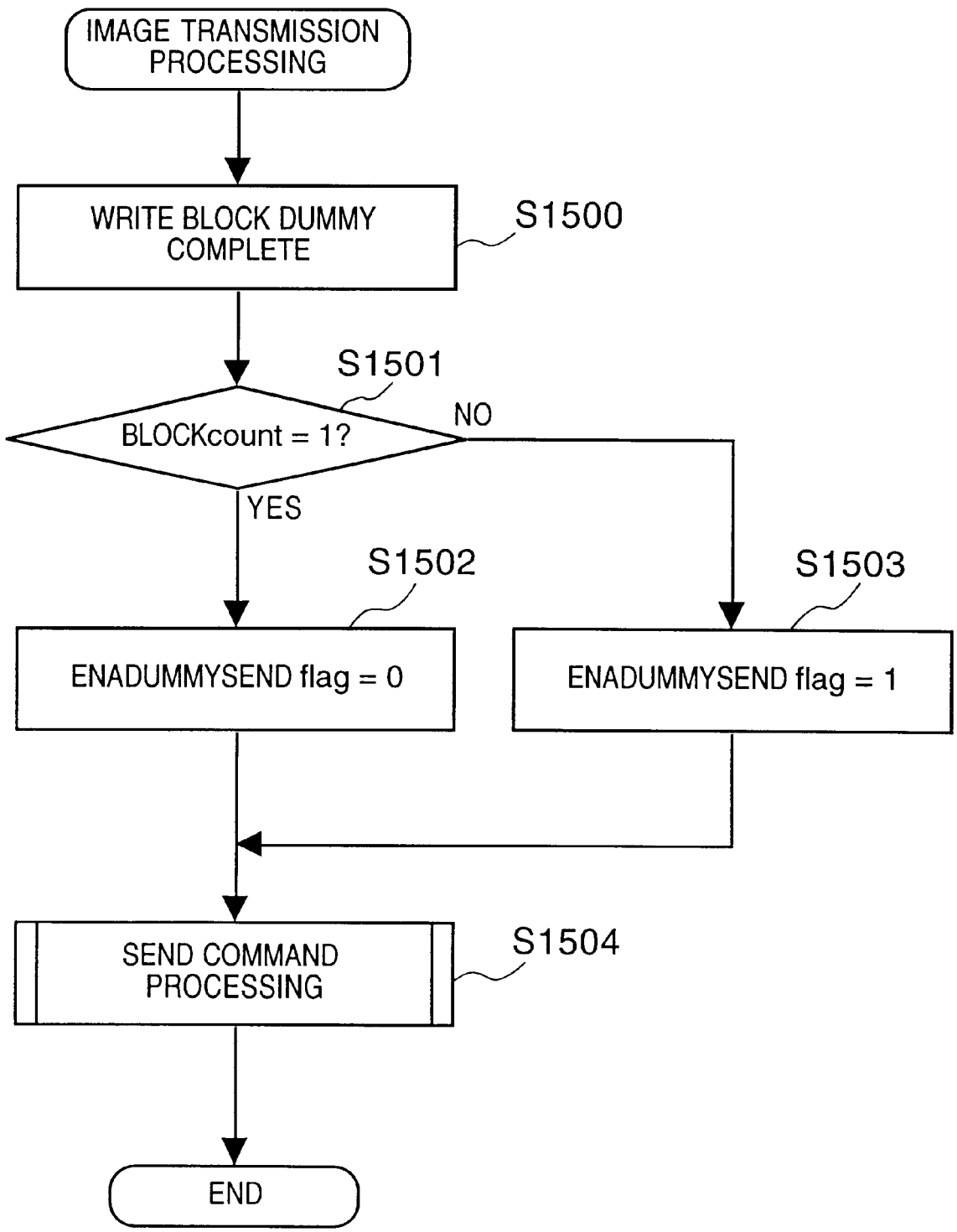
FIG. 65 is a flow chart showing image transmission processing in an image source device of the third embodiment.

FIG. 65 is a flow chart showing details of image transmission processing in the third embodiment and corresponds to the flow chart of FIG. 49 that shows details of image transmission processing in the first embodiment. FIG. 65 is different from FIG. 49 in the following points. In step S500 of FIG. 49, a DUMMY command is written by WriteBlock. However, in FIG. 65, BLOCK DUMMY COMPLETE is written. The remaining processing operations in FIG. 65 are the same as those in FIG. 49 and a detailed description thereof will be omitted.

Figure 66:
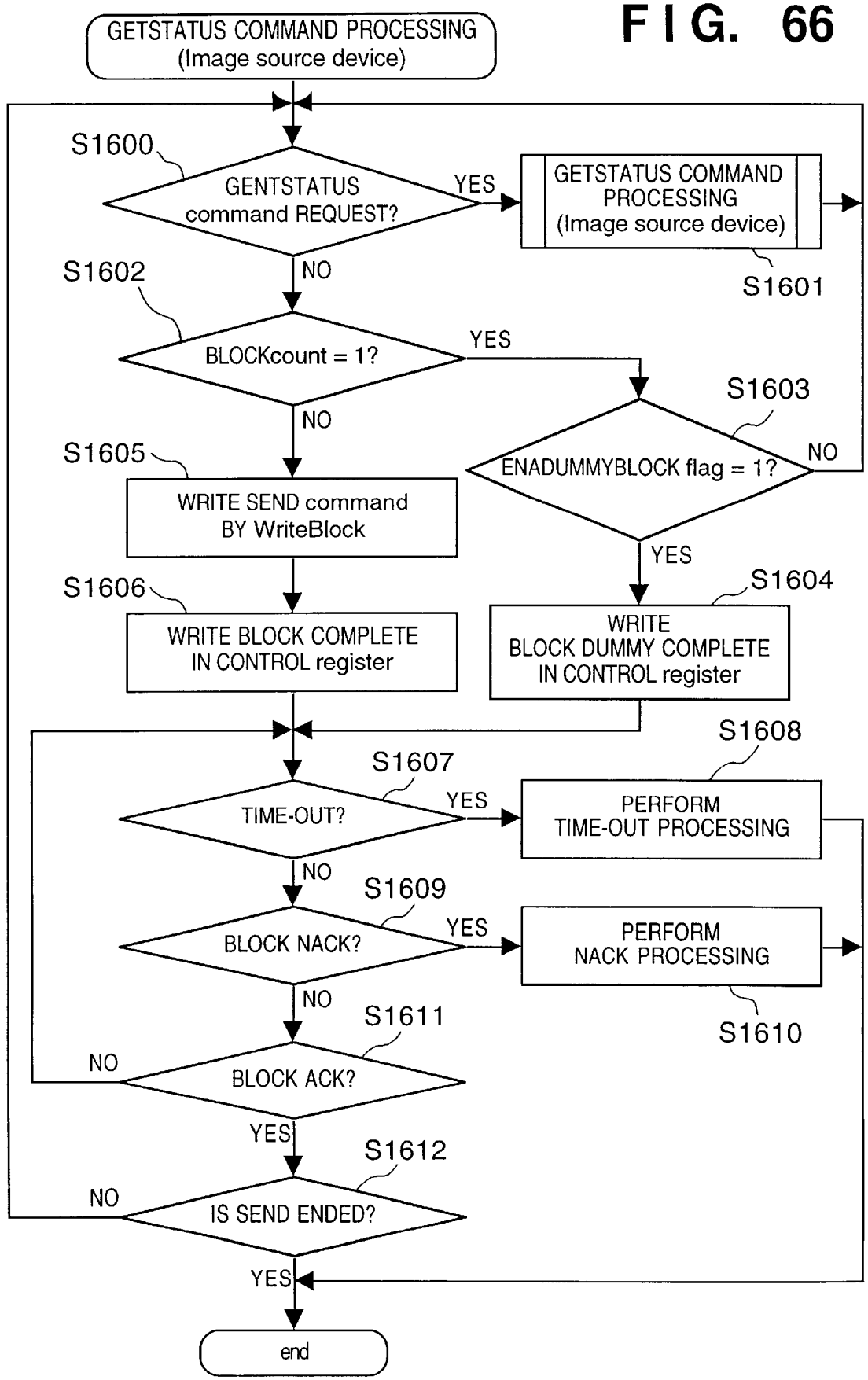
FIG. 66 is a flow chart showing SEND command processing in the image source device of the third embodiment.

FIG. 66 is a flow chart showing details of SEND command processing in the third embodiment and corresponds to the flow chart of FIG. 50 that shows details of SEND command processing in the first embodiment. FIG. 66 is different from FIG. 50 in the following points. In step S604 of FIG. 50, a DUMMY command is written by WriteBlock, and the flow advances to step S606. However, in step S1604 of FIG. 66, BLOCK DUMMY COMPLETE is written, and the flow advances to step S1607. The remaining processing operations in FIG. 66 are the same as those in FIG. 50 and a detailed description thereof will be omitted.

Image Transmission Processing of Printer

Figure 67:
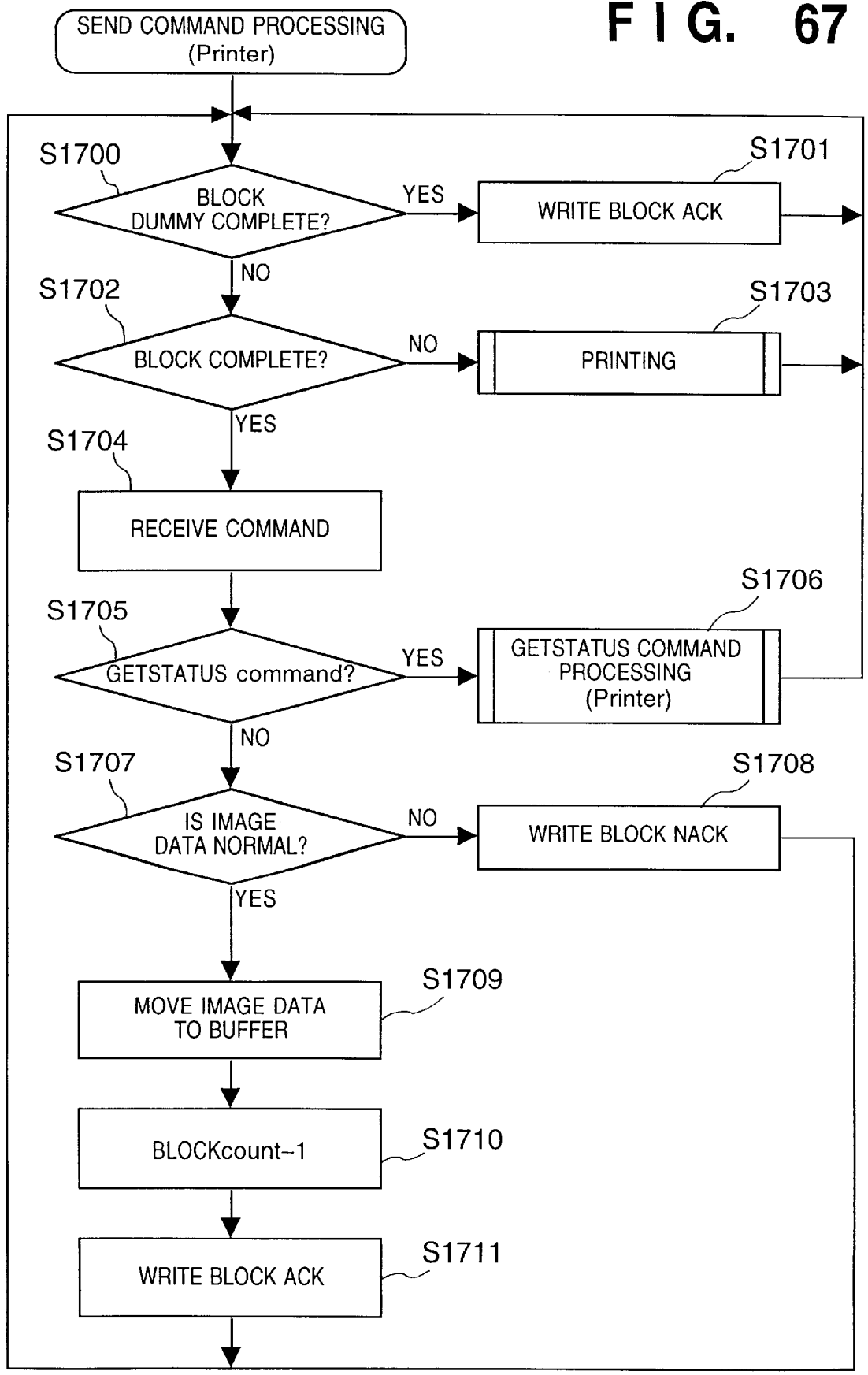
FIG. 67 is a flow chart showing SEND processing of a printer of the third embodiment.

FIG. 67 is a flow chart showing details of SEND processing on the printer side in the third embodiment and corresponds to the flow chart of FIG. 53 that shows details of SEND command processing on the printer side in the first embodiment.

In step S1700, it is checked whether BLOCK DUMMY COMPLETE is written in the CONTROL register on the printer side. If YES in step S1700, the flow advances to step S1701 to write BLOCK ACK in the RESPONSE register of the image source device, and the flow returns to step S1700. If NO in step S1700, the flow advances to step S1702 to check whether BLOCK COMPLETE is written. If NO in step S1702, the flow advances to step S1703 to execute printing, and after this, the flow returns to step S1700. Printing is the same as that described with reference to FIG. 54 of the first embodiment. If YES in step S1702, the flow advances to step S1704 to write the written command. This command comprises a Command ID 35-1 and Parameter 35-2, as shown in FIG. 35 of the first embodiment. The type of command can be known by checking the Command ID. Next, the flow advances to step S1705 to check whether the command written in the block register is a GETSTATUS command, i.e., the Command ID represents a GETSTATUS command. If YES in step S1705, the flow advances to step S1706 to execute GETSTATUS command processing on the printer side. GETSTATUS processing is the same as in the first embodiment described with reference to FIG. 55. After GETSTATUS processing is executed, the flow returns to step S1700. If NO in step S1705, the flow advances to step S1707. Since the command is a SEND command, it is checked whether image data sent by the SEND command is normal. If NO in step S1707, the flow advances to step S1708 to write BLOCK NACK in the RESPONSE register of the image source device. With this processing, the image source device is notified that the image data is not normally sent. If YES in step S1707, the flow advances to step S1709 to move the image data written in the BLOCK register to an appropriate internal buffer. This is processing of moving the image data in the BLOCK register to one of the buffers 33-2 to 33-7 shown in FIG. 33. The flow advances to step S1710 to decrement the BLOCK count representing the number of remaining free buffers by one. The flow advances to step S1711 to write BLOCK ACK in the RESPONSE register of the image source device, and the flow returns to step S1700.

As described above with reference to FIGS. 61 to 67, according to the third embodiment, the image source device can know the current number of free buffers of the printer on the basis of BLOCK ACK/NACK and BLOCK count written from the printer in the RESPONSE register. When the number of free buffers is 1, BLOCK DUMMY COMPLETE can be written in the CONTROL register on the printer side in place of a SEND command. Hence, the traffic efficiency on the 1394 serial bus can be further increased as compared to the first embodiment.

In addition, a GETSTATUS command can be executed even during DUMMY processing. For this reason, even when a SEND command is being executed, a GETSTATUS command can be arbitrarily executed.

Modification of Embodiments

In the above-described embodiments, when the number of free buffers in the printer is 1, DUMMY command processing or BLOCK RETRY processing is performed. However, the number of free buffers is not limited to 1. The number may be 2 or 3 as far as the number is inconvenient in executing SEND command processing.

In the embodiments, printing is realized by transmitting data from the image source device to the printer. However, the present invention can be applied to any device as far as it uses transmitted image data.

In the above-described first embodiment, a DUMMY command is transmitted when the number of free buffers in the printer is 1. However, any other command can be used as long as it is a command sent from the image source device to the printer, with which the number of free buffers in the printer can be known, and decreases the processing load in the printer.

In the above embodiments, the number of free buffers is set in the BLOCK count to notify the image source device of it. However, instead of using the free buffer count itself, buffer information such as "many free buffers" or "few free buffers" may be set. The image source device can be informed of the buffer state even with this method, and the same effect as in the above-described embodiments can be obtained.

In the above-described embodiments, a network is constructed using a serial interface defined by the IEEE 1394. However, the present invention is not limited to this and can be applied to a network constructed using an arbitrary serial interface such as one called Universal Serial Bus (USB).

Other Embodiments

The present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is realized even by supplying a storage medium storing software program codes for realizing the functions of the above-described embodiments to a system or an apparatus, and causing the computer (or a CPU or an MPU) of the system or the apparatus to read out and execute the program codes stored in the storage medium. In this case, the program codes read out from the storage medium realize the functions of the above-described embodiments by themselves, and the storage medium storing the program codes constitutes the present invention. As a storage medium for supplying the program codes, a floppy disk, a hard disk, an optical disk, a magnetooptical disk, a CD-ROM, a CD-R, a magnetic tape, a nonvolatile memory card, a ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

When the present invention is applied to the storage medium, the storage medium stores program codes corresponding to the above-described flow charts.

As many apparently widely different embodiments of the present invention can be made without departing from the spirit and scope thereof, it is to be understood that the invention is not limited to the specific embodiments thereof except as defined in the appended claims.

As has been described above, according to the present invention, when data is to be transmitted from a host device to a target device, which are connected by a 1394 serial bus or the like, using the same register area by commands and data, and only a response to a data write in the register is to be returned, a command other than data transmission can be arbitrarily executed.

That is, according to the present invention, when the host device executes DUMMY processing in accordance the number of free buffers in the target device, other command can be arbitrarily executed even during data transmission.

In addition, when the target device sends a data retransmission request to the host device in accordance with the number of free buffers, any other command can be arbitrarily executed even during data transmission.

Furthermore, when the response time for a data write in the register is adjusted, the traffic efficiency on the data bus can be increased.

The present invention is not limited to the above embodiments and various changes and modifications can be made within the spirit and scope of the present invention. Therefore, to apprise the public of the scope of the present invention the following claims are made.

What is claimed is:

1. A device for communicating with an external apparatus that stores image data transferred from said device in a buffer and sends back a response to said device, comprising:
   a reception unit adapted to receive the response from the external apparatus, wherein the response includes information about an amount of free space in the buffer;
   a transfer unit adapted to transfer image data to the external apparatus in a case in which the amount of free space in the buffer is larger than a predetermined amount; and
   a transmission unit adapted to transmit a command to the external apparatus in a case in which the amount of free space in the buffer is not larger than the predetermined amount, by an interrupt of a image data transfer operation by said transfer unit,
   wherein the command causes the external apparatus to send back a response that includes information about the amount of free space in the buffer without storing the command in the buffer, and
   wherein, after said transmission unit transmits the command to the external apparatus, said transfer unit transfers image data to the external apparatus in a case in which the amount of free space is larger than the predetermined amount.

2. The device according to claim 1, wherein said transmission unit is adapted to transmit a command for obtaining a status of the external apparatus to the external apparatus, when the amount of free space in the buffer is not larger than the predetermined amount.

3. The device according to claim 1, wherein the external apparatus includes a printer.

4. The device according to claim 1, wherein the predetermined amount is one data block.

5. The device according to claim 1, wherein said device is connected to the external apparatus via a serial bus that is compatible or complies with an IEEE 1394 standard.

6. A method of communication between a first device and a second device that stores image data transferred from the first device in a buffer, comprising the steps of:
   transferring from the first device to the second device;
   sending a response from the second device to the first device, wherein the response includes information about an amount of free space in the buffer;
   transmitting a command from the first device to the second device when the amount of free space in the buffer is not larger than the predetermined amount, wherein the command causes the second device to send back a response that includes information about the amount of free space in the buffer without storing the command in the buffer; and
   after the command is transmitted from the first device to the second device, transferring image data from the first device to the second device in a case in which the amount of free space is larger than the predetermined amount.

7. The method according to claim 6, further comprising the step of transmitting from the first device to the second device a command for obtaining a status of the second device, in a case in which the amount of free space in the buffer is not larger than the predetermined amount.

8. The method according to claim 6, wherein the second device includes a printer.

9. The method according to claim 6, wherein the predetermined amount is one data block.

10. The method according to claim 6, wherein the first device is connected to the second device via a serial bus that is compatible or complies with an IEEE 1394 standard.

11. A peripheral device comprising:
    a storage unit adapted to store image data transferred from an external apparatus;
    a sending unit adapted to send back, upon receiving the image data from the external apparatus, a response that includes information about an amount of free space in a buffer;
    a receiving unit adapted to receive a command from the external apparatus; and
    a response unit adapted to send back, upon receiving the command from the external apparatus, a response that includes information about the amount of free space in the buffer without storing the command in the buffer,
    wherein the external apparatus transfers the image data to said peripheral device in a case in which the amount of free space in the buffer is larger than a predetermined amount, and transmits the command to said peripheral device in a case in which the amount of free space in the buffer is not larger than the predetermined amount.

12. The peripheral device according to claim 11, further comprising a transmission unit adapted to transmit to the external apparatus a status of the peripheral device in response to a command from the external apparatus for obtaining the status.

13. The peripheral device according to claim 11, wherein said peripheral device includes a printer.

14. The peripheral device according to claim 11, wherein said peripheral device is connected to the external apparatus via a serial bus that is compatible or complies with an IEEE 1394 standard.

15. A communication method of a peripheral device, comprising the steps of:

storing image data transferred from an external apparatus in a buffer;

sending, upon receiving the image data from the external apparatus a response that includes information about an amount of free space in the buffer;

receiving a command from the external apparatus; and sending, upon receiving the command from the external apparatus, a response that includes information about the amount of free space in the buffer without storing the command in the buffer;

wherein the external apparatus transfers the image data to the peripheral device in a case in which the amount of free space in the buffer is larger than a predetermined amount, and transmits the command to the peripheral device in a case in which the amount of free space in the buffer is not larger than the predetermined amount.

16. The method according to claim 15, further comprising the step of transmitting a status of the peripheral device to the external apparatus, in response to a command from the external apparatus for obtaining the status.

17. The method according to claim 15, wherein the peripheral device includes a printer.

18. The method according to claim 15, wherein the peripheral device is connected to the external apparatus via a serial that is compatible or complies with an IEEE 1394 standard.

19. The device according to claim 1, wherein said transmission unit transmits the command to the apparatus a plurality of times until the amount of free space is larger than the predetermined amount.

20. The method according to claim 6, wherein the command is transmitted to the second device a plurality of times in said transmitting step until the amount of free space is larger than the predetermined amount.

21. The peripheral device according to claim 11, wherein the external apparatus transmits the command a plurality of times until the amount free space is larger than the predetermined amount, and said receiving unit receives the command a plurality of times form the external apparatus.

* * * * *

UNITED STATES PATENT AND TRADEMARK OFFICE
CERTIFICATE OF CORRECTION

PATENT NO. : 6,717,694 B1
DATED : April 6, 2004
INVENTOR(S) : Koji Fukunaga et al.

It is certified that error appears in the above-identified patent and that said Letters Patent is hereby corrected as shown below:

Drawings,
SHEET 11, Fig. 11, "CLOCK_STOROBE_ARRIVED," should read
-- CLOCK_STROBE_ARRIVED, --.
SHEET 20, Fig. 20, "BROADCASING" should read -- BROADCASTING --.
SHEET 27, Fig. 27, "CHANEL" should read -- CHANNEL --.
SHEET 30, Fig. 30, "Mangement" should read -- Management --.
SHEET 37, Fig. 37, "GETSREPLYREPLY" should read -- GETSTATUSREPLY --.
SHEET 66, Fig. 66, "GENTSTATUS" should read -- GETSTATUS --.

Column 6,
Line 66, "function," should read -- functions, --.

Column 7,
Line 34, "constructs" should read -- construct --.
Line 50, "an" should read -- a --.

Column 8,
Line 1, "are" should read -- be --.

Column 9,
Line 17, "which" should read -- which point, --.
Lines 25 and 65, "which" should read -- which point --.
Line 67, "waited" should read -- delayed --.

Column 10,
Line 2, "which" should read -- which point --.
Lines 32 and 55, "notifies" should read -- it notifies --.
Lines 34 and 58, "been" should be deleted.

Column 11,
Line 60, "is" should read -- does --.

Column 12,
Line 62, "the link layer 812," second occurrence should be deleted.

Column 13,
Line 21, "an" should read -- a --.

UNITED STATES PATENT AND TRADEMARK OFFICE
CERTIFICATE OF CORRECTION

PATENT NO.     : 6,717,694 B1
DATED          : April 6, 2004
INVENTOR(S)    : Koji Fukunaga et al.

It is certified that error appears in the above-identified patent and that said Letters Patent is hereby corrected as shown below:

Column 14,
Line 67, "an" should read -- a --.

Column 20,
Line 7, "processing" should read -- processings --.

Column 25,
Line 67, "traffics" should read -- traffic --.

Column 26,
Line 11, "number" should read -- destiny --.
Line 12, "traffics" should read -- traffic --. .

Column 27,
Line 4, "is" should read -- is at --.

Column 30,
Line 67, "traffics" should read -- traffic --.

Column 31,
Line 37, "is" should read -- are --.
Line 61, "check" should read -- check whether --.

Column 36,
Lines 19 and 23, "far" should read -- long --.

Column 37,
Line 33, "command" should read -- commands --.
Line 61, "a" should read -- an --.

Column 39,
Line 17, "apparatus" should read -- apparatus, --.
Line 24, "buffer;" should read -- buffer, --.

UNITED STATES PATENT AND TRADEMARK OFFICE
CERTIFICATE OF CORRECTION

PATENT NO. : 6,717,694 B1
DATED : April 6, 2004
INVENTOR(S) : Koji Fukunaga et al.

It is certified that error appears in the above-identified patent and that said Letters Patent is hereby corrected as shown below:

Column 40,
Line 24, "amount" should read -- amount of --.
Line 26, "form" should read -- from --.

Signed and Sealed this

Fifth Day of October, 2004

JON W. DUDAS
*Director of the United States Patent and Trademark Office*